US010641509B2

(12) United States Patent
Kusukame et al.

(10) Patent No.: US 10,641,509 B2
(45) Date of Patent: *May 5, 2020

(54) THERMAL IMAGE SENSOR AND USER INTERFACE

(71) Applicant: Panasonic Intellectual Property Corporation of America, Torrance, CA (US)

(72) Inventors: Koichi Kusukame, Nara (JP); Shinichi Shikii, Nara (JP); Nawatt Silawan, Osaka (JP); Tatsuo Itoh, Osaka (JP); Kazuki Funase, Osaka (JP); Aki Yoneda, Hyogo (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,185

(22) Filed: Feb. 27, 2018

(65) Prior Publication Data

US 2018/0187910 A1    Jul. 5, 2018

Related U.S. Application Data

(62) Division of application No. 14/414,711, filed as application No. PCT/JP2014/002434 on May 8, 2014, now Pat. No. 9,939,164.

(Continued)

(30) Foreign Application Priority Data

May 17, 2013  (JP) ................................. 2013-105302
May 17, 2013  (JP) ................................. 2013-105304

(51) Int. Cl.
*F24F 11/30*     (2018.01)
*G01J 5/04*      (2006.01)
(Continued)

(52) U.S. Cl.
CPC .......... *F24F 11/30* (2018.01); *B60H 1/00742* (2013.01); *G01J 5/0025* (2013.01);
(Continued)

(58) Field of Classification Search
CPC . F24F 11/0034; F24F 11/001; B60H 1/00742; G01J 5/0025; G01J 5/025; G01J 5/047
See application file for complete search history.

(56) References Cited

U.S. PATENT DOCUMENTS 4,873,442 A     10/1989  Klatt
5,075,553 A *   12/1991  Noble ........................ G01J 5/06
                                                             250/332

(Continued)

FOREIGN PATENT DOCUMENTS

JP        61-154279       7/1986
JP        02-140628       5/1990
(Continued)

OTHER PUBLICATIONS

International Search Report dated Aug. 19, 2014 in International (PCT) Application No. PCT/JP2014/002434.
(Continued)

*Primary Examiner* — Christine S. Kim
(74) *Attorney, Agent, or Firm* — Wenderoth, Lind & Ponack, L.L.P.

(57) ABSTRACT

A thermal image sensor including: a plurality of infrared detector elements that detect infrared light in a detection area; and rotors that scan the detection area in a scanning direction to detect, with the plurality of infrared detector elements, infrared light in an area to be captured as a single thermal image. The plurality of infrared detector elements include infrared detector elements arranged in mutually (Continued)

different positions in a rotational direction corresponding to the scanning direction of the plurality of infrared detector elements.

18 Claims, 63 Drawing Sheets

Related U.S. Application Data

(60) Provisional application No. 61/827,153, filed on May 24, 2013.

(51) Int. Cl.
| | | |
|---|---|---|
| *B60H 1/00* | (2006.01) | |
| *G01J 5/00* | (2006.01) | |
| *G01J 5/02* | (2006.01) | |
| *F24F 110/00* | (2018.01) | |
| *G01B 11/02* | (2006.01) | |
| *G01B 11/06* | (2006.01) | |
| *G01V 8/20* | (2006.01) | |
| *F24F 120/10* | (2018.01) | |
| *F24F 120/12* | (2018.01) | |
| *F24F 120/14* | (2018.01) | |

(52) U.S. Cl.
CPC ............... *G01J 5/025* (2013.01); *G01J 5/047* (2013.01); *F24F 2110/00* (2018.01); *F24F 2120/10* (2018.01); *F24F 2120/12* (2018.01); *F24F 2120/14* (2018.01); *G01B 11/026* (2013.01); *G01B 11/0608* (2013.01); *G01J 2005/0077* (2013.01); *G01V 8/20* (2013.01)

(56) References Cited

U.S. PATENT DOCUMENTS

| | | | |
|---|---|---|---|
| 5,244,035 A | 9/1993 | Iida et al. | |
| 5,258,621 A | 11/1993 | Noble | |
| 5,281,818 A * | 1/1994 | Tomita | G01J 5/34 250/338.3 |
| 5,293,928 A | 3/1994 | Iida et al. | |
| 5,453,618 A | 9/1995 | Sutton | |
| 5,528,038 A | 6/1996 | Yoshiike | |
| 5,567,052 A | 10/1996 | Yoshiike | |
| 5,585,631 A | 12/1996 | Deguchi et al. | |
| 5,629,516 A * | 5/1997 | Olbertz | H04N 3/1587 244/3.16 |
| 5,660,471 A | 8/1997 | Yoshiike | |
| 6,882,364 B1 | 4/2005 | Inuiya et al. | |
| 7,461,551 B2 | 12/2008 | Kataoka et al. | |
| 7,786,418 B2 * | 8/2010 | Taylor | F41G 7/008 244/3.1 |
| 8,451,352 B2 | 5/2013 | Hayasaka et al. | |
| 9,453,657 B2 | 9/2016 | Silawan | |
| 2002/0117621 A1 * | 8/2002 | Nakamura | H04N 5/2176 250/330 |
| 2003/0211820 A1 | 11/2003 | Tsuji et al. | |
| 2006/0072020 A1 | 4/2006 | McCutchen | |
| 2006/0207325 A1 | 9/2006 | Kataoka et al. | |
| 2010/0128152 A1 | 5/2010 | Hayasaka et al. | |
| 2010/0168923 A1 | 7/2010 | Park | |
| 2013/0144563 A1 | 6/2013 | Naumann et al. | |
| 2014/0138043 A1 * | 5/2014 | Matsumoto | F24F 1/0007 165/11.1 |
| 2015/0291036 A1 | 10/2015 | Ryu et al. | |

FOREIGN PATENT DOCUMENTS

| | | |
|---|---|---|
| JP | 03-220018 | 9/1991 |
| JP | 4-32378 | 2/1992 |
| JP | 5-118614 | 5/1993 |
| JP | 5-172636 | 7/1993 |
| JP | 05-236210 | 9/1993 |
| JP | 06-094535 | 4/1994 |
| JP | 08-075545 | 3/1996 |
| JP | 9-210702 | 8/1997 |
| JP | 10-093764 | 4/1998 |
| JP | 11-168688 | 6/1999 |
| JP | 11-182969 | 7/1999 |
| JP | 11-230832 | 8/1999 |
| JP | 2000-205945 | 7/2000 |
| JP | 2003-326936 | 11/2003 |
| JP | 2004-268792 | 9/2004 |
| JP | 2005-7923 | 1/2005 |
| JP | 2007-145214 | 6/2007 |
| JP | 2008-131291 | 6/2008 |
| JP | 2008-298665 | 12/2008 |
| JP | 2009-150699 | 7/2009 |
| JP | 2009-280017 | 12/2009 |
| JP | 2010-133692 | 6/2010 |
| JP | 2010-154493 | 7/2010 |
| JP | 2010-159887 | 7/2010 |
| JP | 2010-216688 | 9/2010 |
| KR | 10-2013-0074557 | 7/2013 |
| WO | 2011/016225 | 2/2011 |
| WO | 2011/120657 | 10/2011 |

OTHER PUBLICATIONS

Office Action dated Feb. 13, 2020 in Indian Patent Application No. 233/CHENP/2015.

\* cited by examiner

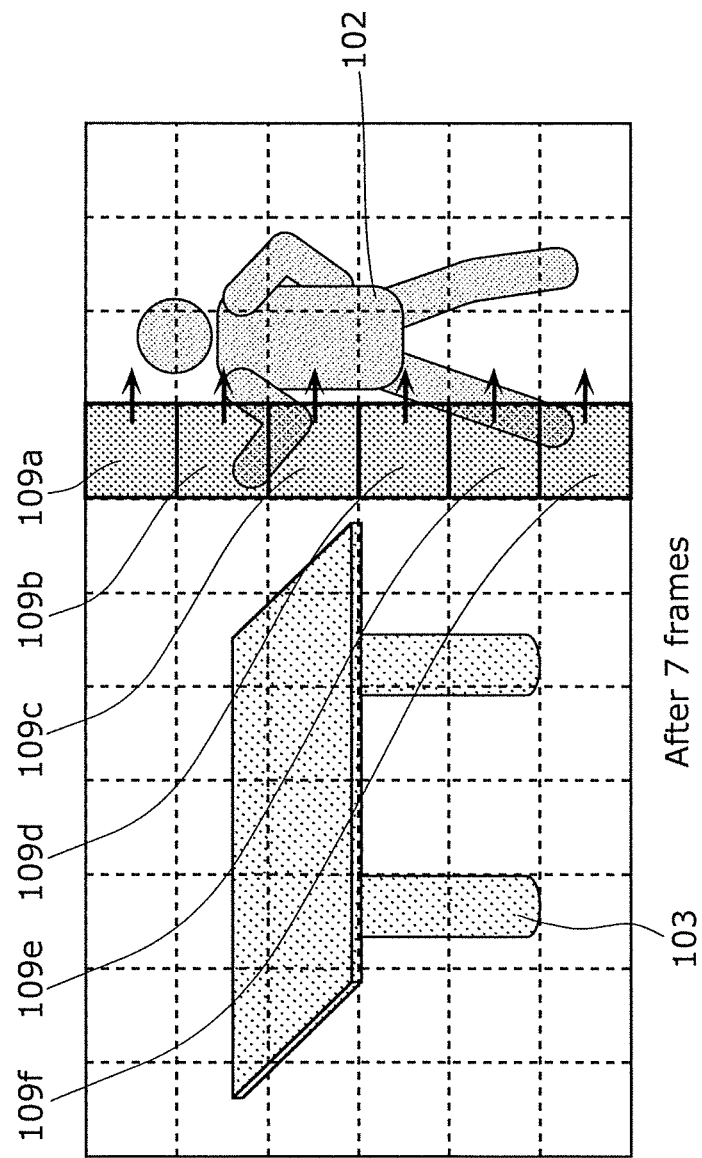

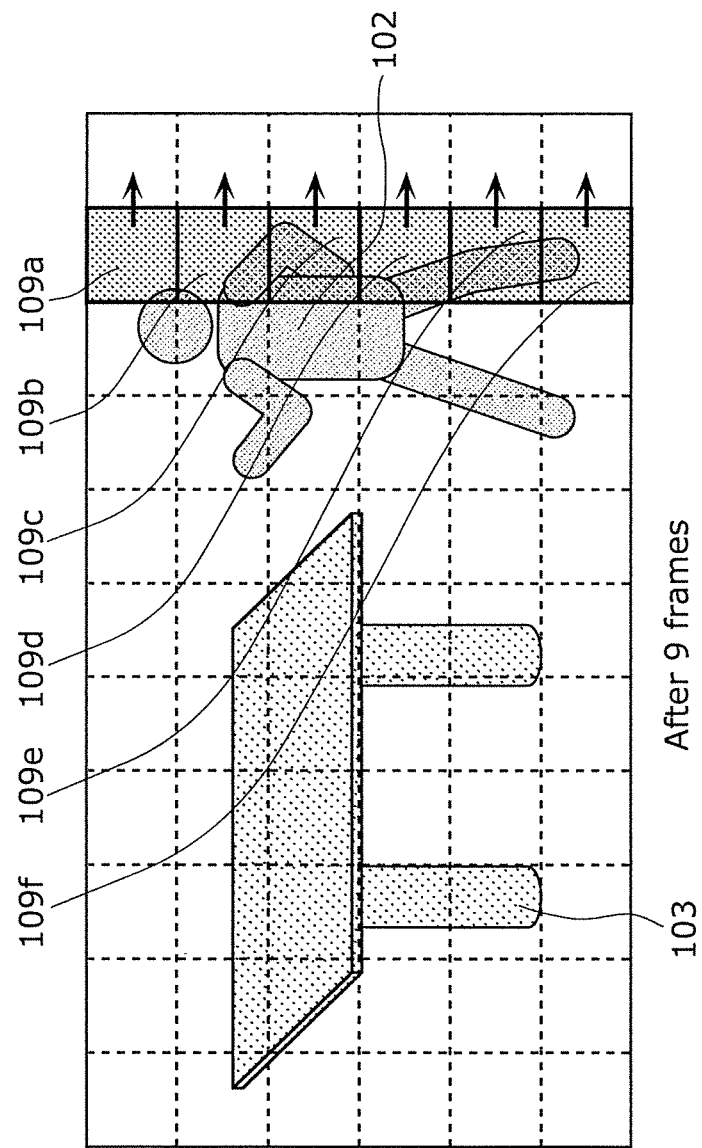

THERMAL IMAGE SENSOR AND USER INTERFACE

TECHNICAL FIELD

The present invention relates to thermal image sensors used in, for example, air conditioners.

BACKGROUND ART

Recent years have seen the development of various devices which are controlled based on data obtained from the surrounding environment using a variety of detectors. These devices use this data from the surrounding environment to provide a more comfortable living environment.

For example, a configuration in air conditioners is known which uses a temperature sensor to measure the temperature of air drawn into the air conditioner and feedback the measured temperature to the air conditioner. Air conditioners having this configuration adjust, for example, fan speed based on the feedback temperature to adjust the temperature of the room.

Known air conditioners also include those which use an infrared detector to measure an amount of activity of a person in a room, and use the measured data to provide a more comfortable air conditioning experience (for example, see Patent Literature (PTL) 1 and 2).

CITATION LIST

Patent Literature

[PTL 1] Japanese Unexamined Patent Application Publication No. 2010-133692
[PTL 2] Japanese Unexamined Patent Application Publication No. 2010-216688

SUMMARY OF INVENTION

Technical Problem

There is room for development regarding the configuration of the above-described infrared detector (thermal image sensor).

The present invention provides a thermal image sensor suitable for measuring an amount of activity.

Solution to Problem

In order to achieve this, a thermal image sensor according to one aspect of the present invention includes: a plurality of infrared detector elements that detect infrared light in a detection area; and a scanning unit configured to scan the detection area in a scanning direction to detect, with the plurality of infrared detector elements, infrared light in an area to be captured as a single thermal image, wherein the plurality of infrared detector elements include infrared detector elements arranged in mutually different positions in a predetermined direction corresponding to the scanning direction.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

One aspect of the present invention provides a thermal image sensor suitable for measuring an amount of activity.

Figure 20:
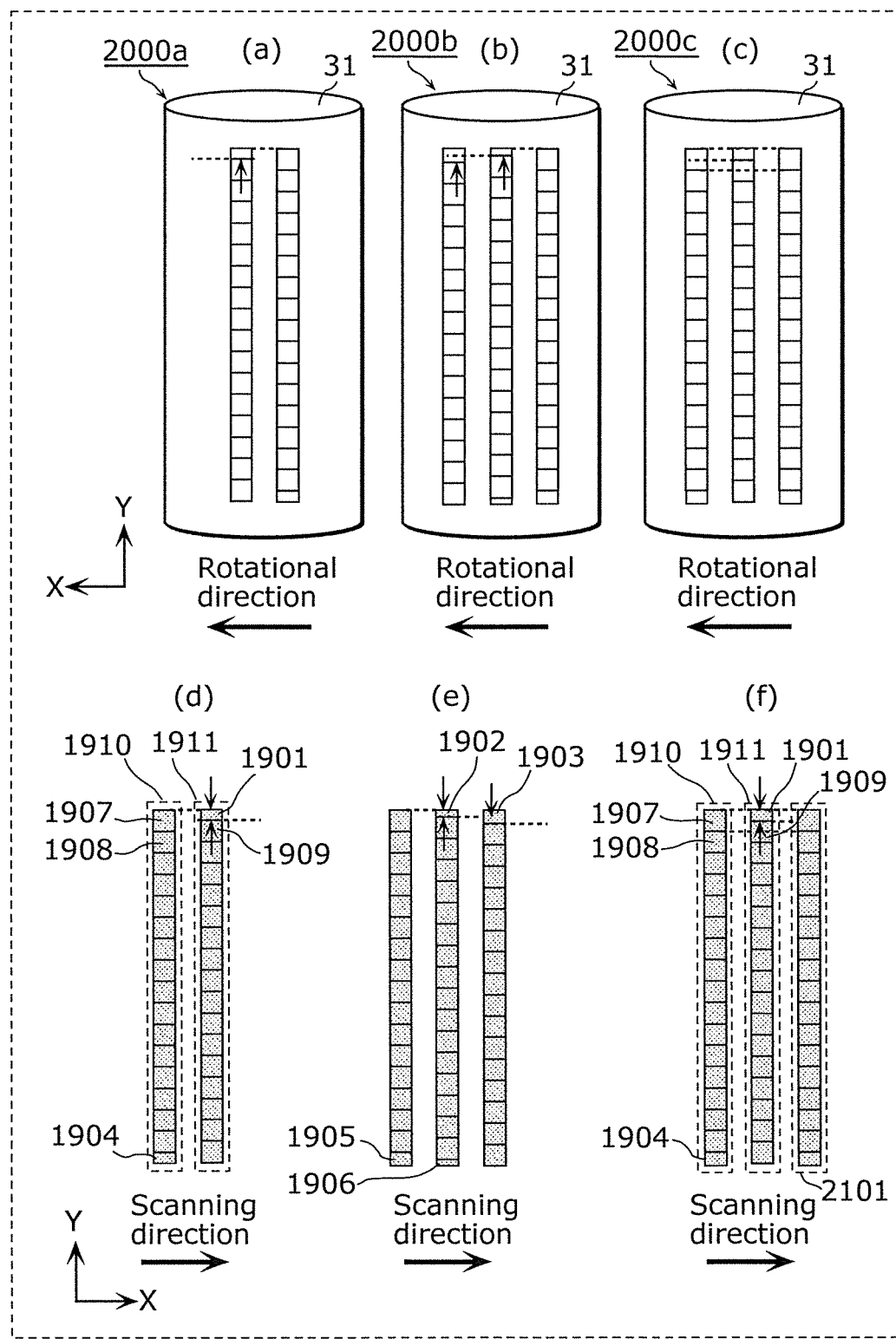

(a) through (d) in FIG. 20 illustrate the thermal image sensors according to Variation 7 of Embodiment 2, and (d) through (f) in FIG. 20 illustrate the observation areas of the thermal image sensors illustrated in (a) through (c) in FIG. 20.

Figure 21:
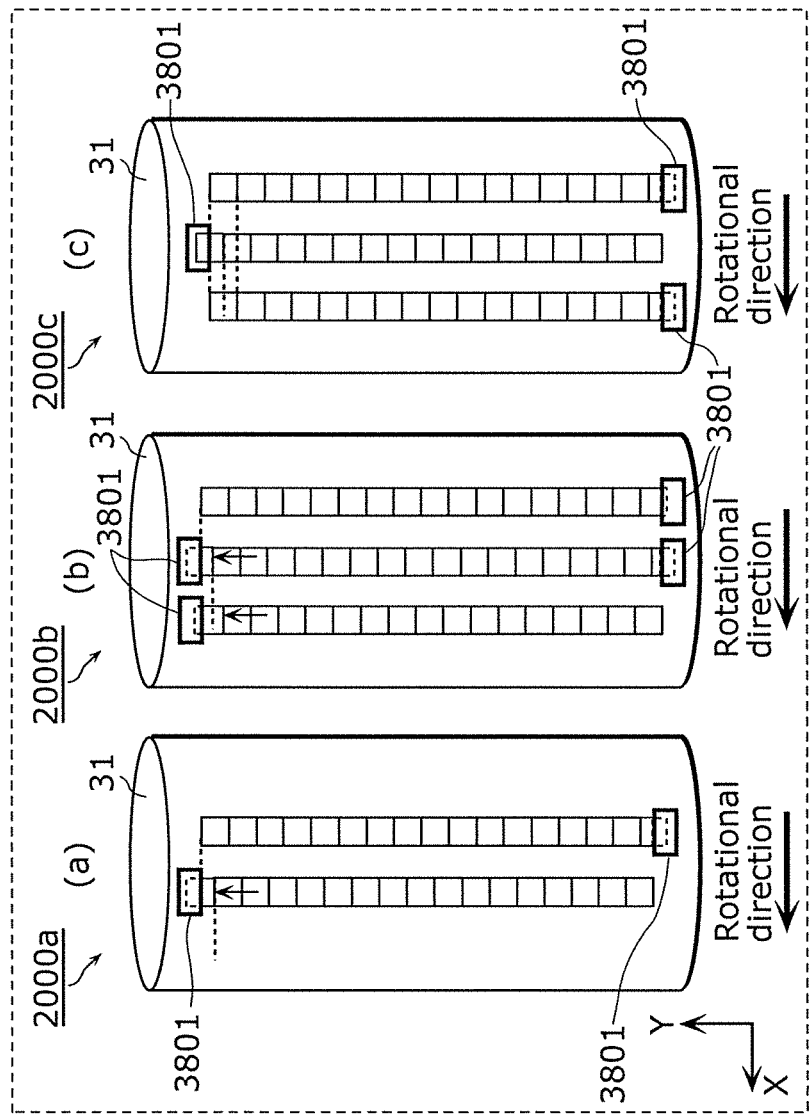

FIG. 21 illustrates an example of a method for forming partial observation pixels.

Figure 22:
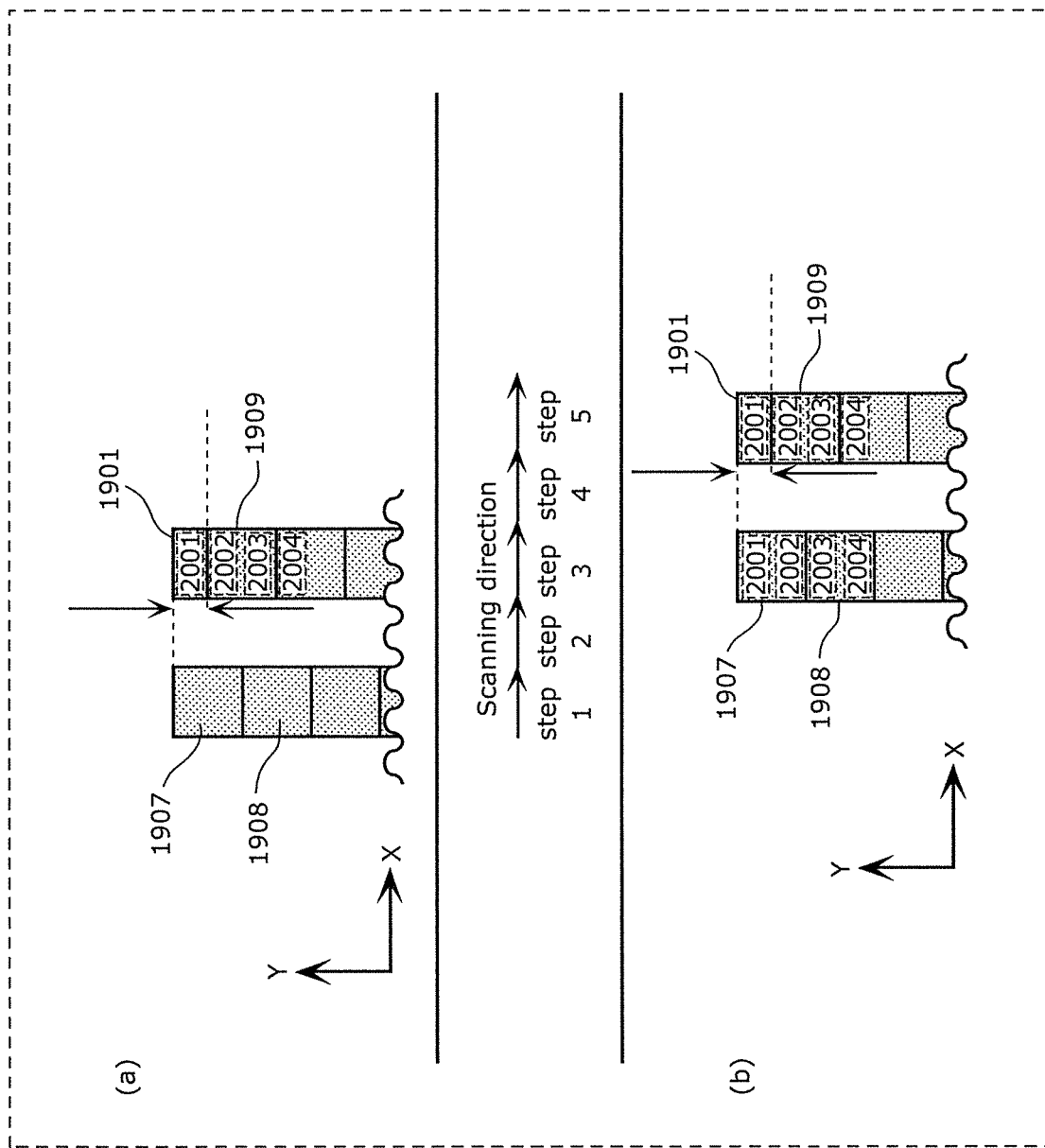

FIG. 22 illustrates a technique for achieving a high-quality image by pixel shifting.

Figure 23:
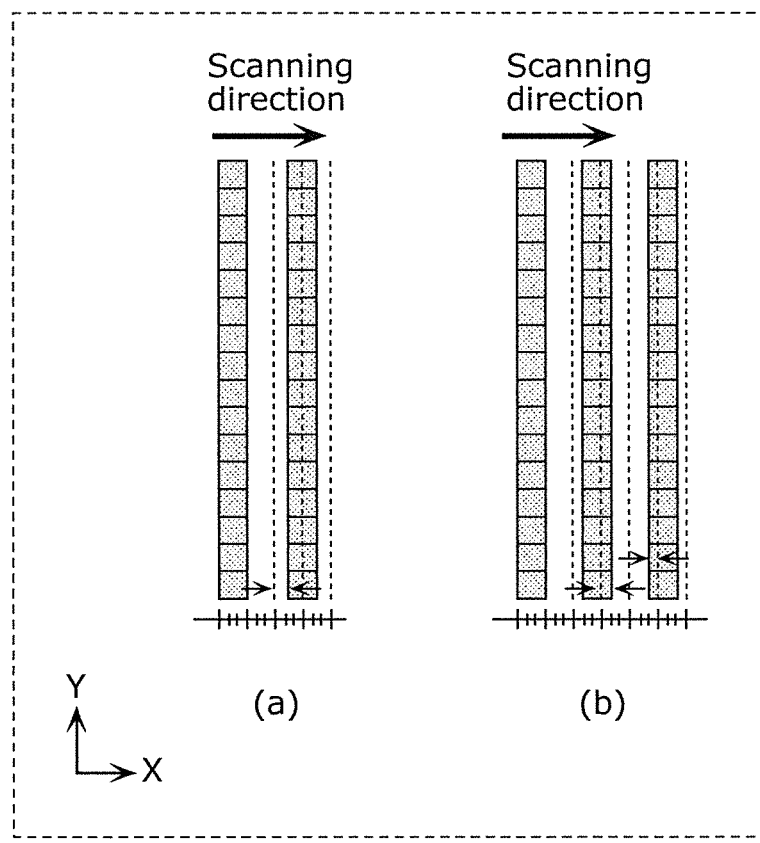

FIG. 23 illustrates an example of observation areas when photosensor element lines are shifted in the X axis direction.

Figure 24:
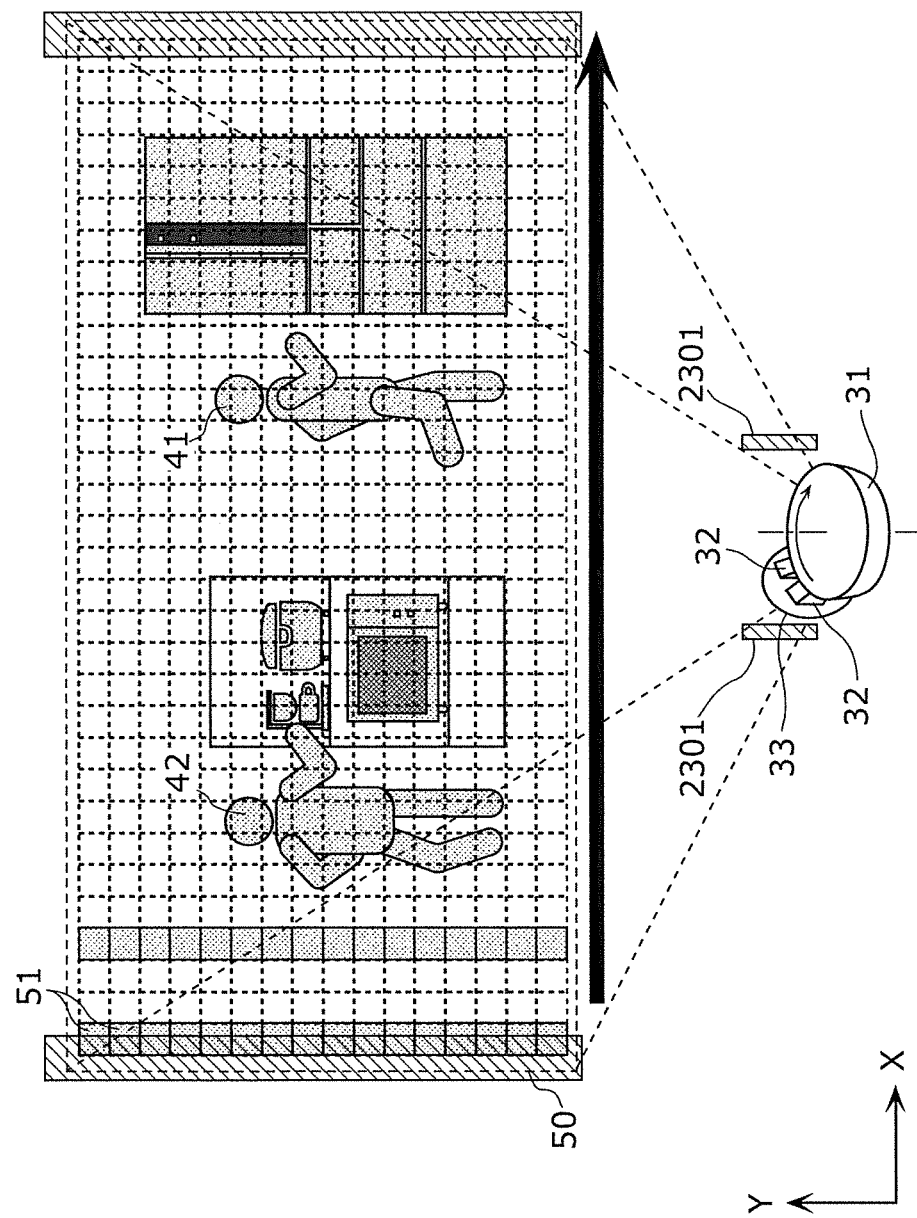

FIG. 24 illustrates a technique for achieving a high-resolution image with baffles.

Figure 25:
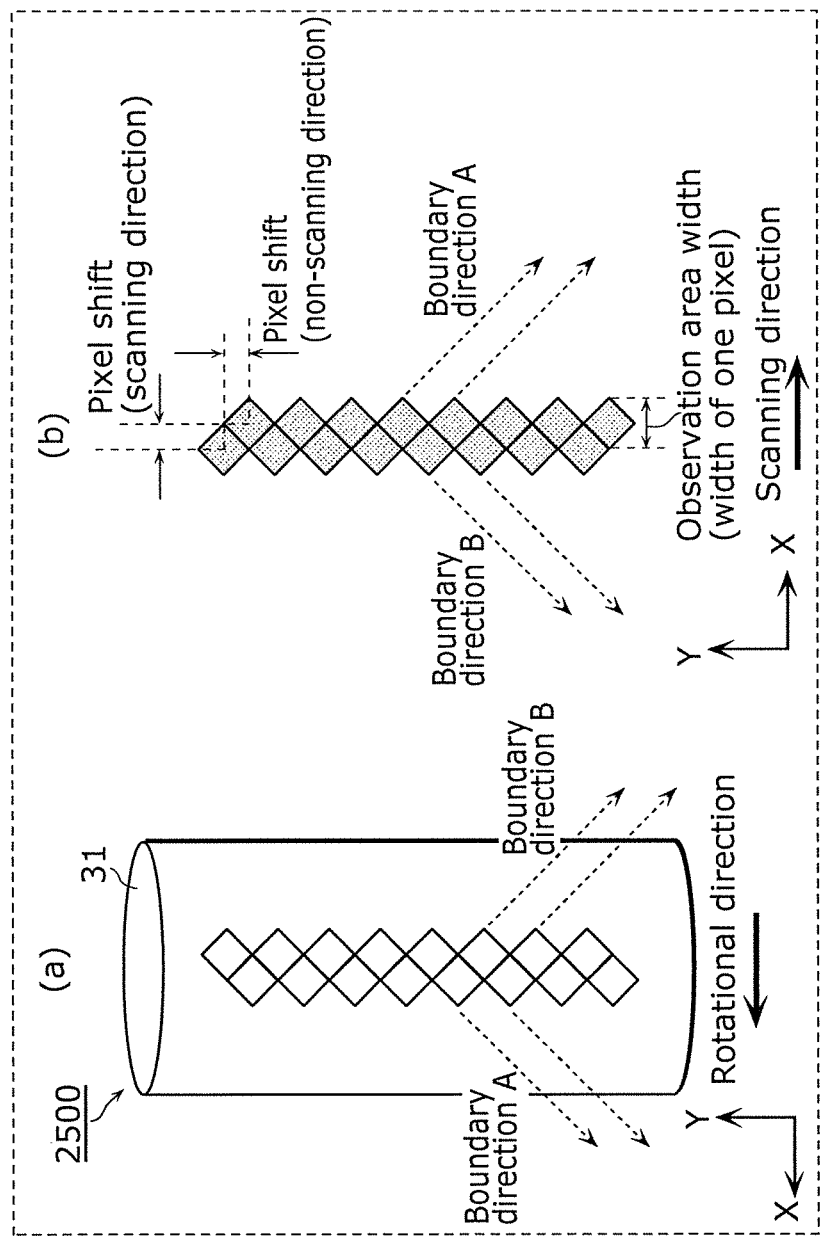

(a) in FIG. 25 illustrates the thermal image sensor according to Variation 8 of Embodiment 2, and (b) in FIG. 25 illustrates the observation area of the thermal image sensor illustrated in (a) in FIG. 25.

Figure 26:
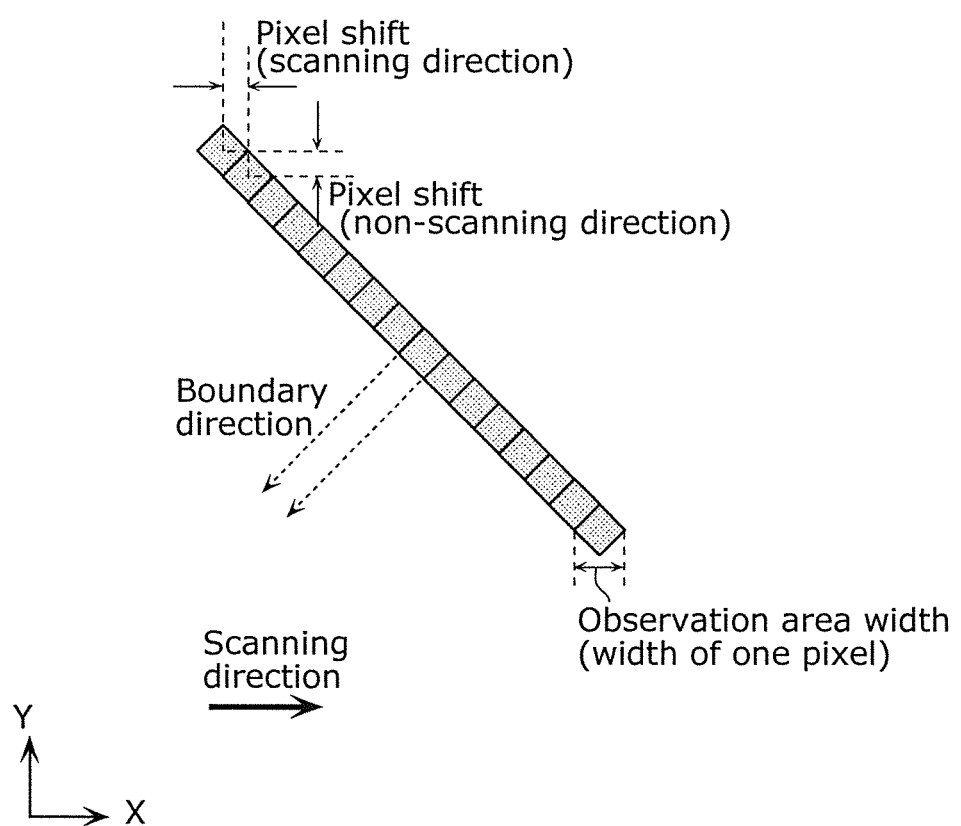

FIG. 26 illustrates an example of a different observation area according to Variation 8 of Embodiment 2.

Figure 27:
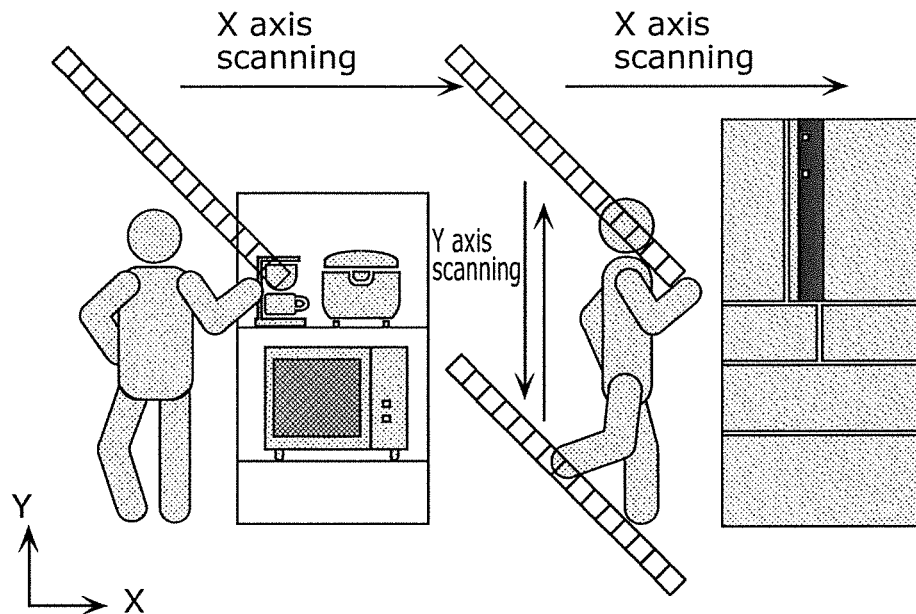

FIG. 27 illustrates scanning in the Y axis direction.

Figure 28:
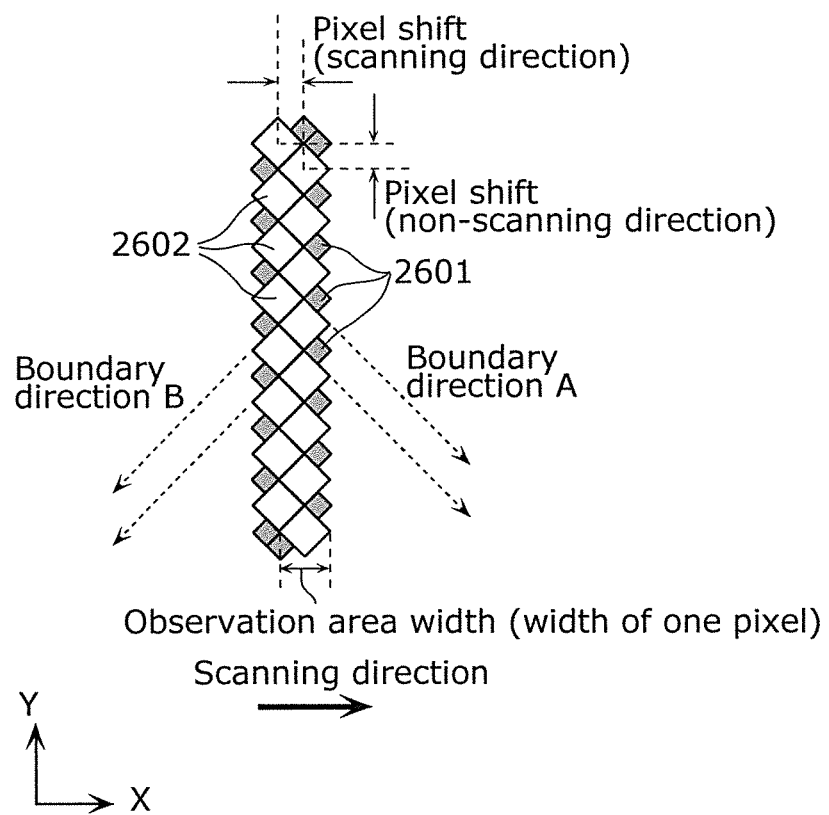

FIG. 28 illustrates an example of an observation area when two or more different sized photosensor elements are arranged in the thermal image sensor according to Variation 8.

Figure 29:
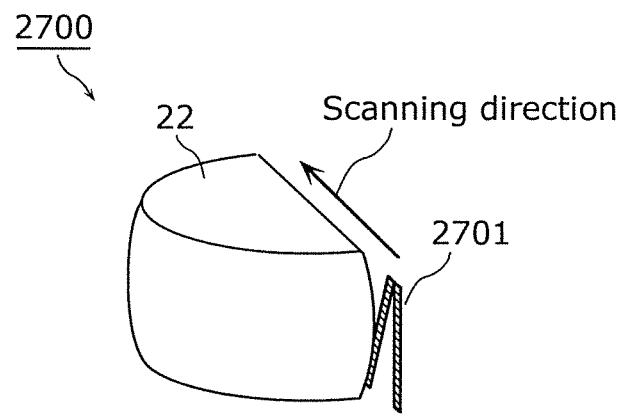

FIG. 29 illustrates an example of a thermal image sensor having a configuration in which the photosensor (photosensor elements) is caused to shift.

Figure 30:
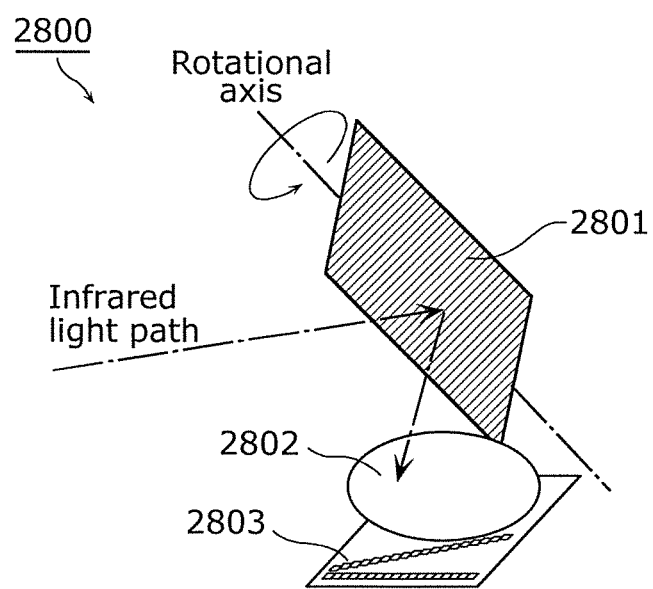

FIG. 30 illustrates an example of a thermal image sensor which performs scanning by moving a structural element other than the photosensor.

Figure 31:
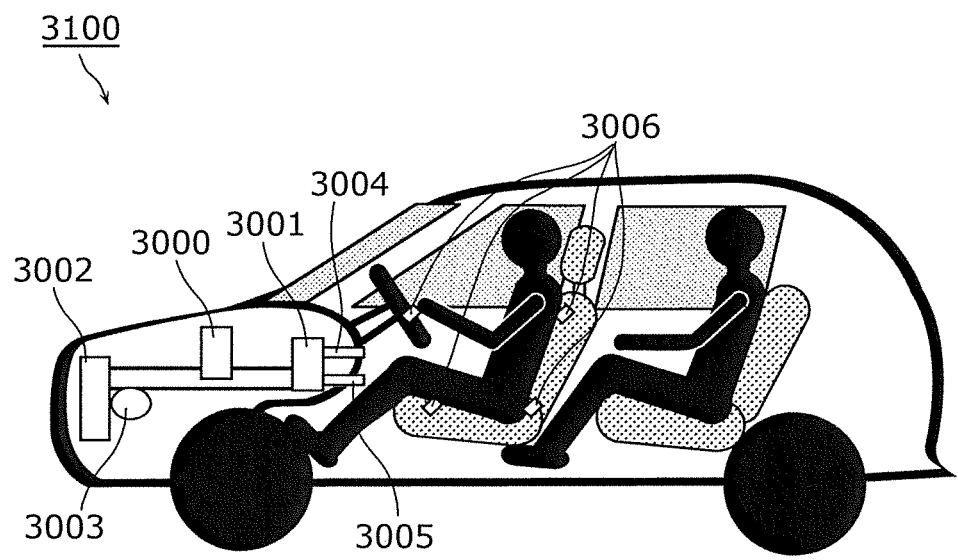

FIG. 31 illustrates a first example of the vehicle air conditioner according to Embodiment 3.

Figure 32:
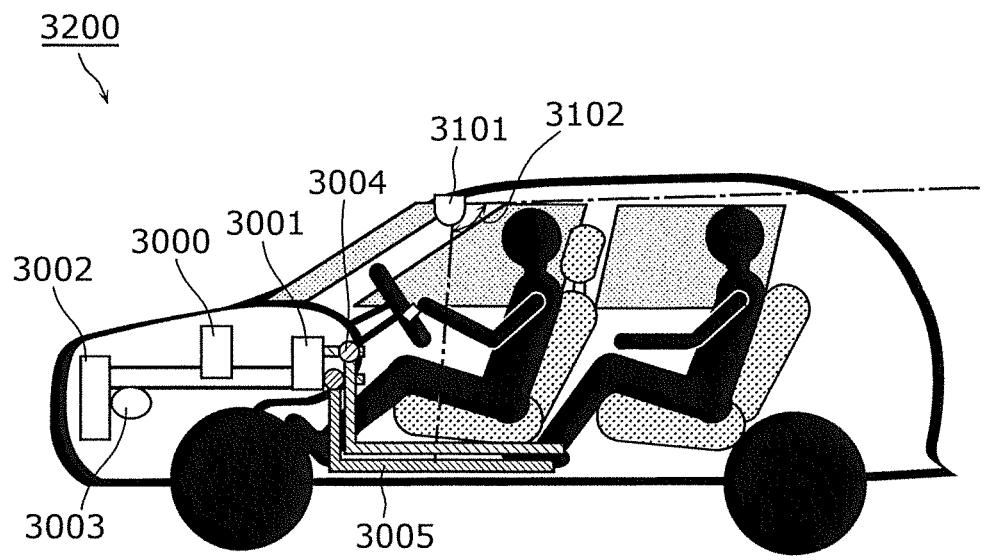

FIG. 32 illustrates a second example of the vehicle air conditioner according to Embodiment 3.

Figure 33:
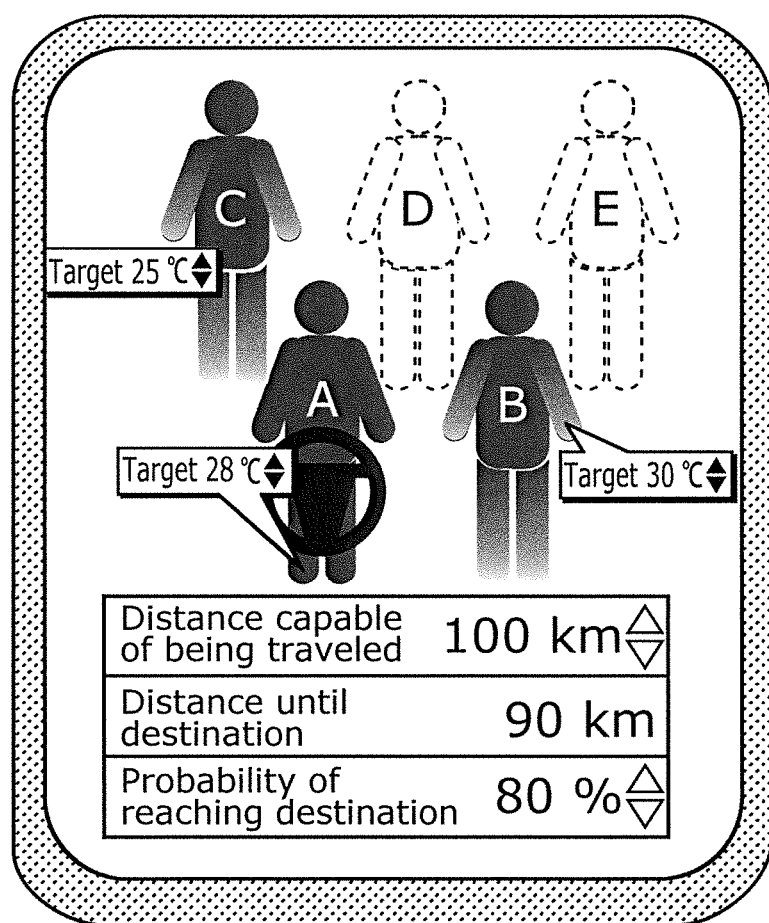

FIG. 33 illustrates an example of the user interface according to Embodiment 3.

Figure 34:
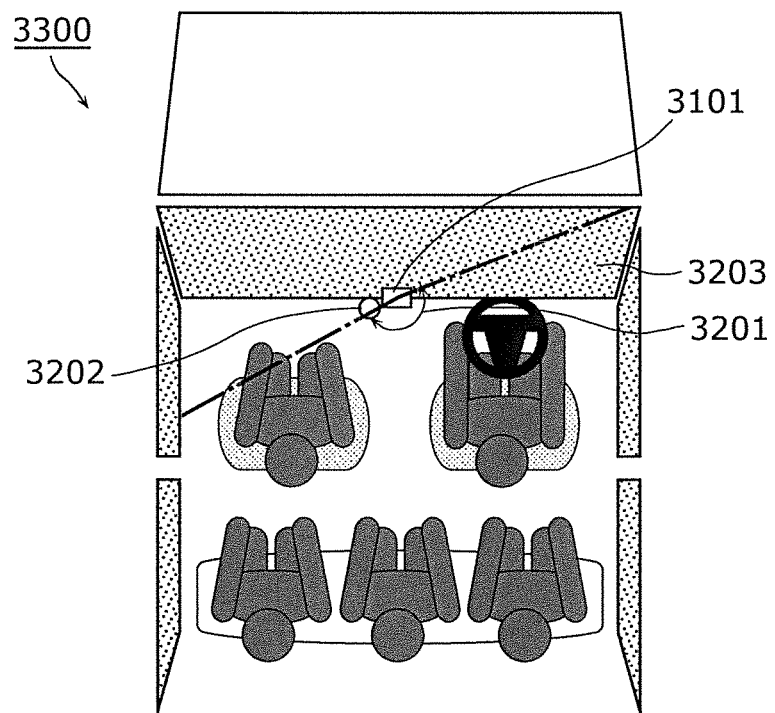

FIG. 34 illustrates a vehicle air conditioner having an observation area including the windshield.

Figure 35:
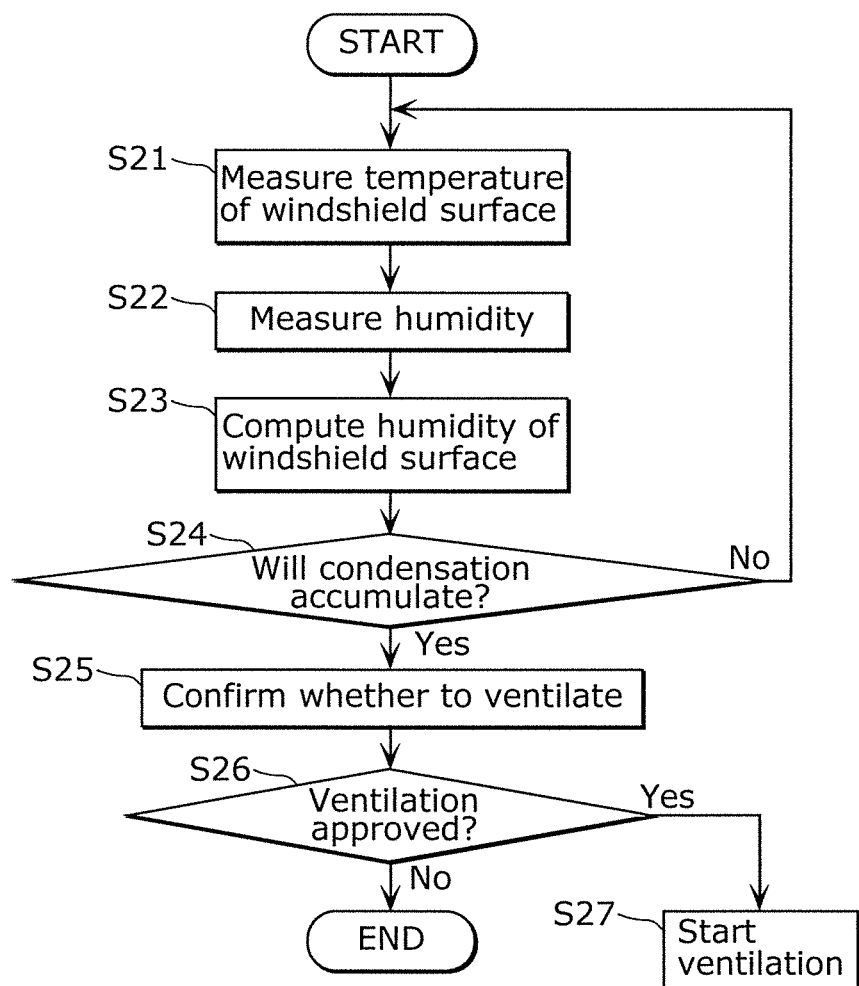

FIG. 35 is a flow chart for ventilation operation based on condensation prediction.

Figure 36:
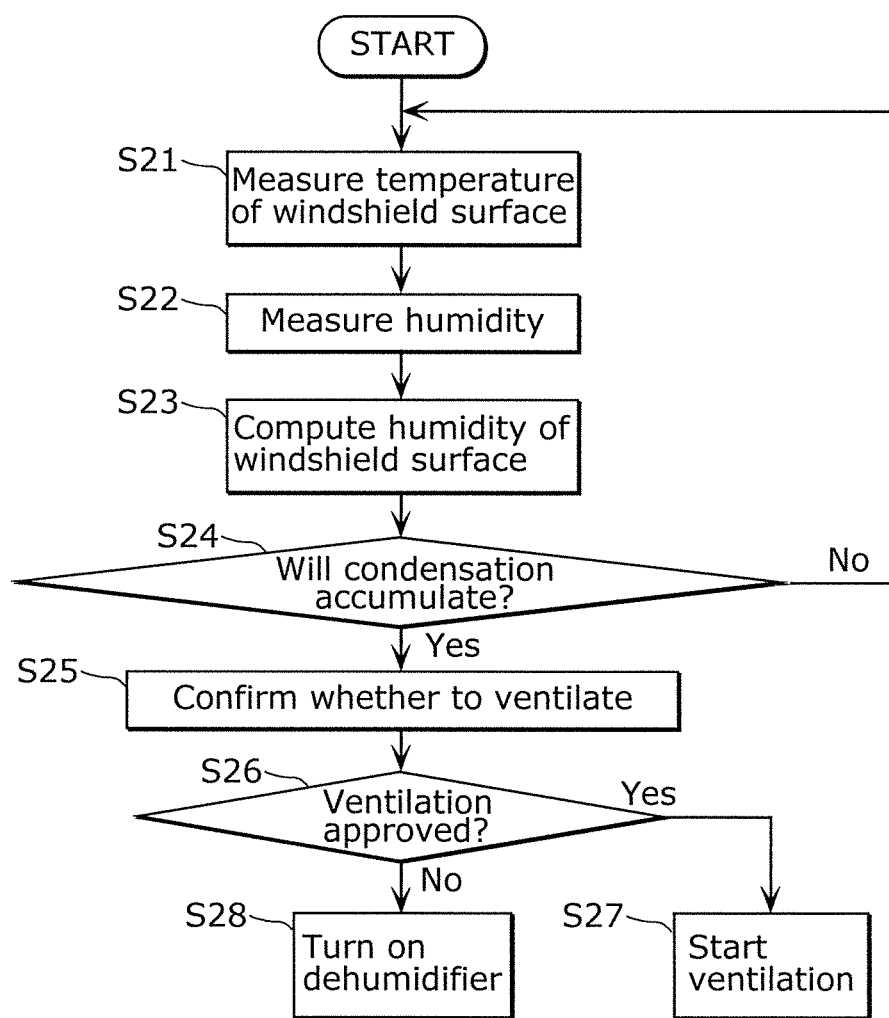

FIG. 36 is another example of a flow chart for ventilation operation based on condensation prediction.

Figure 37:
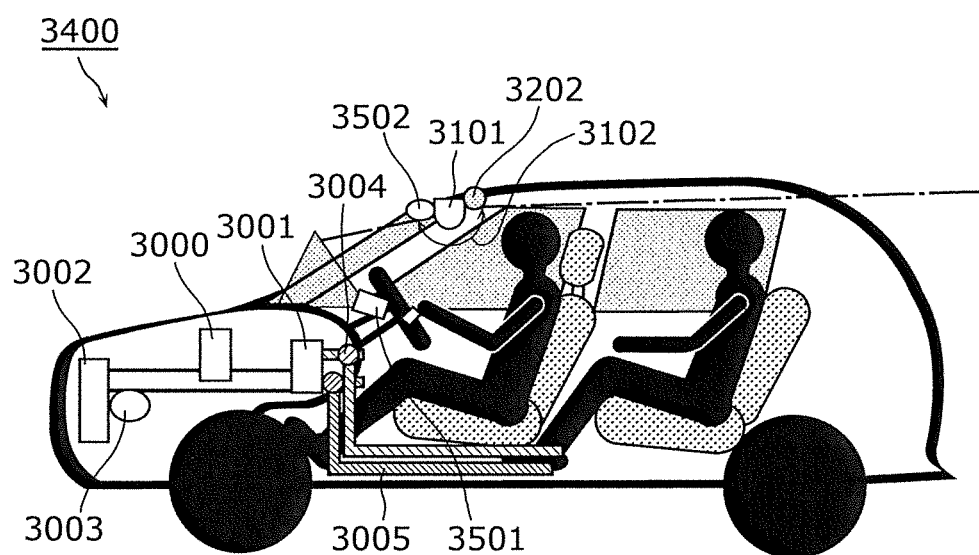

FIG. 37 illustrates a vehicle including a scattered light measurement system.

Figure 38:
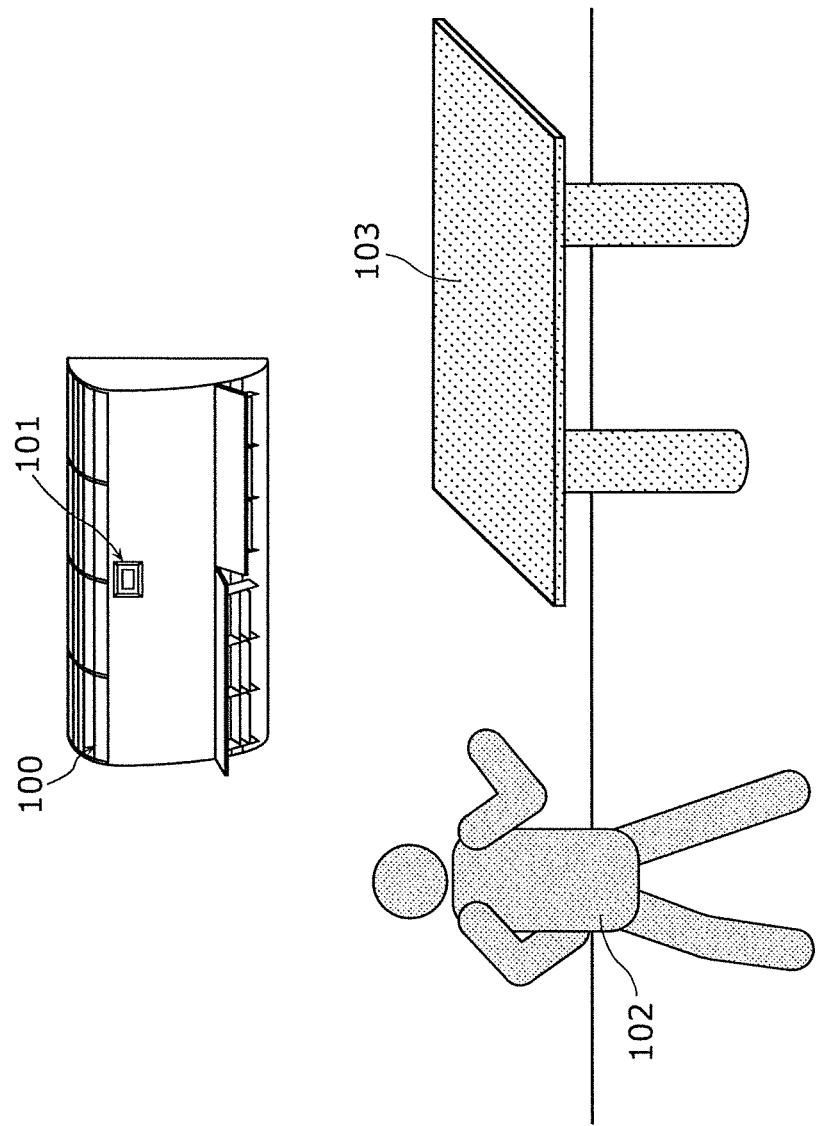

FIG. 38 is a diagrammatic view of a room in which an air conditioner including the infrared detector according to Embodiment 4 is installed.

Figure 39A:
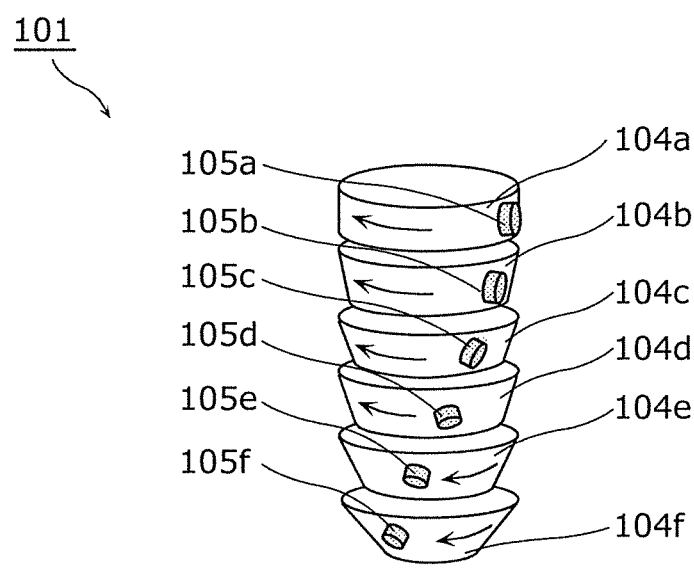

FIG. 39A is a perspective view of the infrared detector according to Embodiment 4.

Figure 39B:
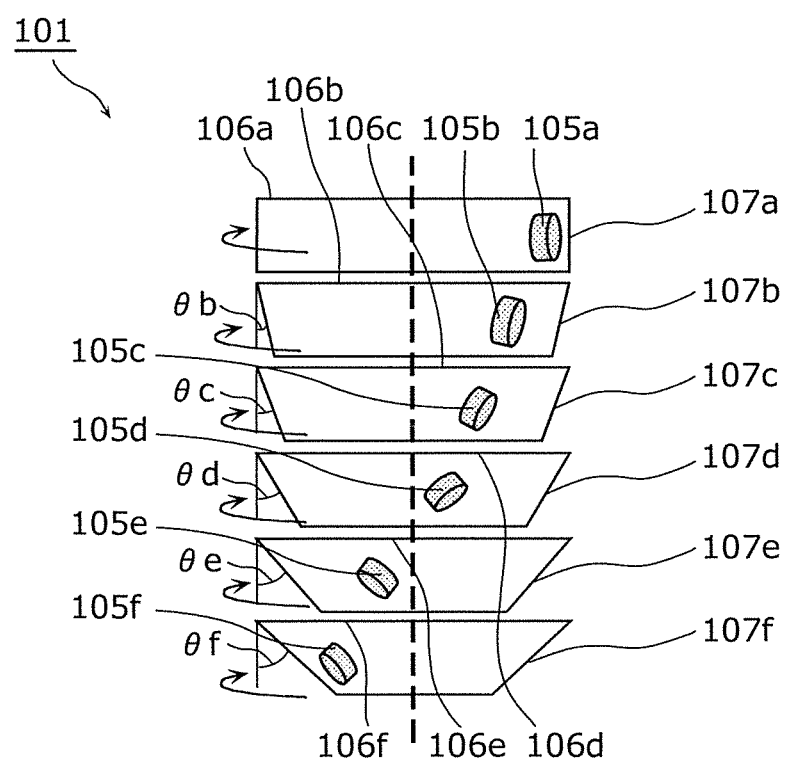

FIG. 39B is a front view of the infrared detector according to Embodiment 4.

Figure 40A:
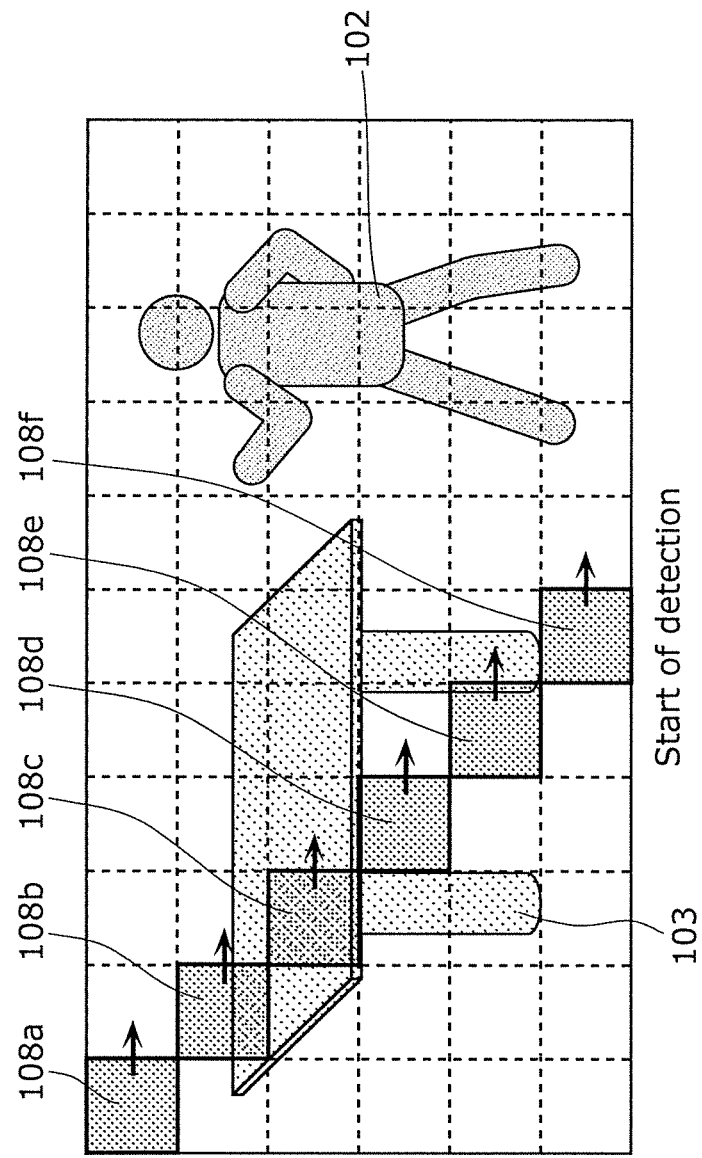

FIG. 40A is a conceptual diagram illustrating detection areas of the infrared detector according to Embodiment 4.

Figure 40B:
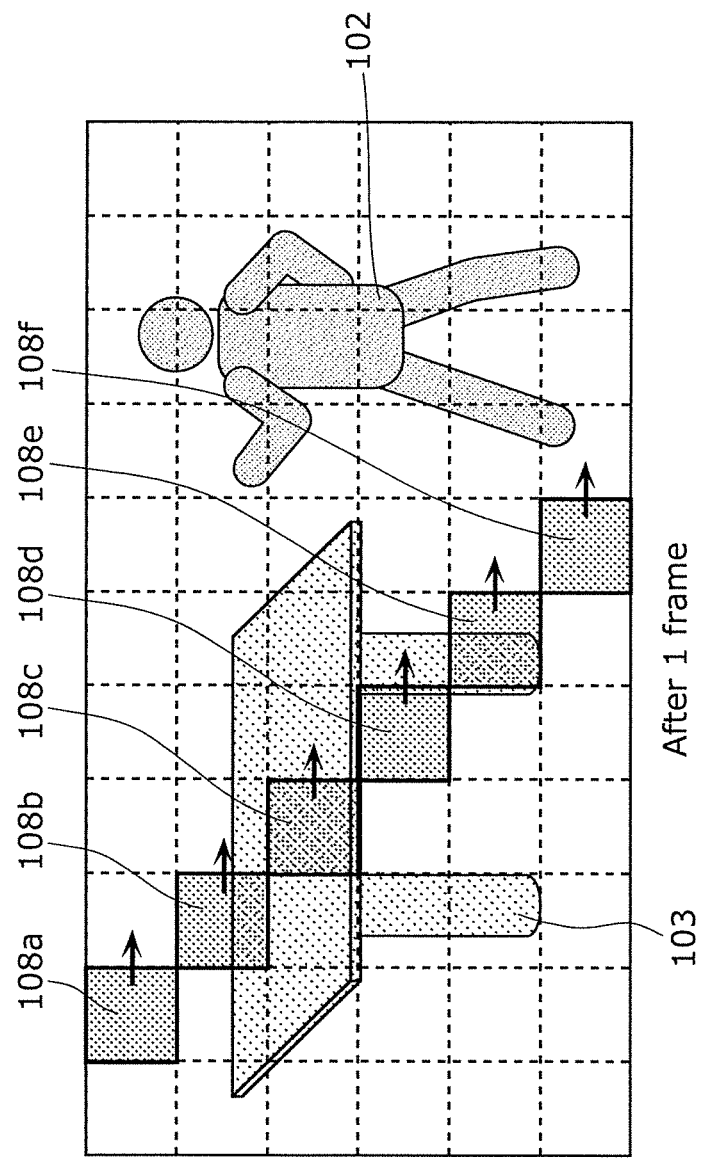

FIG. 40B is a conceptual diagram illustrating detection areas of the infrared detector according to Embodiment 4.

Figure 40C:
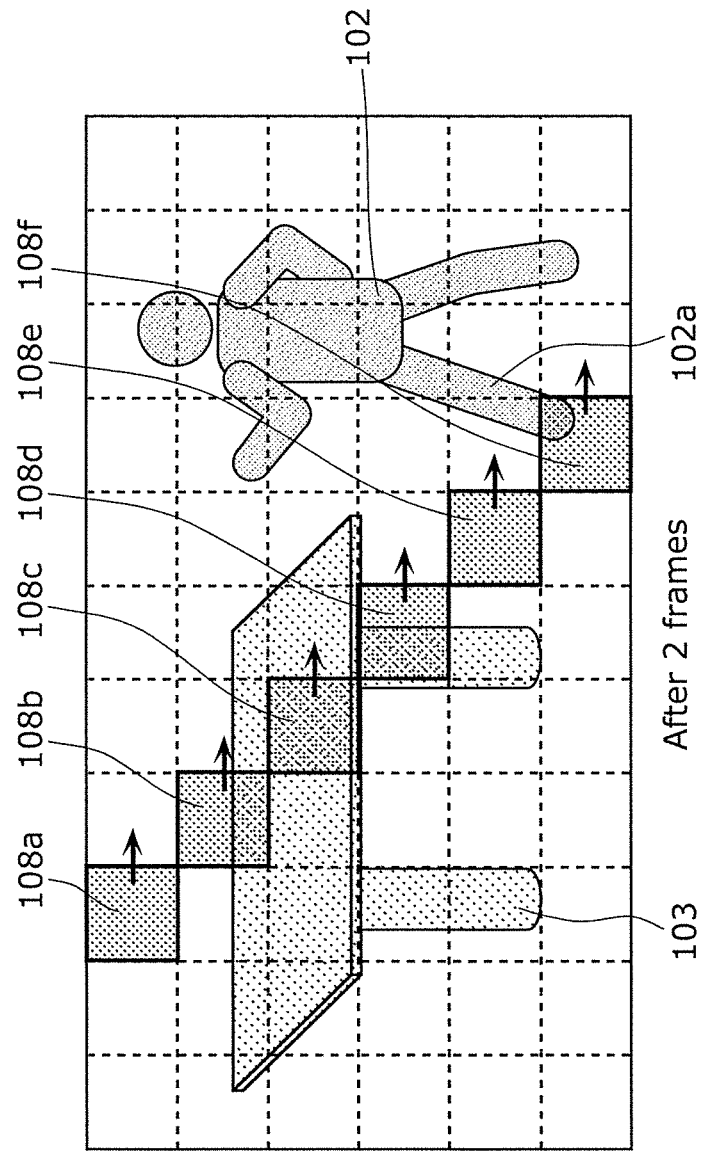

FIG. 40C is a conceptual diagram illustrating detection areas of the infrared detector according to Embodiment 4.

Figure 40D:
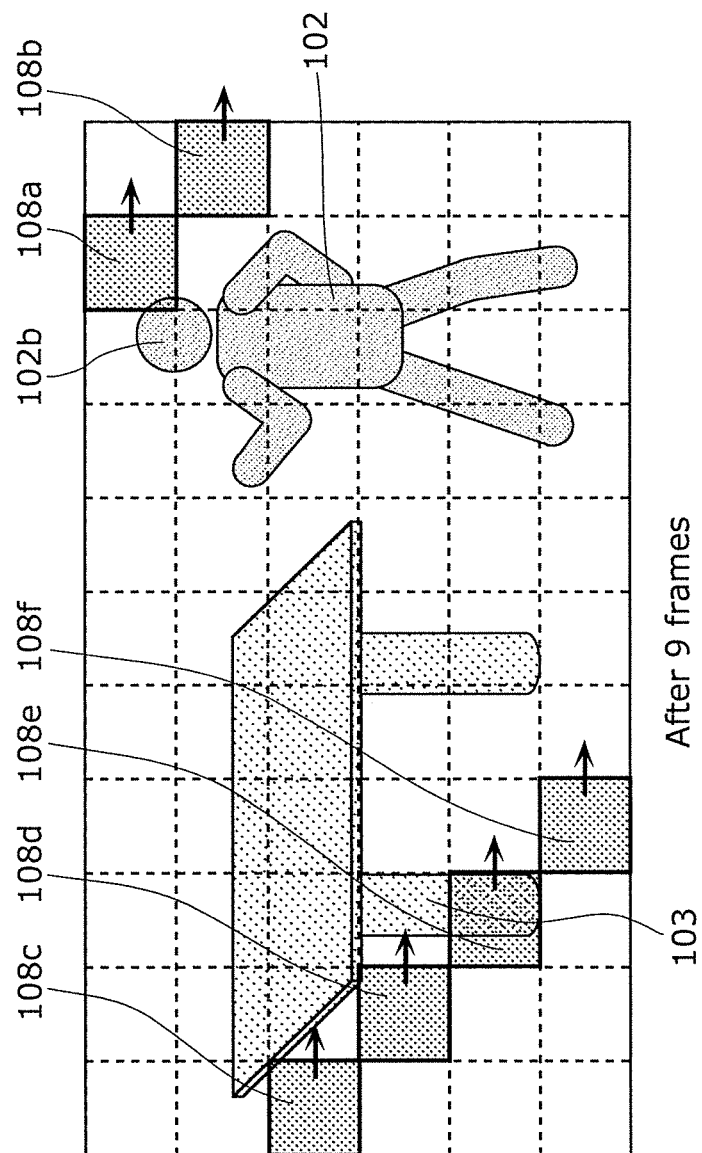

FIG. 40D is a conceptual diagram illustrating detection areas of the infrared detector according to Embodiment 4.

Figure 40E:
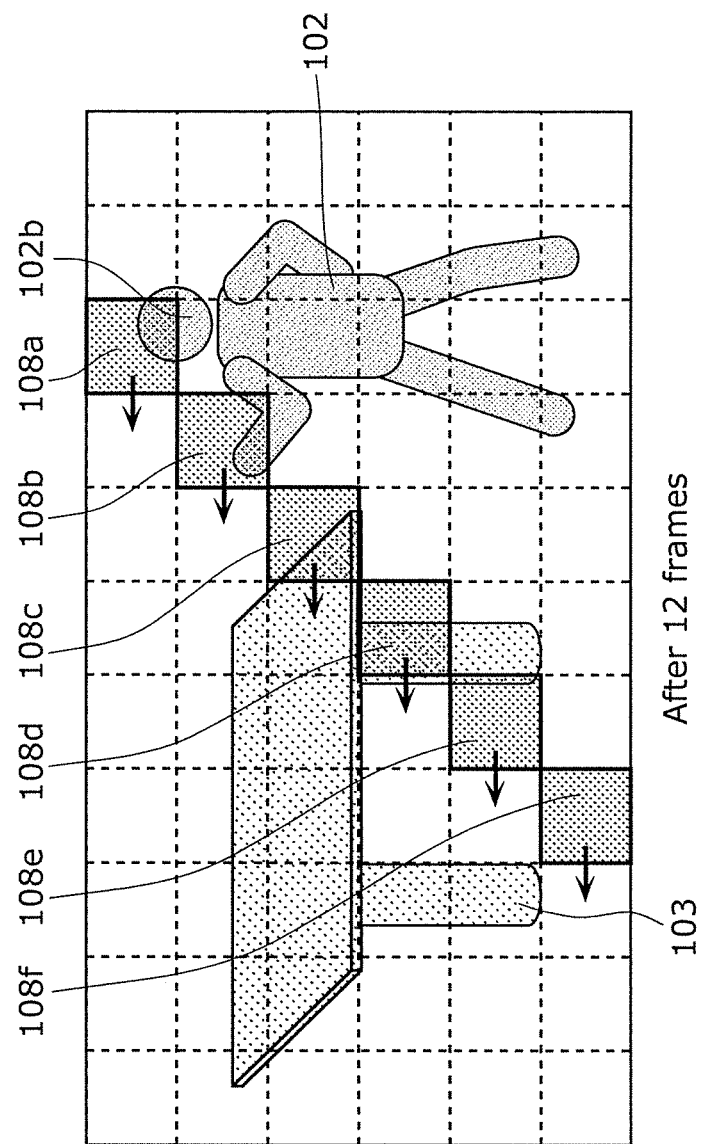

FIG. 40E is a conceptual diagram illustrating detection areas of the infrared detector according to Embodiment 4.

Figure 41:
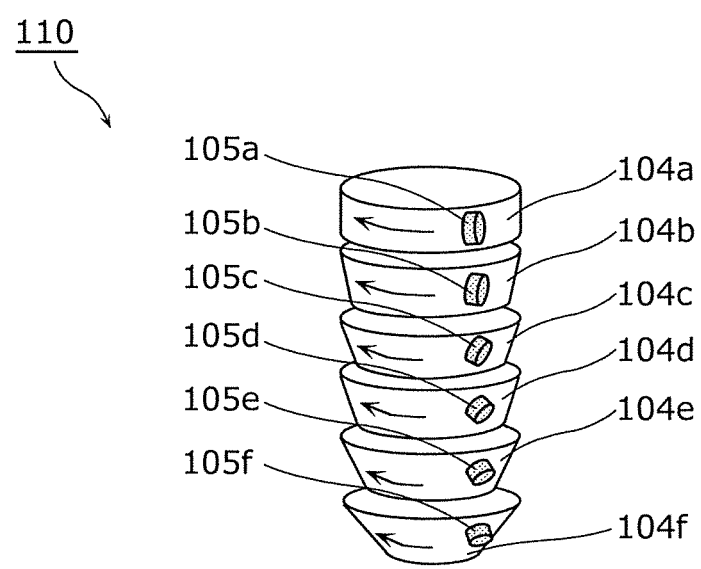

FIG. 41 is a perspective view of an infrared detector in which infrared detector elements are arranged in a straight vertical line.

Figure 42A:
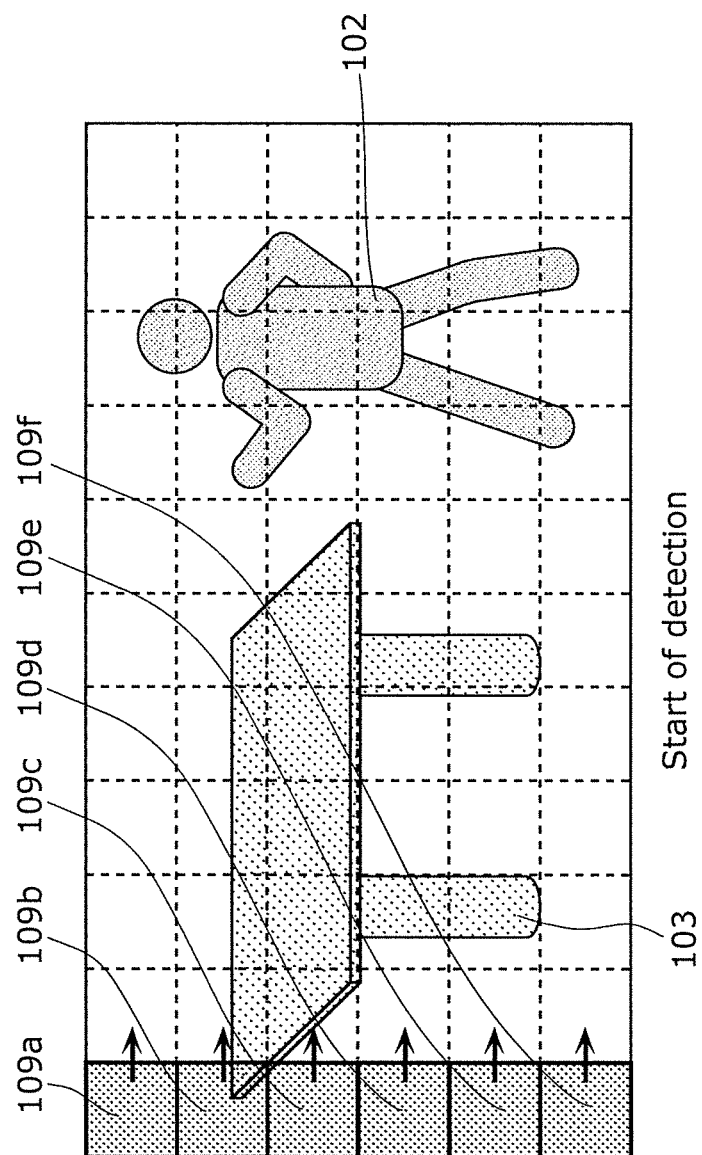

FIG. 42A is a conceptual diagram illustrating detection areas of the infrared detector illustrated in FIG. 41.

FIG. 42B is a conceptual diagram illustrating detection areas of the infrared detector illustrated in FIG. 41.

FIG. 42C is a conceptual diagram illustrating detection areas of the infrared detector illustrated in FIG. 41.

Figure 43A:
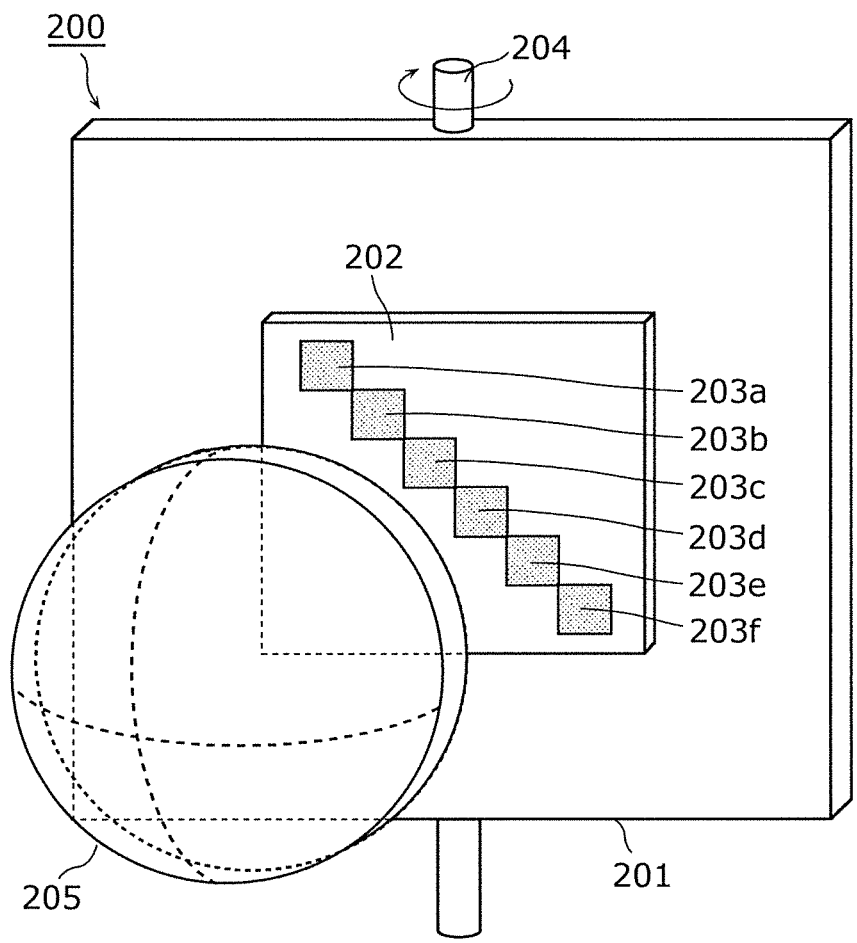

FIG. 43A is a perspective view of the infrared detector according to Variation 1 of Embodiment 4.

Figure 43B:
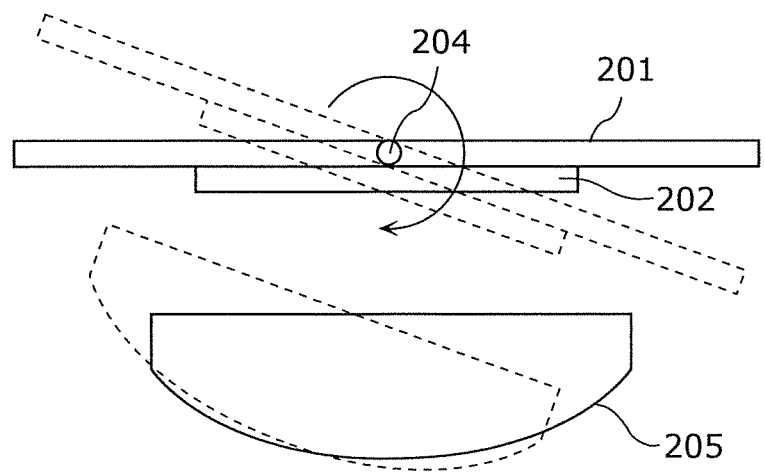

FIG. 43B is a front view of the infrared detector according to Variation 1 of Embodiment 4.

Figure 44A:
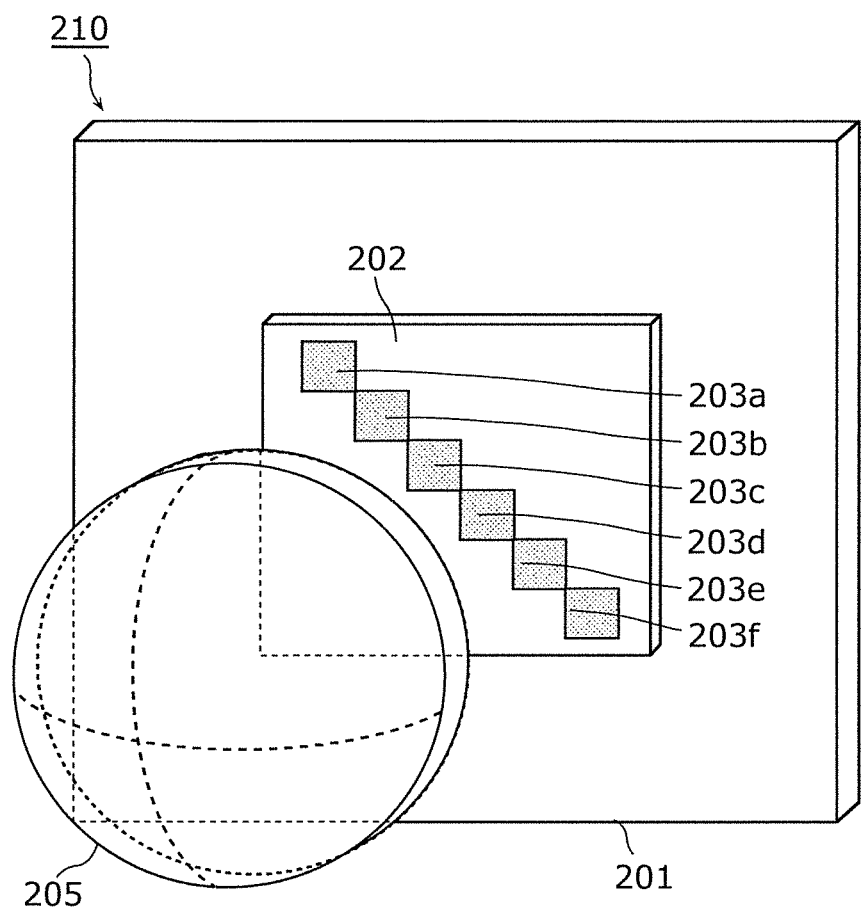

FIG. 44A is a perspective view of the infrared detector according to Variation 2 of Embodiment 4.

Figure 44B:
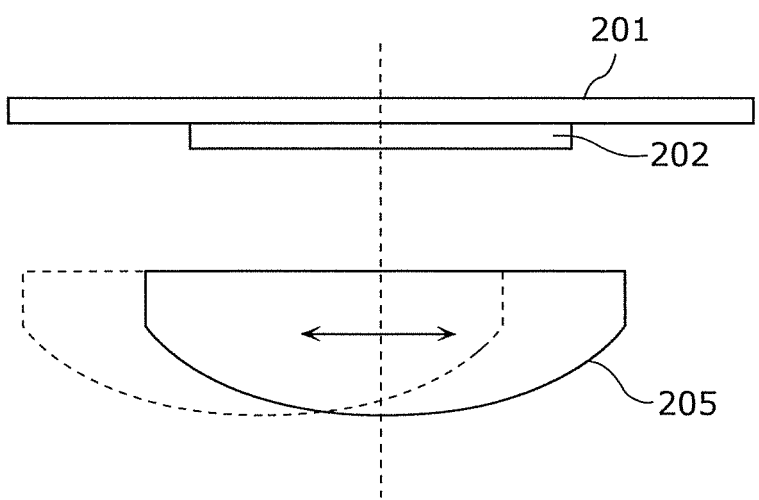

FIG. 44B is a front view of the infrared detector according to Variation 2 of Embodiment 4.

Figure 45:
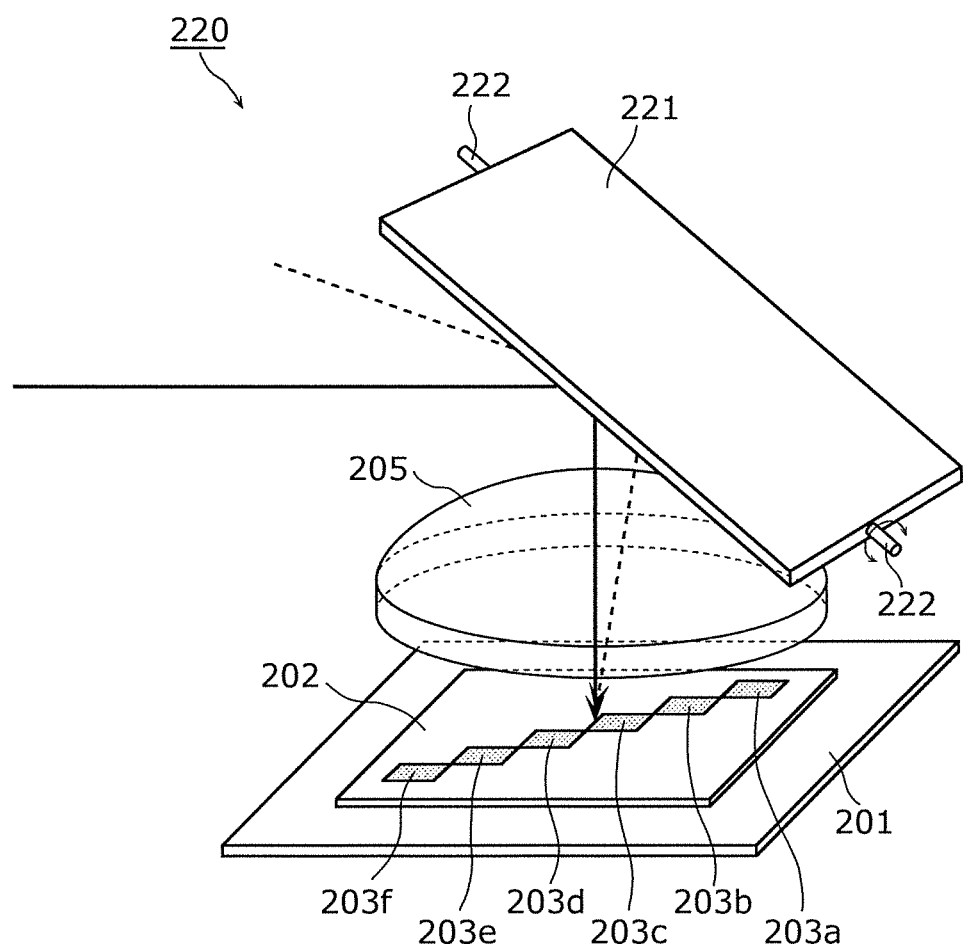

FIG. 45 is a perspective view of the infrared detector according to Variation 3 of Embodiment 4.

Figure 46:
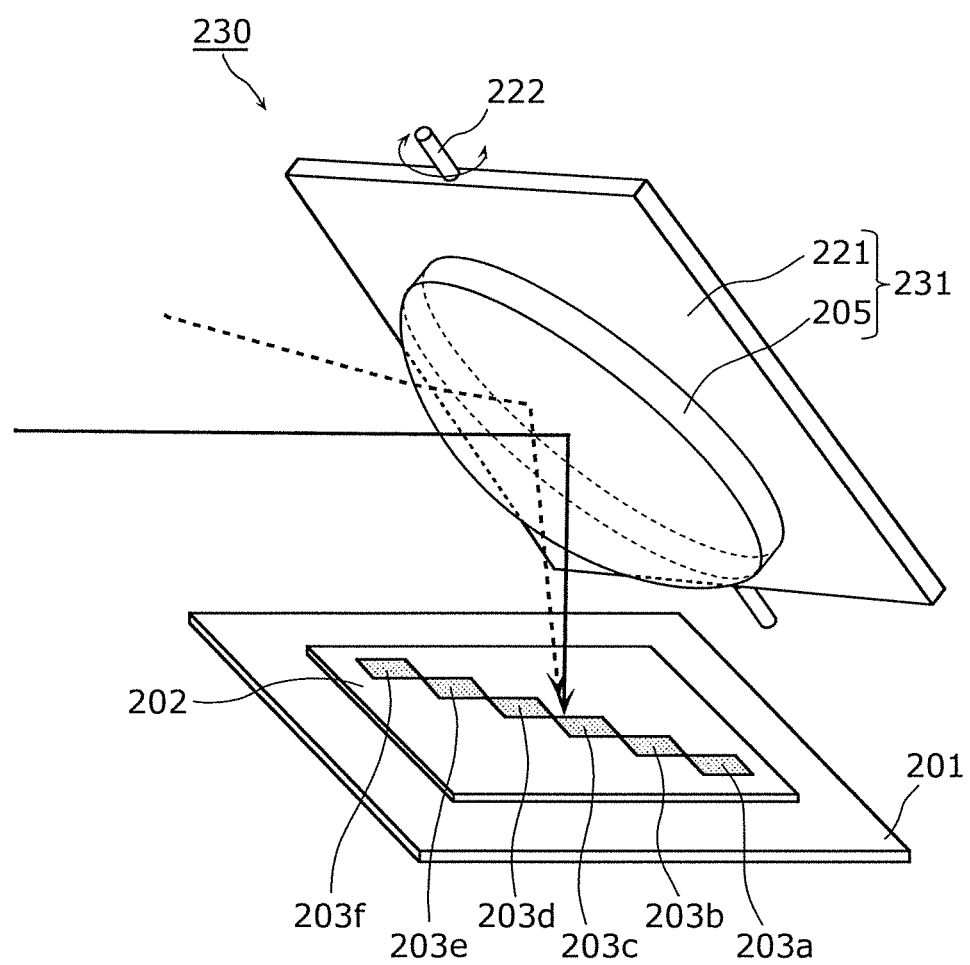

FIG. 46 is a perspective view of an infrared detector in which an imaging lens is attached to a mirror.

Figure 47:
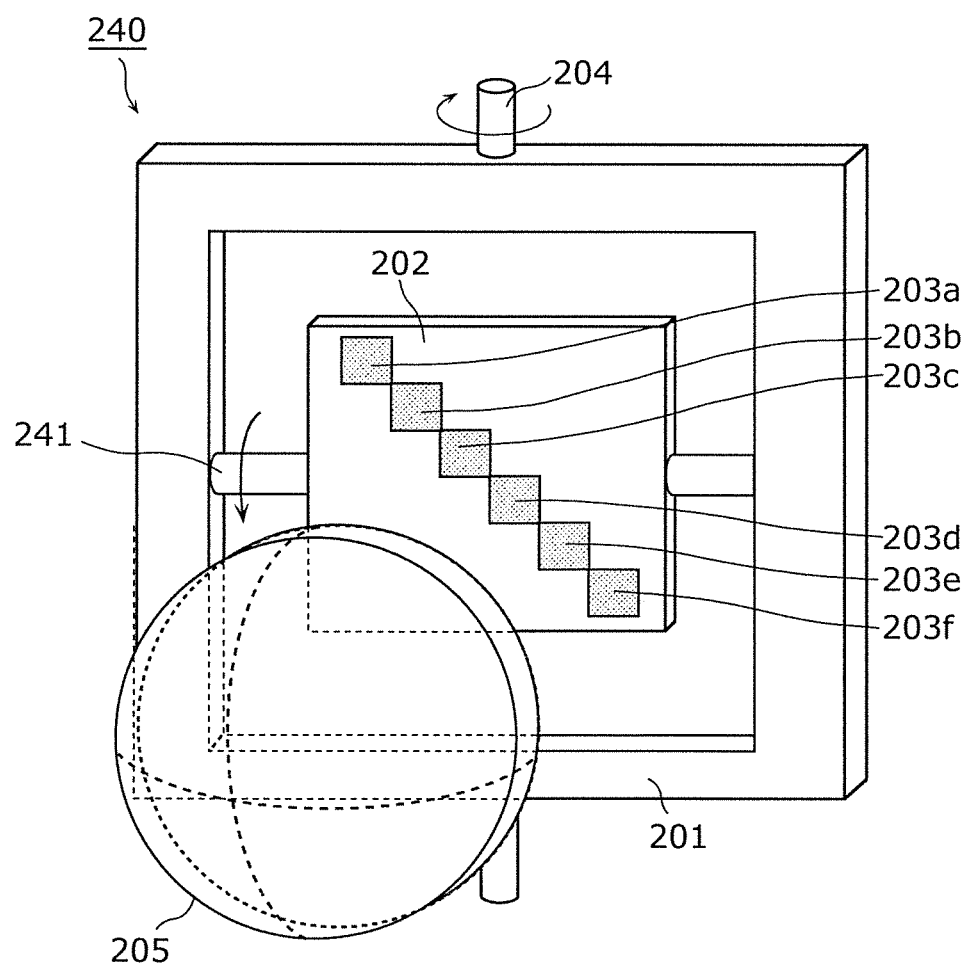

FIG. 47 is a perspective view of the infrared detector according to Variation 4 of Embodiment 4.

Figure 48A:
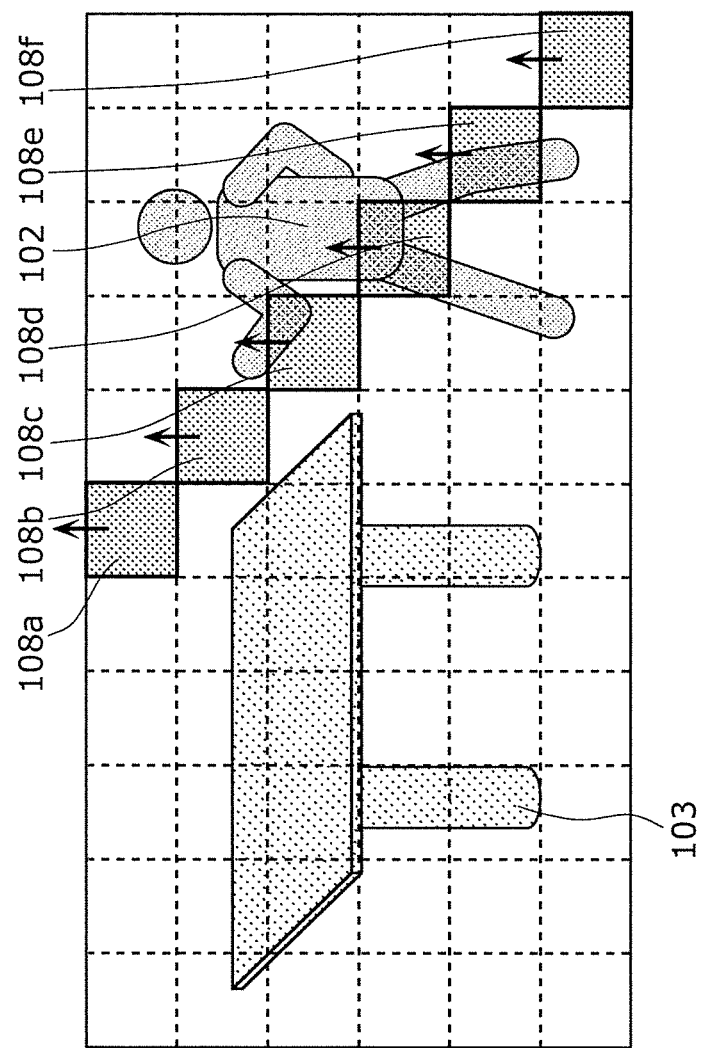

FIG. 48A is a conceptual diagram illustrating detection areas when vertical scanning is performed.

Figure 48B:
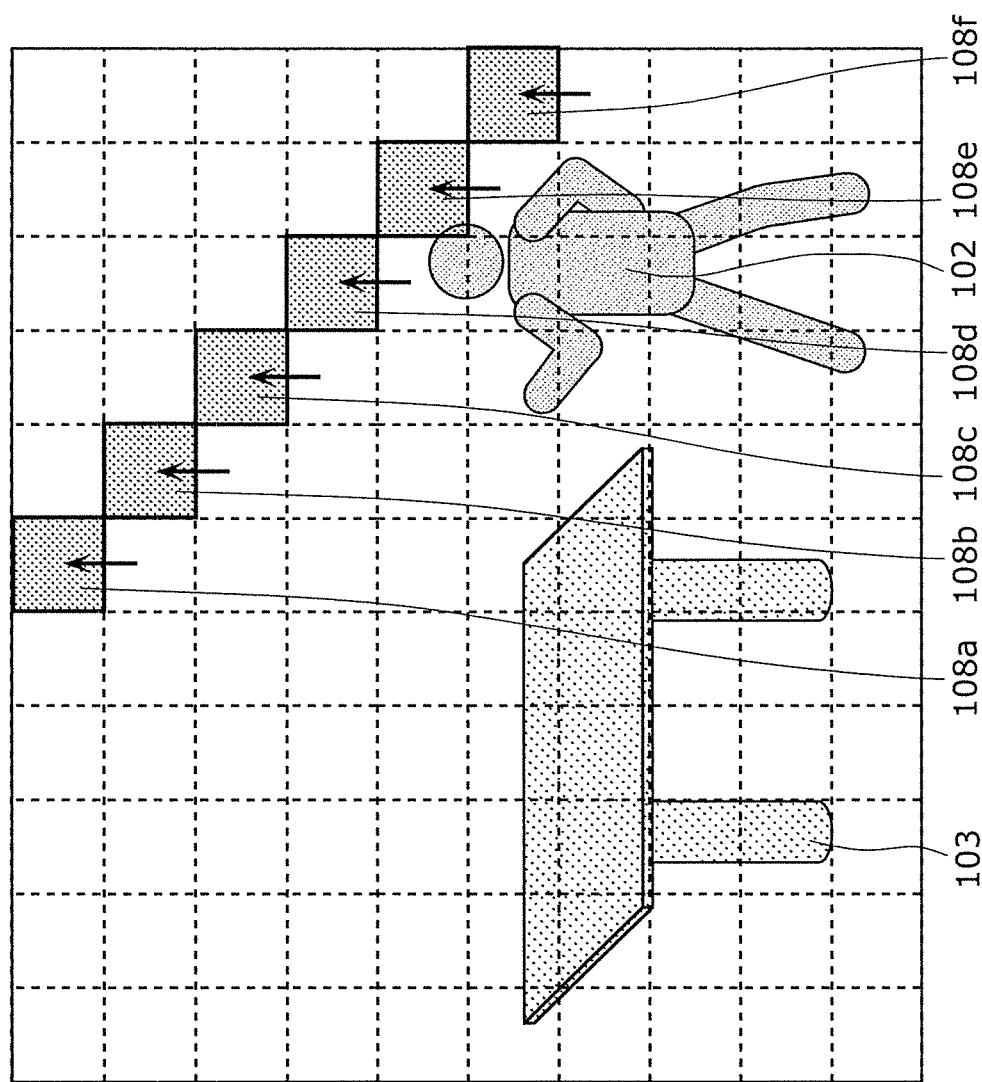

FIG. 48B is a conceptual diagram illustrating detection areas when vertical scanning is performed.

Figure 48C:
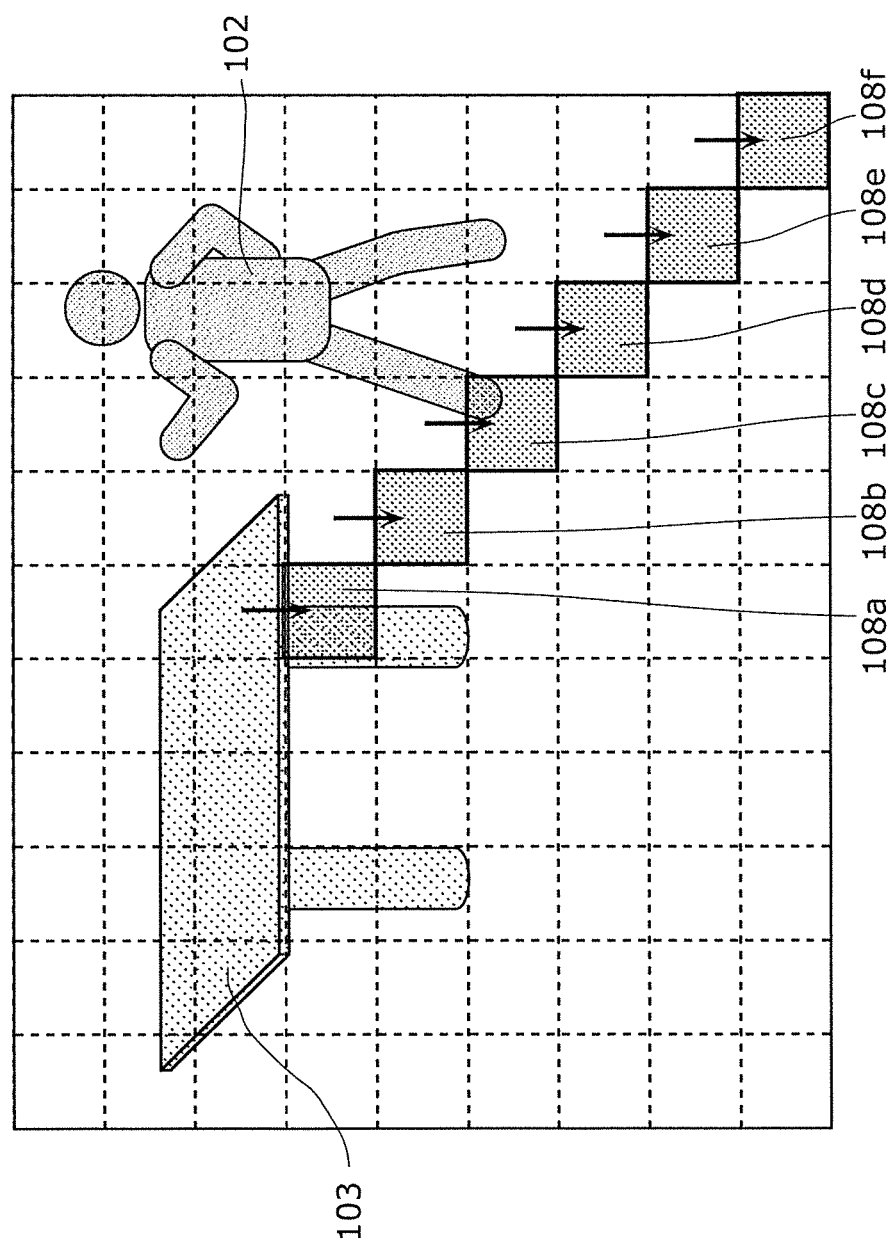

FIG. 48C is a conceptual diagram illustrating detection areas when vertical scanning is performed.

Figure 49:
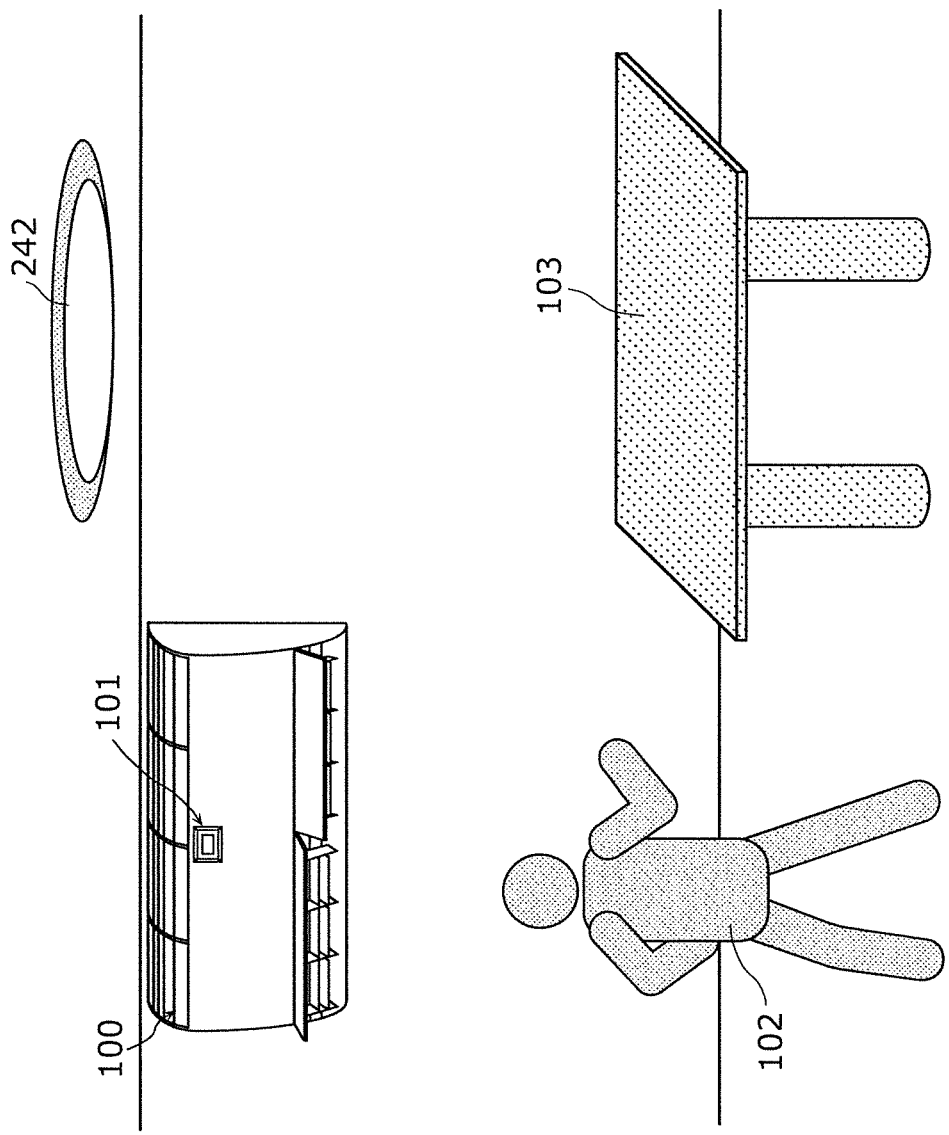

FIG. 49 illustrates an example where a light is a detection target.

Figure 50:
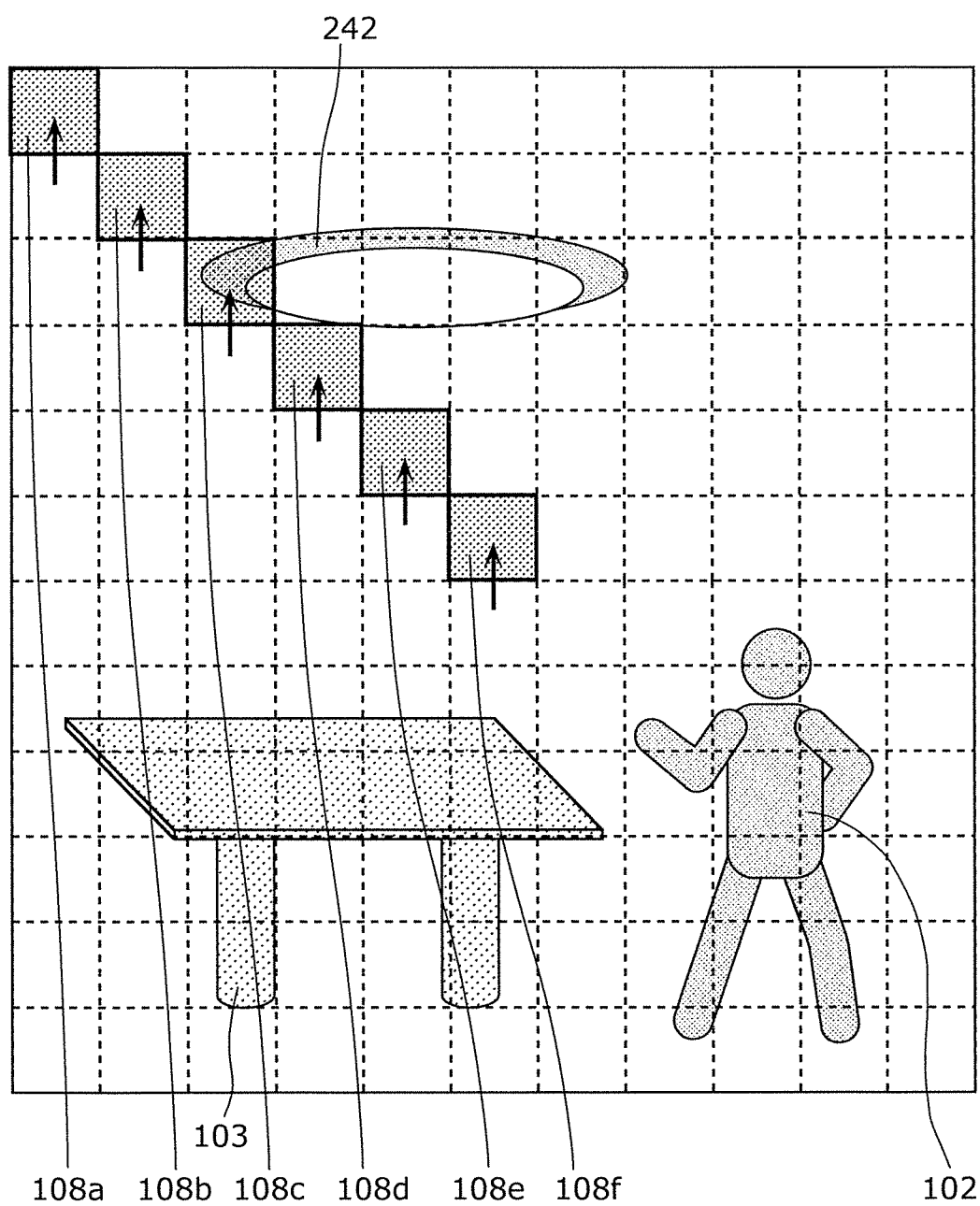

FIG. 50 is a conceptual diagram of detection areas when a light is detected.

Figure 51A:
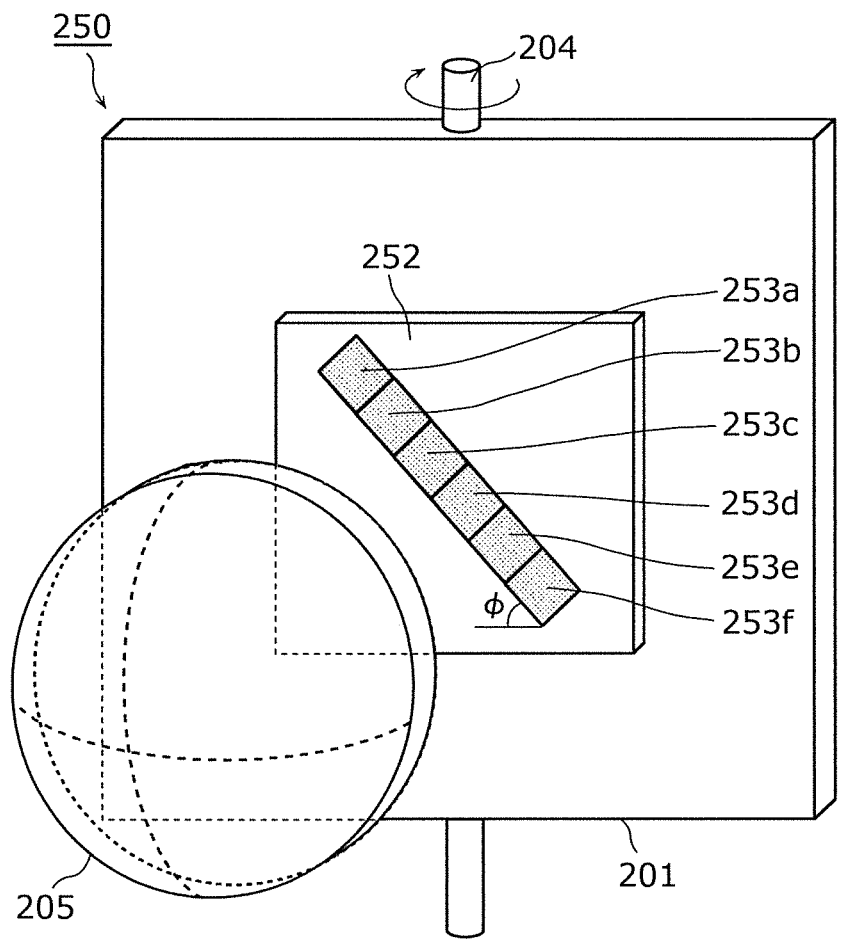

FIG. 51A is a perspective view of the infrared detector according to Variation 5 of Embodiment 4.

Figure 51B:
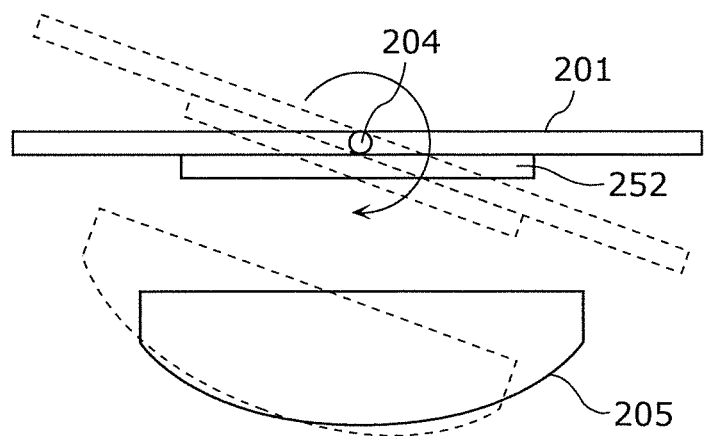

FIG. 51B is a top view of the infrared detector according to Variation 5 of Embodiment 4.

Figure 52:
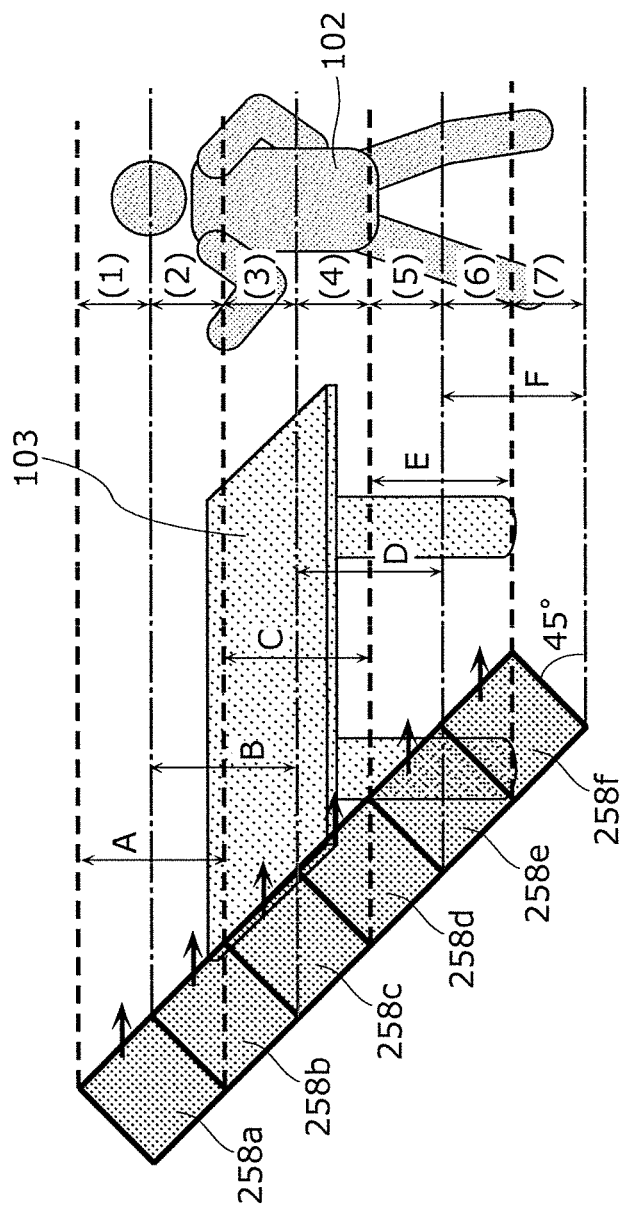

FIG. 52 is a conceptual diagram of detection areas of the infrared detector according to Variation 5 of Embodiment 4.

Figure 53:
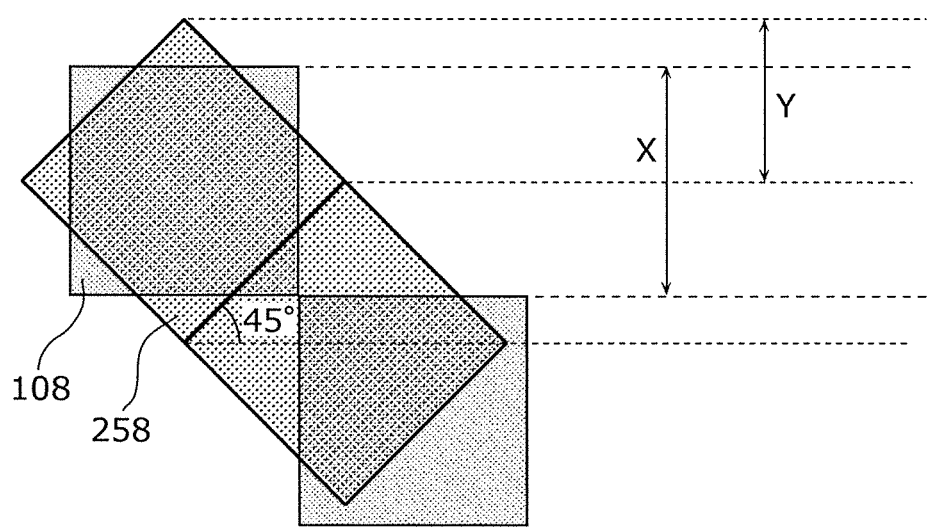

FIG. 53 illustrates a technique for increasing the resolution of an infrared image.

Figure 54:
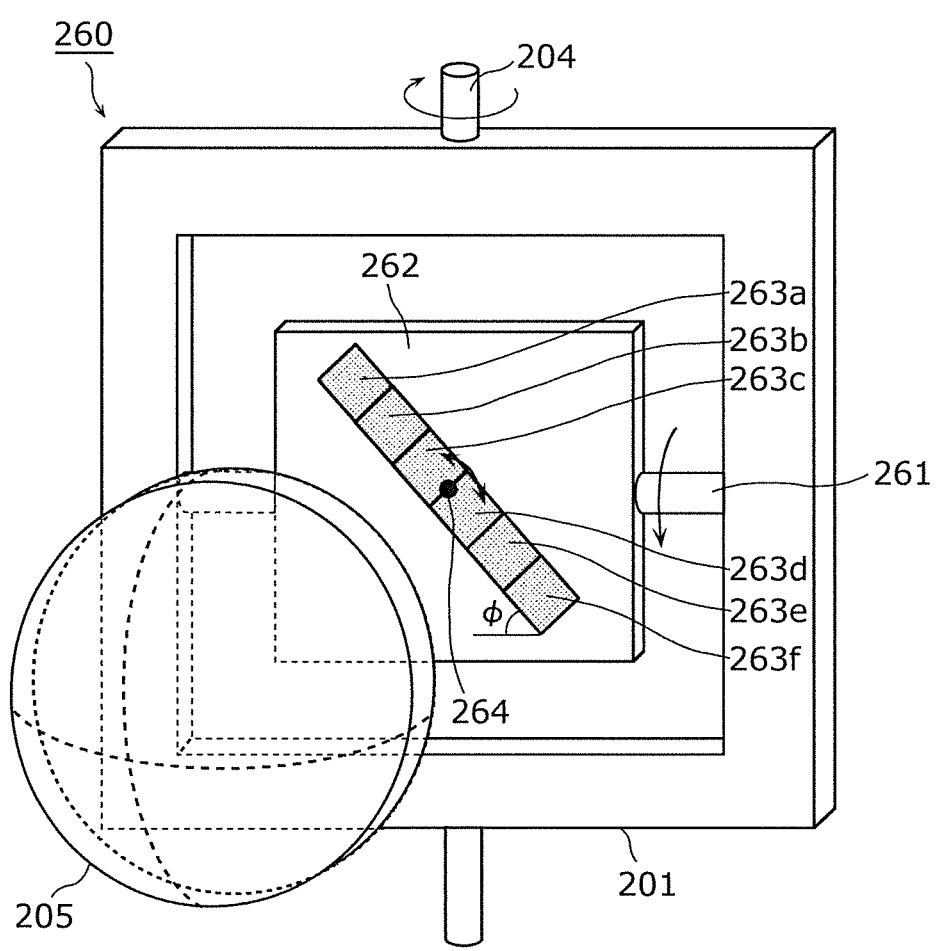

FIG. 54 is a perspective view of the infrared detector according to Variation 6 of Embodiment 4.

Figure 55:
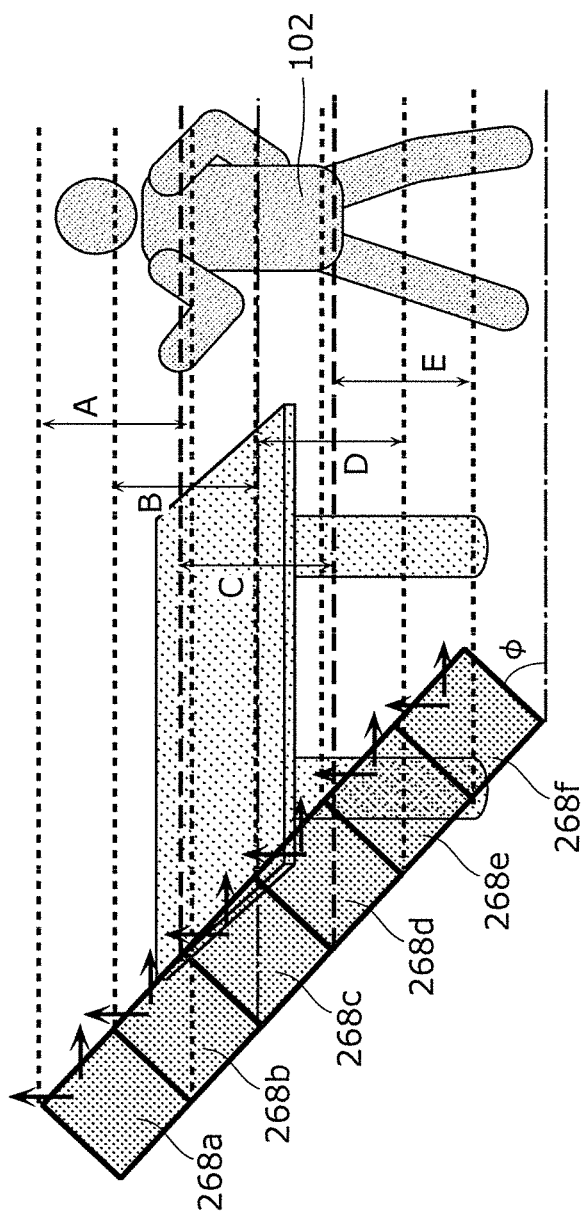

FIG. 55 illustrates a technique for changing the resolution of an infrared image.

Figure 56:
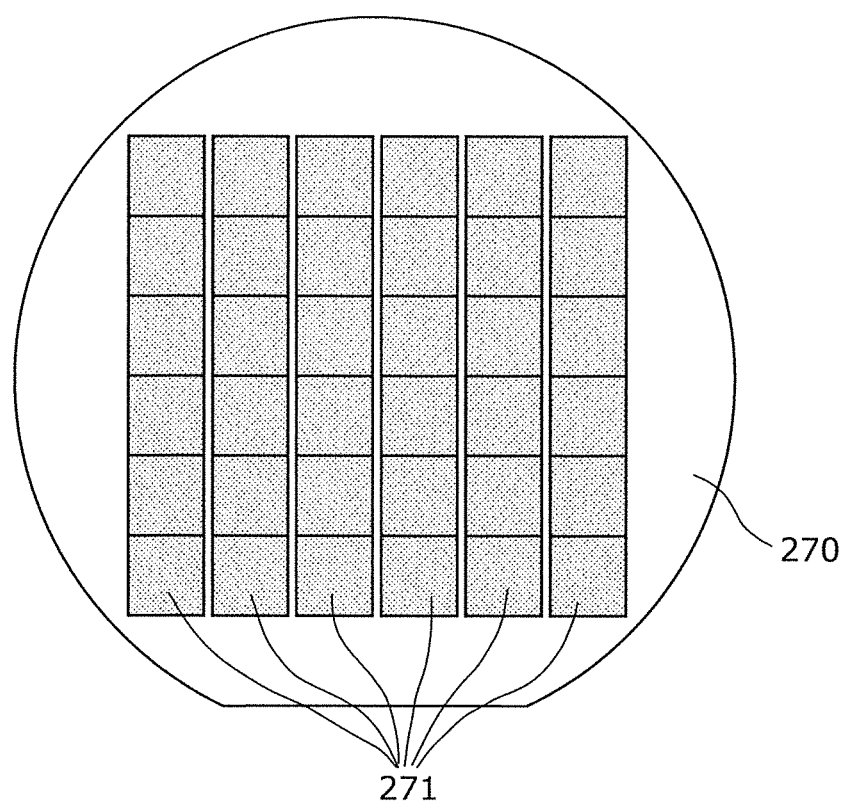

FIG. 56 illustrates a technique for cutting an infrared detector element array from a wafer.

Figure 57:
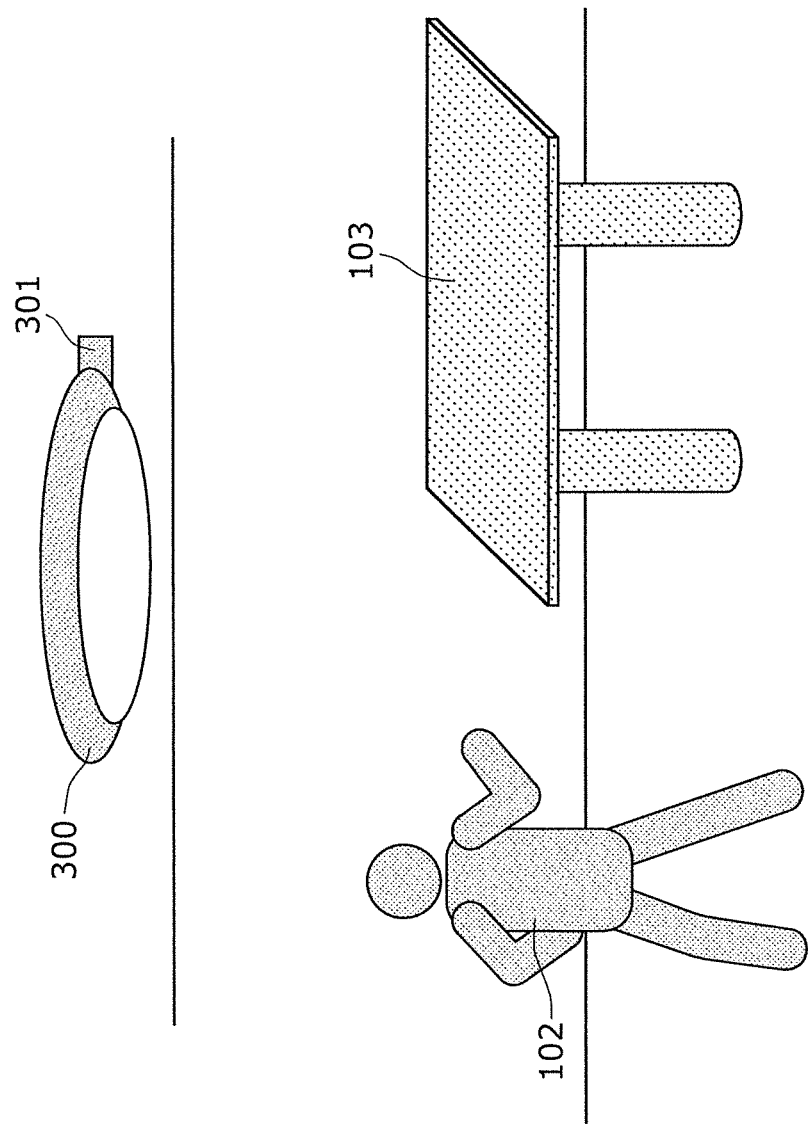

FIG. 57 is a diagrammatic view of a room in which a lighting device including an infrared detector is installed in the ceiling.

Figure 58:
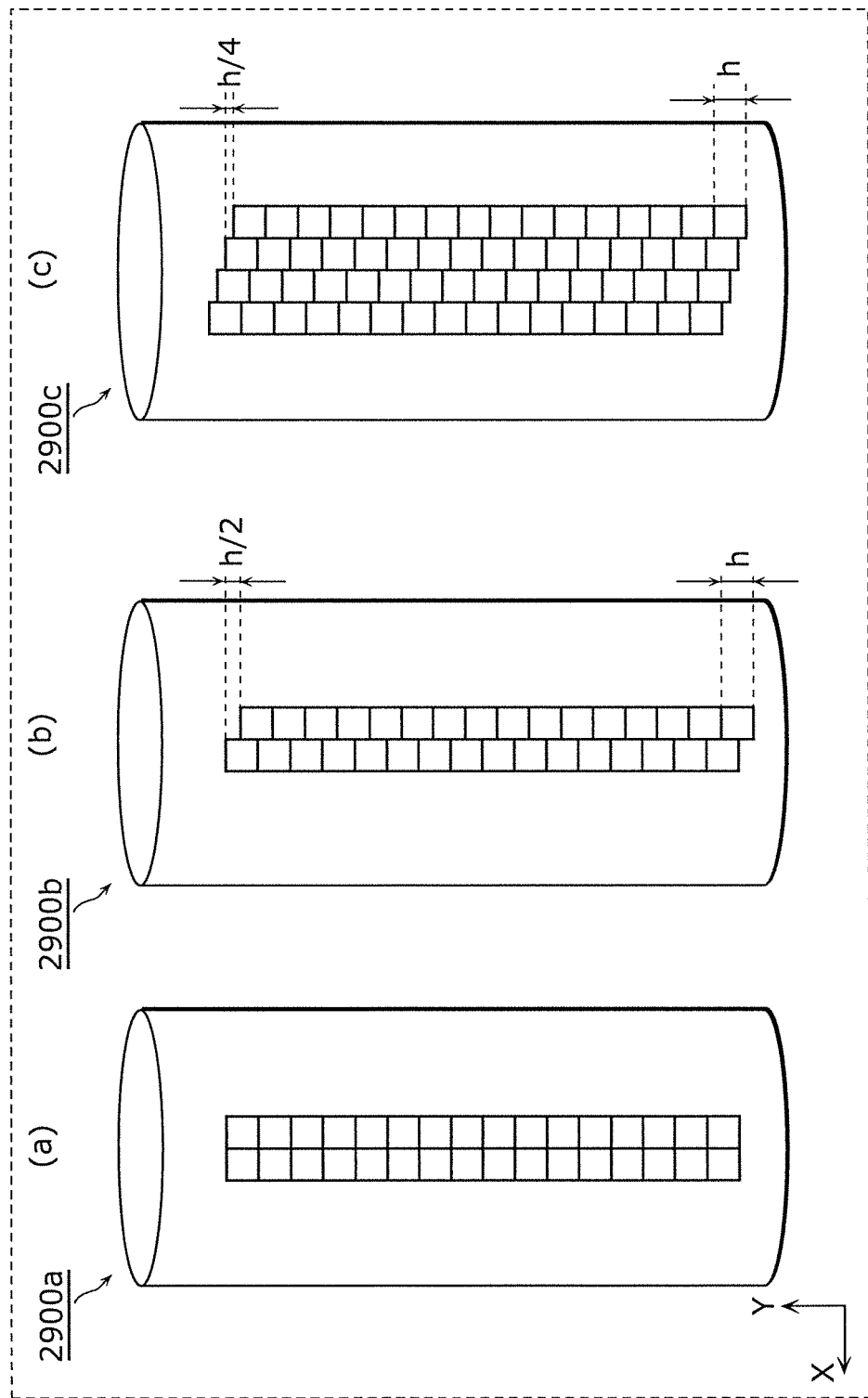

FIG. 58 illustrates an example of a thermal image sensor including a plurality of one-dimensional photosensors disposed adjacent to each other.

DESCRIPTION OF EMBODIMENTS

A thermal image sensor according to one aspect of the present invention includes: a plurality of infrared detector elements that detect infrared light in a detection area; and a scanning unit configured to scan the detection area in a scanning direction to detect, with the plurality of infrared detector elements, infrared light in an area to be captured as a single thermal image, wherein the plurality of infrared detector elements include infrared detector elements arranged in mutually different positions in a predetermined direction corresponding to the scanning direction.

The plurality of infrared detector elements may be aligned in an intersecting direction intersecting both the predetermined direction and a direction perpendicular to the predetermined direction.

The plurality of infrared detector elements may be arranged such that a detection range of one infrared detector element included in the plurality of infrared detector elements overlaps a detection range of an adjacent infrared detector element included in the plurality of infrared detector elements.

Relative to the predetermined direction, an angle of the intersecting direction in which the plurality of infrared detector elements are aligned may be 45 degrees.

the plurality of infrared detector elements may constitute a plurality of element lines each configured of a portion of the plurality of infrared detector elements, and the plurality of element lines may be arranged in mutually different positions in the predetermined direction.

Each of the plurality of element lines may be configured of infrared detector elements aligned in a direction perpendicular to the predetermined direction.

The plurality of element lines may include: an element line of infrared detector elements aligned in a direction perpendicular to the predetermined direction; and an element line of infrared detector elements aligned in an intersecting direction intersecting both the predetermined direction and the direction perpendicular to the predetermined direction.

A total number of infrared detector elements constituting one element line included in the plurality of element lines may be different from a total number of infrared detector elements constituting another element line included in the plurality of element lines.

The plurality of infrared detector elements may include two types of infrared detector elements different in at least one of shape, thermal capacity, size, or material.

The scanning unit may be configured to scan the detection area in the scanning direction by moving the plurality of infrared detector elements in the predetermined direction.

The thermal image sensor may further include an optical system that introduces infrared light from a target object to the plurality of infrared detector elements. The scanning unit may be configured to scan the detection area in the scanning direction by moving the optical system.

The thermal image sensor may further include a perpendicular scanning unit configured to scan the detection range in a direction perpendicular to the scanning direction.

The thermal image sensor may further include a structure that adjusts an angle of the intersecting direction relative to the predetermined direction by rotating the plurality of infrared detector elements.

According to one aspect of the present invention, a user interface for an air conditioner including a thermal image sensor for generating a thermal image showing a temperature distribution of a target area includes: a first setting-receiving unit configured to receive a setting for a target temperature of a room; and a second setting-receiving unit configured to receive a setting for a target temperature of a certain part of the target area.

The user interface may further include a third setting-receiving unit configured to receive a setting for an air flow direction and a setting for a fan speed for the air conditioner. When the setting for the target temperature for the first setting-receiving unit is set and the setting for the target temperature for the second setting-receiving unit is set, the third setting-receiving unit may be configured to refrain from receiving the setting for the air flow direction and the setting for the fan speed.

The user interface may further include a display unit configured to display at least the air flow direction and the fan speed. When the setting for the target temperature for the first setting-receiving unit is set and the setting for the target temperature for the second setting-receiving unit is set, the display unit may be configured to display that input of a setting to the third setting-receiving unit is not possible.

The air conditioner may detect a location of a person in the target area by image processing by the thermal image sensor, and the display unit may be further configured to display a temperature at the location of the person detected by the air conditioner.

The temperature at the location of the person may include at least one of a temperature at a location of a face of the person, a temperature at a location of a hand of the person, or a temperature at a location of a leg of the person.

The second setting-receiving unit may be configured to receive, as the target temperature of the certain part, a setting for a target temperature of at least one of a location of a face of the person, a location of a hand of the person, or a location of a leg of the person.

The air conditioner according to one aspect of the present invention includes: a thermal image sensor that measures a temperature of a surrounding area and obtains a thermal image including a plurality of pixels indicating a thermal distribution; an image processing unit configured to detect a location of a specific body part of a person from the thermal image obtained from the thermal image sensor; and a device control unit configured to control at least one of a air flow direction, a fan speed, a temperature, or a humidity level, based on information on the location of the specific body part detected by the image processing unit.

The location of the specific body part may be a location of a face of the person.

The location of the specific body part may be one of a location of a hand of the person and a location of a leg of the person.

The image processing unit may be configured to detect, as a location of a face of the person, one or more pixels indicating a predetermined temperature among the plurality of pixels included in the thermal image.

The image processing unit may be configured to detect, as a location of a body of the person, an area corresponding to a collection of a predetermined number of pixels or more that vary in temperature within a set period of time, detect a posture of the body of the person from a shape or distribution of the area detected as the location of the body of the person, and detect, based on information on the posture detected, a portion of the region detected as the location of the body of the person, as a location of a hand of the person or a location of a leg of the person.

The image processing unit may be configured to determine a behavior of the person based on whether a pixel detected as the location of the specific part moves within a predetermined period of time, and the device control unit may be configured to control one or more of the air flow direction, the fan speed, the temperature, and the humidity level, based on the behavior of the person.

The air conditioner may further include a sensor height and angle adjusting unit configured to adjust a height or angle of the thermal image sensor.

The air conditioner may further include a communication unit configured to transmit, to a server over a network, data on the thermal image obtained from the thermal image sensor or data detected by the image processing unit.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims defining the most generic part of the inventive concept are described as arbitrary structural elements.

Note that the Drawings are schematic drawings, and are not necessarily exact depictions. Moreover, elements having the same essential configuration share the same reference numerals in the Drawings, and duplicate descriptions regarding these elements may be omitted or shortened in the Description.

(Embodiment 1)

[Underlying Knowledge Forming Basis of Embodiment 1]

First, the underlying knowledge forming the basis of the air conditioner according to Embodiment 1 will be described.

The air conditioner disclosed in PTL 1 includes a human detection device that estimates the general location of a person's face or legs from an obtained thermal image.

PTL 2 is poorly conceived as it does not disclose a specific method for estimating the location of a person's face or feet. Moreover, the air conditioner disclosed in PTL 2 does not take into account the state or activity state of the user.

In other words, air conditioning optimized in accordance with the state of the user, such as according to whether the user is moving, still in one place, or sleeping, cannot be provided by the air conditioner disclosed in PTL 2. Moreover, PTL 2 discloses a method for obtaining high-resolution, two-dimensional thermal image data, but does not disclose what kind of controlling the obtained data is used for.

The air conditioner described in Embodiment 1 is an air conditioner which includes a thermal image sensor and provides optimal control in accordance with the state of the user.

[Configuration]

Figure 1:
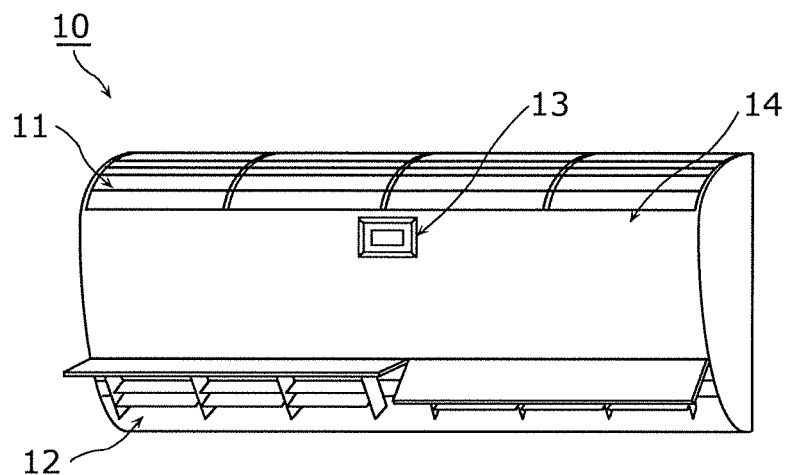
FIG. 1 is an external view of an air conditioner including a thermal image sensor.

Hereinafter, the air conditioner according to Embodiment 1 will be described. FIG. 1 is an external view of an air conditioner including a thermal image sensor.

The air conditioner 10 illustrated in FIG. 1 is configured of a substantially box-shaped main body 14 that includes an air inlet 11 through which air from the room is drawn in, an air outlet 12 through which conditioned air is forced out, and a thermal image sensor 13 that obtains thermal image data.

First, the air conditioner 10 will be described.

The air drawn into the main body 14 through the air inlet 11 is either heated by a heating device (not shown in the Drawings) or cooled by a cooling device (not shown in the Drawings) inside the main body 14, and then returned to the room through the air outlet 12.

In order to draw in air from and reintroduce the air back into the room, a blowing device (not shown in the Drawings) such as a fan is typically included in the main body 14. This makes it possible to heat or cool a large amount of air in a short amount of time.

Heat dissipation plates (not shown in the Drawings) such as fins are typically included in the main body 14, making it possible to more efficiently heat or cool the air.

The air conditioner 10 also includes a compressor or Peltier type heat exchanger (not shown in the Drawings) for heating or cooling the heat dissipation plates. Note that the heat exchanger may be installed outside of the room. Installing the heat exchanger outside of the room reduces the size of the devices of the air conditioner 10 installed in the room. Furthermore, when cooling the air in the room, since heat from the heat exchanger itself is not dissipated into the room, the air in the room can be efficiently cooled. Moreover, in this case, the heat exchanger and the heat dissipation plates may be connected with a heat pipe or coolant pipe, which have low heat resistance. This increases the efficiency of the heating or cooling of the air.

Next, the thermal image sensor 13 will be described. Either one of a thermal image sensor 20 and a thermal image sensor 30, which will be described later, may be used as the thermal image sensor 13 in the air conditioner 10.

Figure 2:
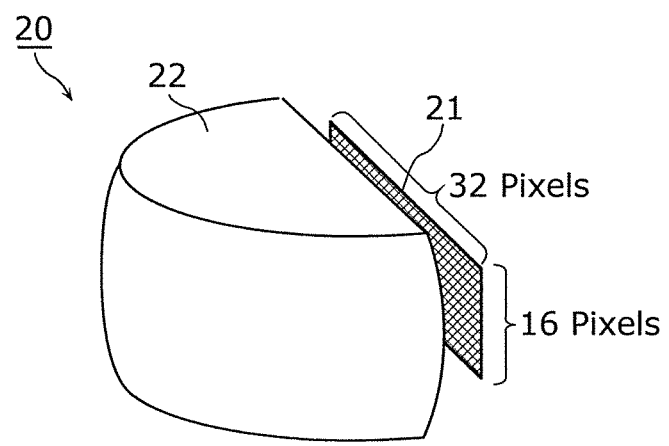
FIG. 2 illustrates an example of a thermal image sensor including infrared sensor elements arranged in a matrix.

FIG. 2 illustrates the thermal image sensor 20, which is one example of the thermal image sensor 13. As illustrated in FIG. 2, the thermal image sensor 20 includes a two-dimensional photosensor 21 configured of infrared sensor elements arranged in a matrix, and a lens 22.

For example, a contactless radiation thermometer, such as a thermopile which uses thermoelectric power for measurement, a bolometer which uses temperature-dependent electrical resistance for measurement, or a pyroelectric sensor which uses the pyroelectric effect for measurement, may be used as the two-dimensional photosensor 21. The two-dimensional photosensor 21 of the thermal image sensor 20 includes a total of 512 infrared sensor elements (hereinafter simply referred to as photosensor elements) arranged in a matrix of 16 columns and 32 rows.

Moreover, a lens made of a silicon or ZnS, which have a high rate of transmittance with respect to infrared light, is used as the lens 22. The lens 22 is designed such that infrared light incident on the lens 22 at different angles is incident on different photosensor elements.

Next, the room temperature distribution measurement method used by the thermal image sensor 20 will be described. FIG.

Figure 4:
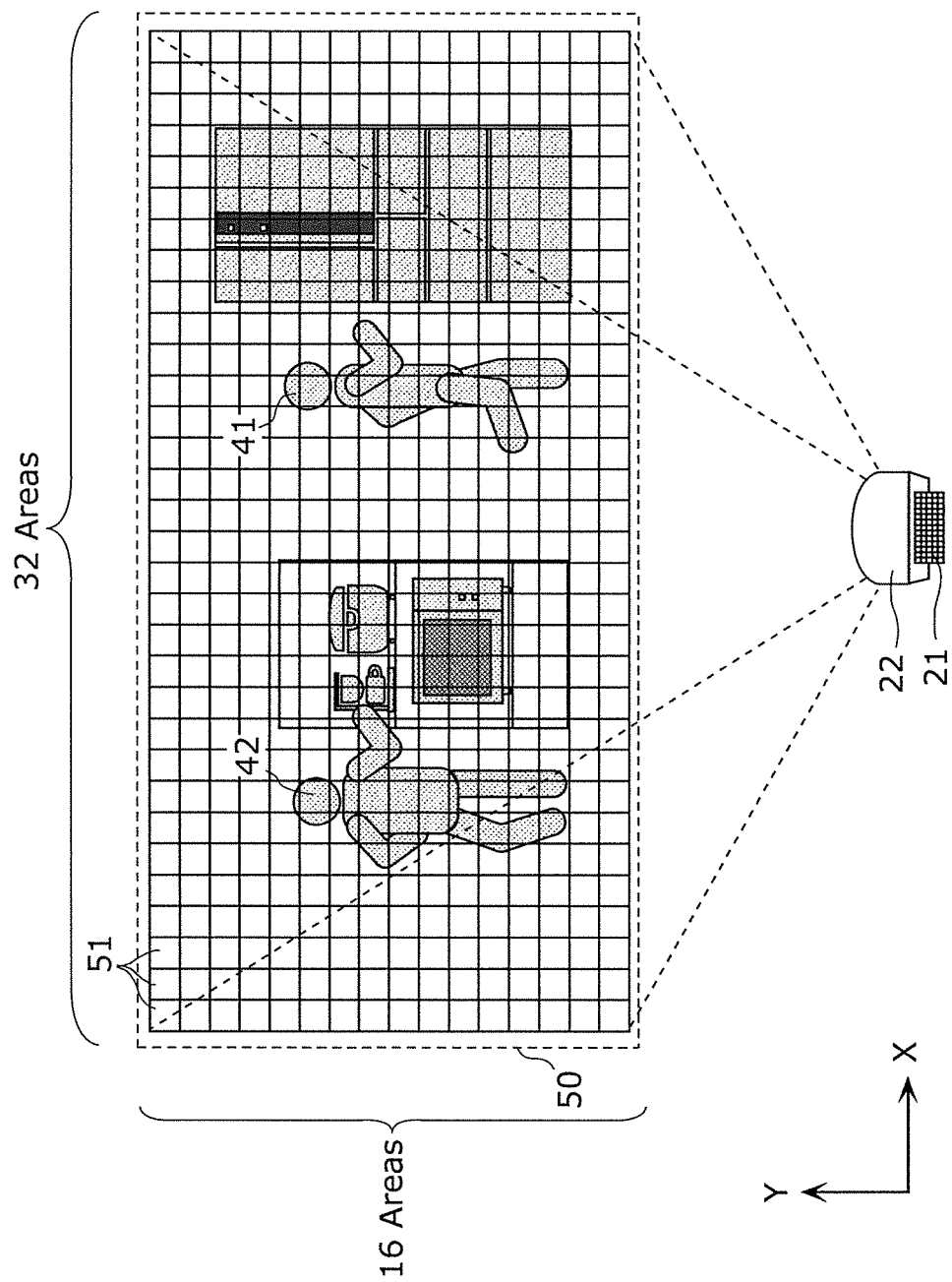
FIG. 4 illustrates the temperature distribution measurement method employed by the matrix thermal image sensor.

3 is a schematic view of a room (observation area) which is the target of the thermal image sensor 20. FIG. 4 illustrates the temperature distribution measurement method employed by the thermal image sensor 20.

Figure 3:
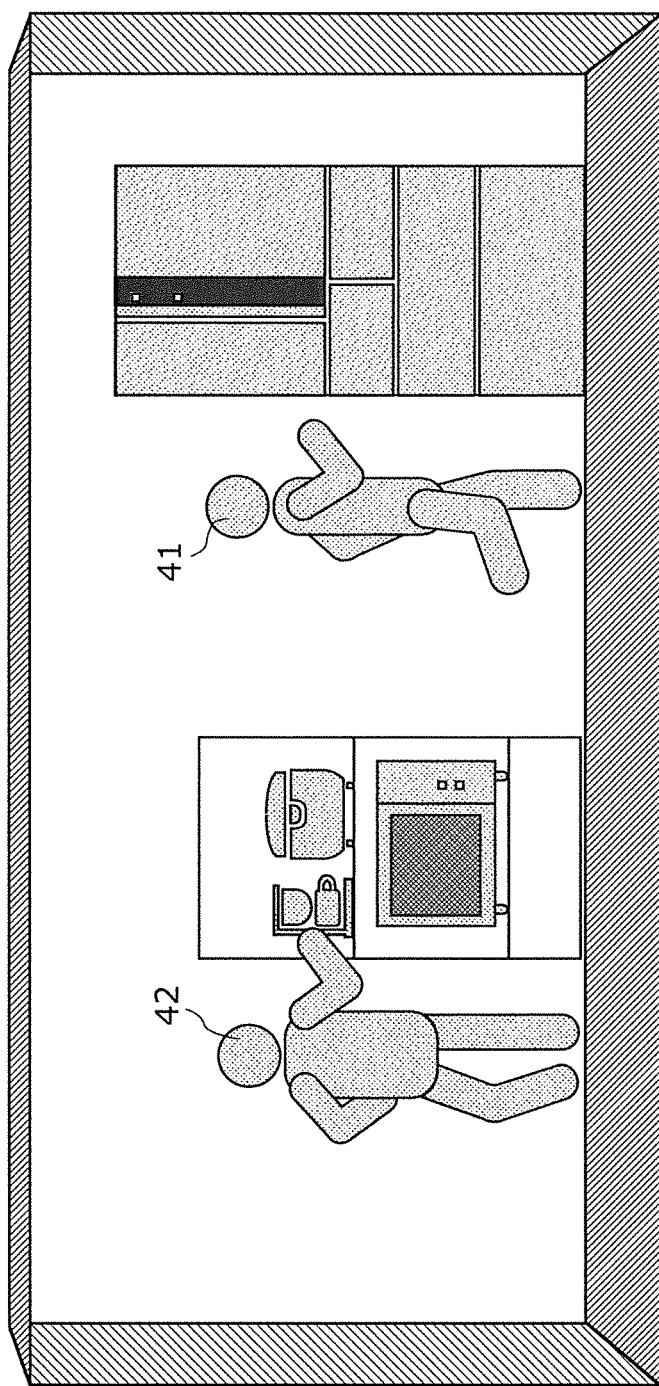
FIG. 3 is a schematic view of a room monitored by a thermal image sensor.

For example, when the air conditioner 10 is installed in a room occupied by a user 41 and a user 42, as illustrated in FIG. 3, the infrared light radiated from observation pixels 51 is incident on the photosensor elements of the two-dimensional photosensor 21, as illustrated in FIG. 4. Note that the observation pixels 51 refer to areas of the room from which the infrared light incident on the photosensor elements is radiated.

A higher temperature of matter in one of the observation pixels 51 corresponds to a greater amount of infrared light radiated, and a greater amount of infrared light that is incident on the corresponding photosensor element. In other words, the temperature distribution of the area around the air conditioner 10 is computed from the amount of infrared light incident on the photosensor elements of the two-dimensional photosensor 21.

Since the photosensor elements of the two-dimensional photosensor 21 are arranged in a matrix, the temperature (thermal image data) in each observation pixel 51 in the entire observation area 50 is measured simultaneously (one frame per sampling interval) throughout the two-dimensional photosensor 21. Here, since 512 (16×32) photosensor elements are arranged in the matrix, the entire observation area 50 is divided into a total of 512 observation pixels 51 in 16 rows and 32 columns. Note that the frequency at which the thermal image data is obtained is not limited to one frame per sampling interval. The thermal image data may be obtained at a rate specified by the user.

Figure 5:
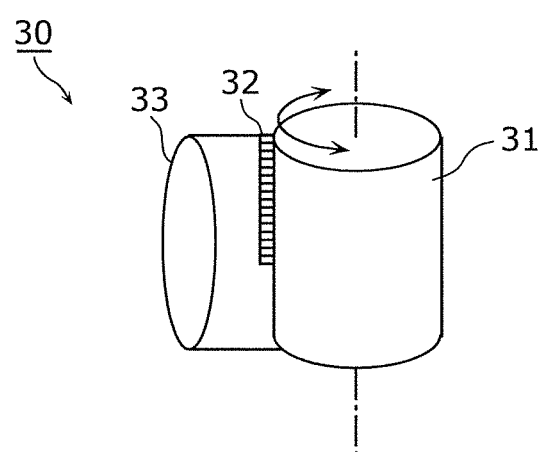
FIG. 5 illustrates an example of a thermal image sensor including infrared sensor elements arranged in a line.

Next, a different example of the thermal image sensor 13 will be described. FIG. 5 illustrates the thermal image sensor 30, which is a different example of the thermal image sensor 13. As illustrated in FIG. 5, the thermal image sensor 30 includes a rotator 31, a one-dimensional photosensor 32 configured of linearly arranged photosensor elements, and a lens 33.

Examples of the rotator 31 include a stepper motor and a servo motor. Note that the thermal image sensor 30 is not required to include the rotator 31; so long as a scanning system (scanning device) that changes the orientation of the photosensor elements is used, other driving structures are not required. The rotator 31 is more suitable for compact applications than other driving structures.

For example, similar to the two-dimensional photosensor 21, a contactless radiation thermometer, such as a thermopile which uses thermoelectric power for measurement, a bolometer which uses temperature-dependent electrical resistance for measurement, or a pyroelectric sensor which uses the pyroelectric effect for measurement, may be used as the one-dimensional photosensor 32. Moreover, with the one-dimensional photosensor 32, a total of 16 photosensor elements are arranged in one line.

A lens made of a silicon or ZnS, which have a high rate of transmittance with respect to infrared light, is used as the lens 33, similar to the lens 22.

Figure 6:
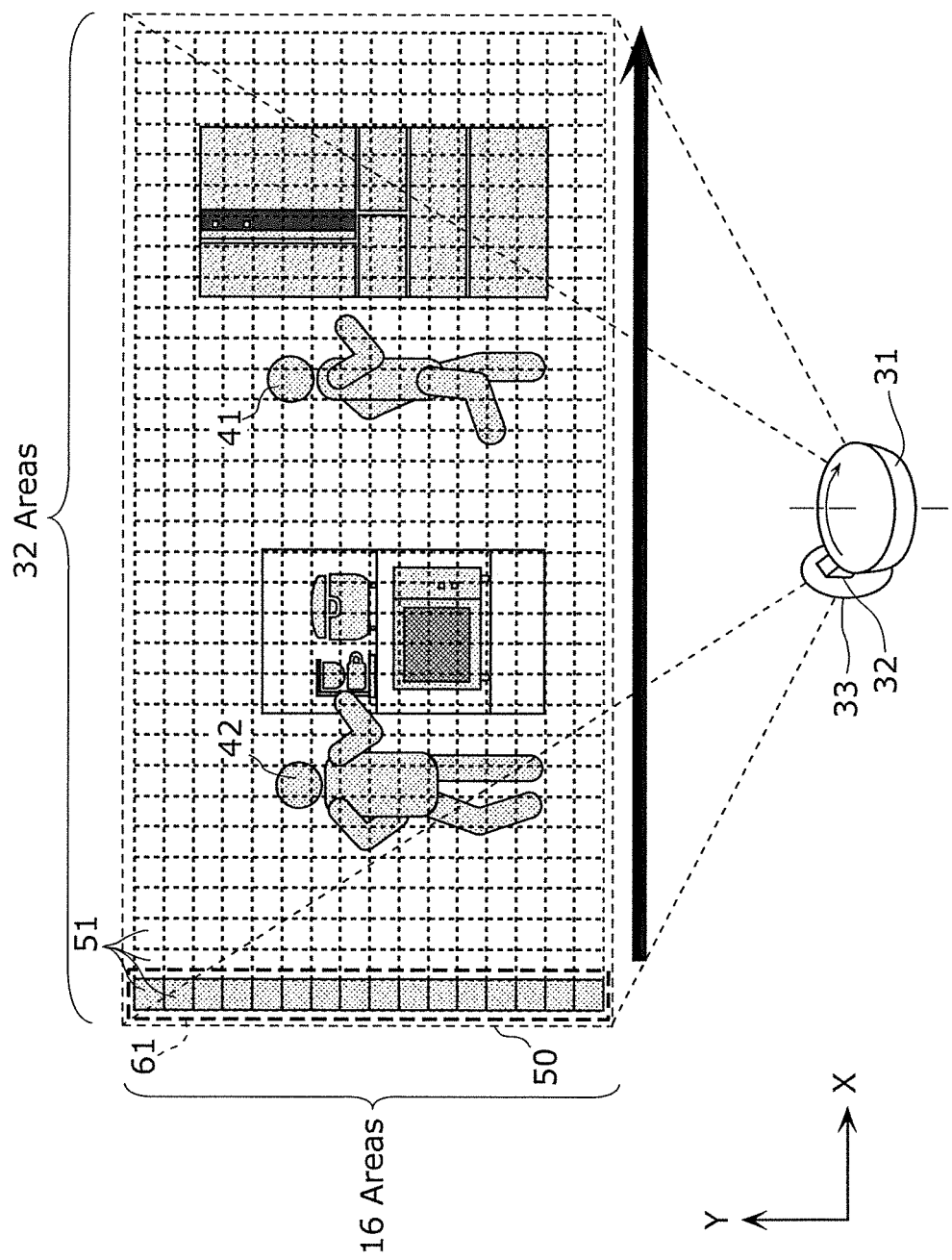
FIG. 6 illustrates the temperature distribution measurement method employed by the linear thermal image sensor.

Next, the room temperature distribution measurement method used by the thermal image sensor 30 will be described. FIG. 6 illustrates the temperature distribution measurement method employed by the thermal image sensor 30.

Since the thermal image sensor 30 uses the one-dimensional photosensor 32, the observation pixels 51 in linear observation area 61 illustrated in FIG. 6 measure temperature at one time. However, using the rotator 31, the linear observation area 61 is moved in a direction (hereinafter also referred to as the scanning direction or X axis direction) perpendicular to the line axis direction (Y axis direction in FIG. 6), whereby thermal image data for the entire observation area 50 around the air conditioner 10 is obtained, similar to the thermal image sensor 20. For example, by using the rotator 31 to rotate the 1×16 one-dimensional photosensor 32 in 32 steps, an arbitrary angle per step, a total of 512 (16×32) pixels—that is to say, the thermal image data for the entire observation area 50—is obtained. If the one-dimensional photosensor 32 is rotated five degrees per step, the width of the entire observation area 50 in the X axis direction is equivalent to 160 degrees.

With the thermal image sensor 30, the temperature in each observation pixel 51 is measured while the rotator 31 rotates the one-dimensional photosensor 32. Therefore, the time it takes (frame interval) to obtain the thermal image data for the entire observation area 50 with the thermal image sensor 30 is longer than the time it takes to obtain the thermal image data for the entire observation area 50 with the above-described thermal image sensor 20.

Note that with the thermal image sensor 30, the photosensor elements are linearly aligned in the Y axis direction and moved (rotated) in the X axis direction, but the photosensor elements may be linearly aligned in the X axis direction and moved (rotated) in the Y axis direction.

Moreover, photodiodes are desirably used for the two-dimensional photosensor 21 and the one-dimensional photosensor 32. Using photodiodes makes it possible to obtain the thermal image data at high speeds.

Regardless of whether photodiodes are used or not used for the two-dimensional photosensor 21 and the one-dimensional photosensor 32, a system (heating device) for heating the photosensor is desirably provided. Providing a system for heating the photosensor makes it possible to increase the signal-to-noise ratio of the thermal image data. A heating device or Peltier device is used as the heater.

When both the heating device is provided and photodiodes are used for the photosensor, indium antimonide photodiodes are desirably used. This makes it possible to detect the concentration of substances in the air ($CO_2$, CO, $H_2O$) in addition to obtain the thermal image data. Consequently, it is possible to detect a high concentration of $CO_2$ and CO in the air with the thermal image sensor 13 and prompt the user to ventilate the room. In this case, the air conditioner 10 desirably includes an audio notification system (notification device) to prompt the user to ventilate the room.

Moreover, the air conditioner 10 desirably includes a ventilation device that replaces the air in the room. This makes it possible to automatically (rather than forcing the user to open a window) ventilate the room when the concentration of $CO_2$ or CO in the air is high. Specifically, the ventilation device is a ventilation window that can be opened and closed by the air conditioner 10, and this ventilation device is desirably provided with a filter. This makes it possible to reduce the introduction of, for example, pollen into the room when ventilating the room.

Moreover, two-dimensional scanning is desirably performed using a plurality of rotators in the thermal image sensor 13. The rotators may rotate the thermal image sensor in, for example, pan and tilt (roll) directions. With this, a low-cost, high-performance thermal image sensor is possible.

Figure 7:
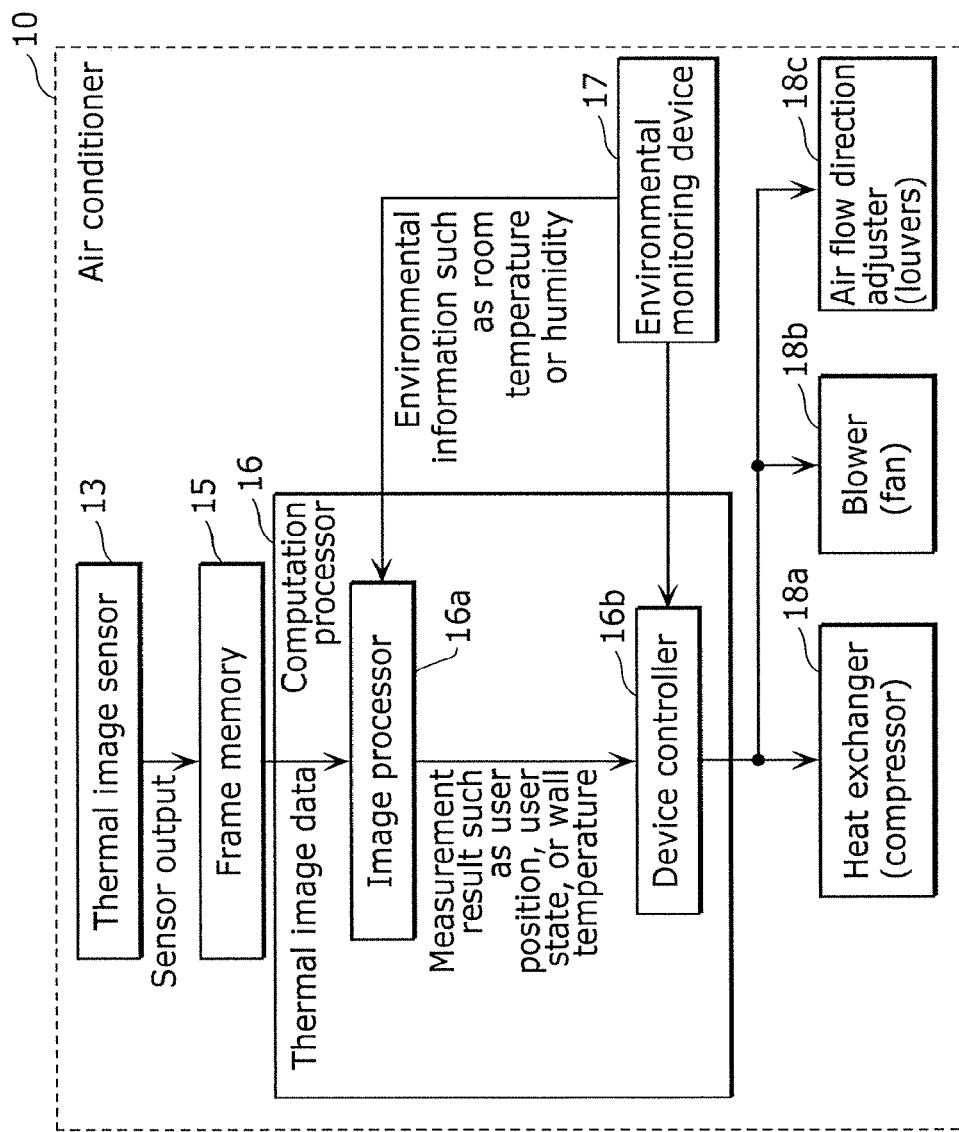
FIG. 7 is a block diagram illustrating the system configuration of an air conditioner including a thermal image sensor.

Next, the system configuration of the air conditioner 10 including the thermal image sensor 13 will be described. FIG. 7 is a block diagram illustrating the system configuration of the air conditioner 10.

As illustrated in FIG. 7, in addition to the thermal image sensor 13, the air conditioner 10 includes a frame memory 15, a computation processor 16, an environmental monitoring device 17, a heat exchanger 18a, a blower 18b, and an air flow direction adjuster 18c. The computation processor 16 includes an image processor 16a and a device controller 16b. Note that the above configuration is not a compulsory configuration of the air conditioner 10; one or more components may be omitted.

Hereinafter, the flow of processes performed by each component in the air conditioner 10 will be described.

First, the thermal image sensor 13 obtains electric signals (thermoelectric power in the case of a thermopile) from the photosensor elements, and generates two-dimensional thermal image data based on the obtained electric signals. This concludes the description of the thermal image sensor 13.

The generated two-dimensional thermal image data is stored in the frame memory 15. The frame memory 15 is not limited to any specific kind of memory, and may be any structure that has general storage functions, such as a semiconductor memory. Moreover, the frame memory 15 may be provided internally in the air conditioner 10 or externally connected to the air conditioner 10.

The computation processor 16 obtains and performs computing on the two-dimensional thermal image data stored in the frame memory 15. The computation processor 16 is not limited to any specific kind of processor, and may be any structure that has a computing function, such as a microcomputer.

Firstly, the image processor 16a in the computation processor 16 performs image processing by detecting, for example, a location of a person in the thermal image data, the amount of clothes the person is wearing in the thermal image data, or the temperature distribution of the room in the thermal image data, based on the thermal image data stored in the frame memory 15. A specific example of the image processing algorithm used in the image processor 16a will be described later. The image processor 16a then outputs information, such as the location of the user, the temperature of the hands or face of the user, or the temperature of a wall, to the device controller 16b.

Based on the information outputted by the image processor 16a, the device controller 16b computes control information for controlling (temperature control, fan speed control, and air flow direction control) the heat exchanger 18a, which is, for example, a compressor, the blower 18b, which is, for example, a fan, and the air flow direction adjuster 18c, which is, for example, louvers. The control information computed by the device controller 16b is, for example, a number of times of rotation in the case of the blower 18b, or an angle of the louvers in the case of the air flow direction adjuster 18c. Note that the devices to be controlled by the device controller 16b are not limited to the heat exchanger 18a, the blower 18b, and the air flow direction adjuster 18c.

Note that, as illustrated in FIG. 7, the air conditioner 10 includes the environmental monitoring device 17 which may monitor the temperature and humidity of the room, and based on the temperature and humidity, for example, may control the temperature of the room and the fan speed.

Furthermore, the environmental information, such as the room temperature and humidity, obtained by the environmental monitoring device 17 is desirably transmitted to the image processor 16a. The reason for this will be described later.

Moreover, in addition to the room temperature and humidity, the environmental information desirably includes outside temperature, illuminance inside and outside the room, and radiant heat outside the room. The reason for this will be described later.

Figure 8:
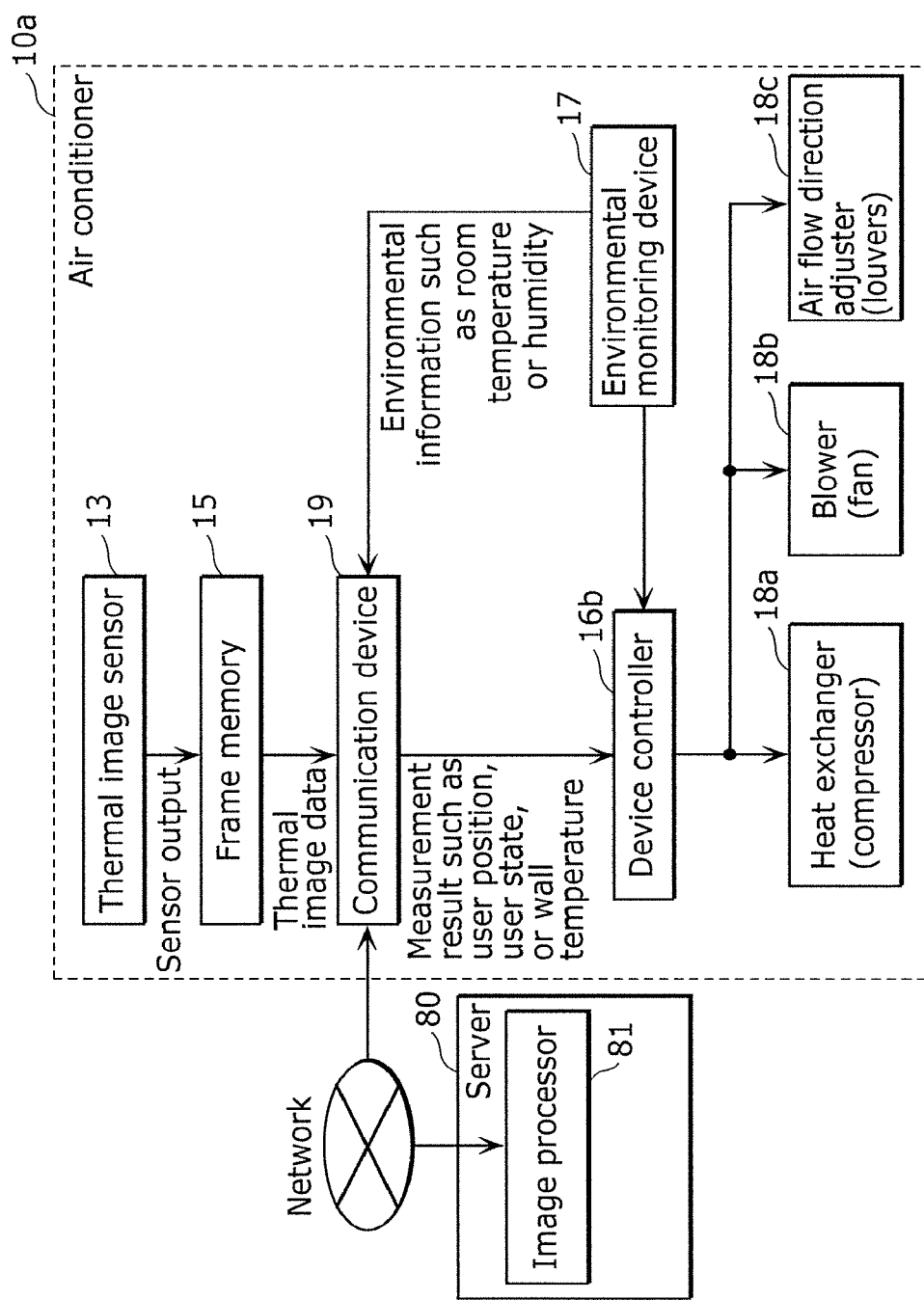
FIG. 8 is a block diagram illustrating the system configuration of an air conditioner including an external image processor.

Note that the image processor 16a may be provided external to the air conditioner 10. FIG. 8 is a block diagram illustrating the system configuration of an air conditioner including an external image processor.

As illustrated in FIG. 8, an air conditioner 10a includes a communication device 19. Thermal image data is transmitted to a server 80 via the communication device 19. With this configuration, an image processor 81 in the server 80 computes, for example, the location of the user, the state of the user (user's hand or face temperature, amount of clothes, posture, etc.), and the temperature of a wall.

With this configuration, since thermal image data is regularly transmitted to the server 80 via the communication device 19, it is possible to check the sensitivity degradation of the thermal image sensor, and adjust the sensor sensitivity. Here, transmission by the communication device 19 is conducted via Wi-Fi (registered trademark) or Bluetooth (registered trademark), and the communication device 19 may transmit the thermal image data to a server 80 located outside of the room over a network such as the internet. The data transmitted by the communication device 19 is not limited to thermal image data, and may be a sensor output from the thermal image sensor 13.

It is desirable that the environmental information also be transmitted to the server 80 via the communication device 19 for reasons to be described later.

[Detection of User Location]

Next, the method used by the image processor 16a to detect the location of the user based on the thermal image data and measure the temperature of parts of the user's body, such as the user's face and hands, in order to assess the state of the user, will be described along with the advantageous effects of the method. Note that in the following description, either one of the thermal image sensor 20 and the thermal image sensor 30 may be used as the thermal image sensor 13.

First, the method for measuring the temperature of the user's face will be described.

One example of a simple method for detecting the location of the user and measuring the temperature of the user's face includes detecting observation pixels 51 between 30 degrees Celsius and 40 degrees Celsius in the thermal image data for each frame, and determining the location of the detected observation pixels 51 to be the location of the user's face, and determining the temperature of the detected observation pixels 51 to be the temperature of the user's face.

Moreover, the location of observation pixels 51 having a temperature of 30 degrees Celsius to 40 degrees Celsius and a change in temperature of one or more degrees Celsius from the previous frame may be determined to be the location of the user's face. Since heat-generating objects other than people do not move much between frames and change little in temperature between frames, this kind of configuration makes it possible to more accurately detect the location of the user.

With this sort of detection of user location, the air conditioner 10 can, for example, help prevent drying out the user's skin by avoiding blowing air directly at the user (control of the air flow direction adjuster 18c by the device controller 16b).

Moreover, by measuring the temperature of the user's face as described above, it is also possible to reduce the danger of the user suffering from heat exhaustion. For example, when the temperature of the user's face is 37 degrees Celsius or more, it is possible to increase the intensity of the cooling to reduce the danger of the user suffering from heat exhaustion. Moreover, if the temperature of the user's face is 37 degrees Celsius or more on a steady basis, the air conditioner 10 can determine that the user has a cold or influenza and increase the humidity.

Even if the heat exchanger 18a and the device controller 16b are not being driven, the temperature of the user's face can be measured by the thermal image sensor 13. In other words, even when the air conditioner 10 itself is not being operated (is turned off), the thermal image sensor 13 can continue to monitor. With this, when, for example, the device controller 16b and the heat exchanger 18a are turned off and the user is sleeping, it is possible to both reduce power consumption and prevent heat exhaustion.

Note that the size of each observation pixel 51 is desirably 20 cm×20 cm or smaller. This makes it possible to more accurately measure the temperature of the user's face, thereby making it possible to more accurately prevent heat exhaustion. Although different models are designed for rooms of different dimensions, with the air conditioner 10, the size of each observation pixel 51 is desirably 20 cm×20 cm or smaller in a location 3.6 m away for an air conditioner 10 designed for a 6-jo (roughly 10 m$^2$) room, 4.5 m away for an air conditioner 10 designed for an 8-jo (roughly 13 m²) room, and 7.2 m away for an air conditioner 10 designed for a 12-jo (roughly 19 m²) room.

Note that by designing the size of each observation pixel 51 to be less than 20 cm×20 cm, although the total number of observation pixels 51 increases beyond 512, this configuration is advantageous since it allows for high-resolution measurement.

Moreover, when an observation pixel 51 corresponding to the location of the user's face does not change for a set period of time or longer, the user may be determined to be sleeping. Here, a "set period of time" is, for example, one minute to 60 minutes. When the air conditioner 10 determines that the user is sleeping, it is possible to provide the user with, for example, a function for reducing noise by reducing the speed of the fan, a function for dimming, for example, LEDs which are on when the air conditioner 10 is in operation, and a function for reducing power consumption by reducing the intensity of the cooling or heating.

Here, reducing the intensity of the cooling and heating can be accomplished by reducing the number of rotations or rotational speed of the compressor. Likewise, increasing the intensity of the cooling and heating can be accomplished by increasing the number of rotations or rotational speed of the compressor.

Moreover, when the location of the user's face changes greatly (for example, 30 cm or more) while the user is sleeping, the user may be determined to have woken up. By recording when the user wakes up based on separately obtained time information, it is possible to provide the user with a function for causing the heater to turn on in the winter and causing the cooler to turn on in the summer around the time the user wakes up.

Additionally, although not shown in the Drawings, the air conditioner 10 may include a memory device (memory) separate from the frame memory 15 for recording of information such as the time the user wakes up. Moreover, the user may be allowed to choose whether or not certain functions provided by the air conditioner 10 will be used or not via a user interface such as remote control. This makes it possible to allow the user to select functions suited to his or her preferences. Note that selection of the functions may also be performed over a network using a smart phone or television, for example.

The air conditioner 10 may also include a room lighting function. This makes it possible for the air conditioner 10 to provide the user with a function for causing the lights to turn on around the time the user wakes up. Additionally, when the air conditioner 10 includes the communication device 19, the air conditioner 10 may cause a lighting device provided external to the air conditioner 10 to turn on via a communication network.

The temperature of the user's face while sleeping may be regularly stored in a memory separate from the frame memory 15. This makes it possible to estimate the basal body temperature of the user from the temperature of the user's face measured before the user wakes up, and provide daily basal body temperature information to the user.

When the basal body temperature being measured is for a female user, air conditioning control that increases the humidity more than usual may be performed during the user's menstruation phase, during which the basal body temperature decreases. This makes it possible to prevent rough skin from dryness (particularly effective in times where the skin tends to dry out) and provide energy saving air conditioning throughout the year.

In order to achieve the above, the air conditioner 10 desirably includes a humidity controller. The humidity controller is, for example, a humidity controller which collects moisture from a device outside the room and disperses the moisture inside the room, but the humidity controller may be a humidity controller which disperses, inside the room, moisture from a water tank provided by the user.

Figure 9:
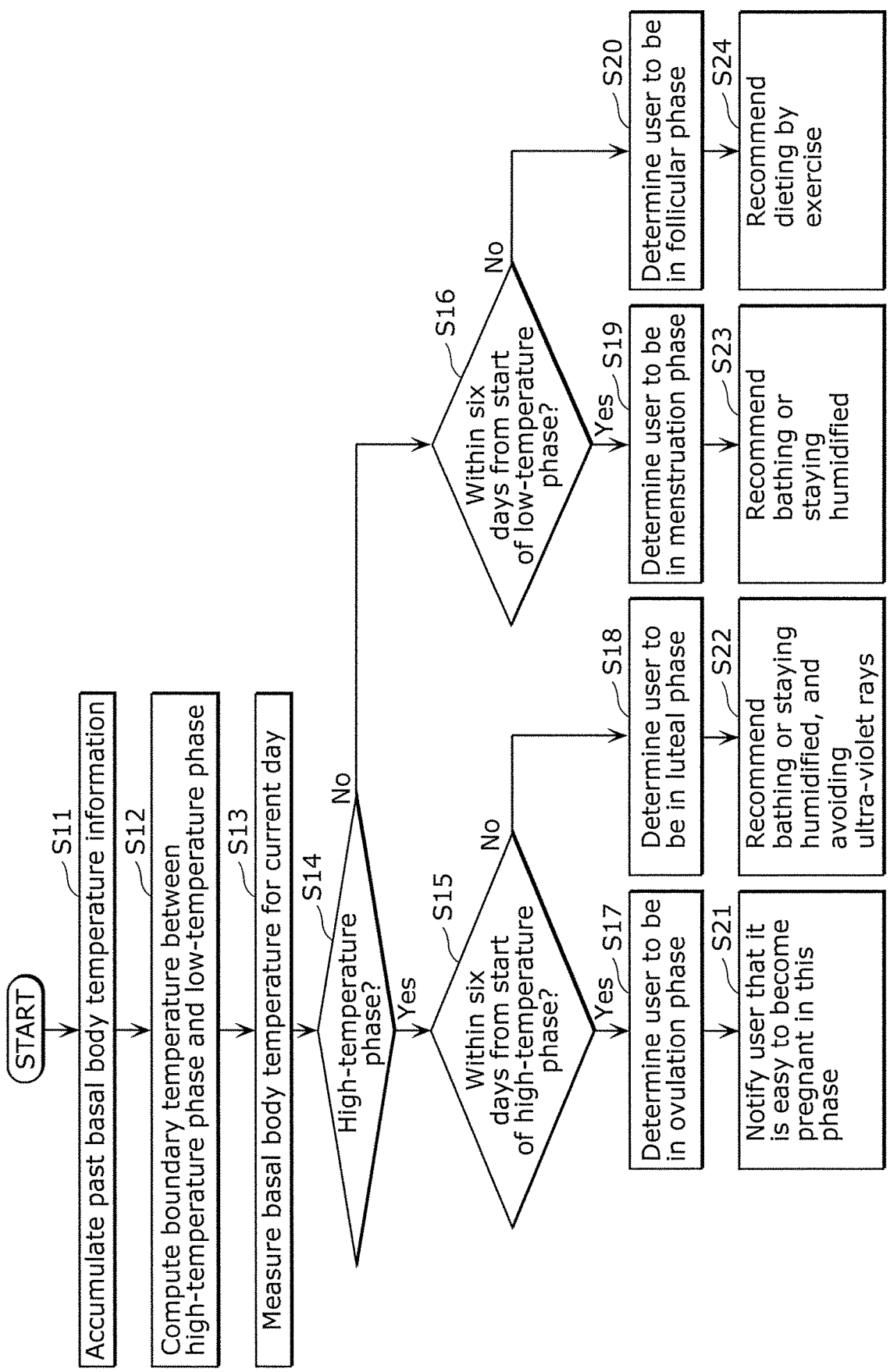
FIG. 9 is a flow chart for determining a high-temperature phase and a low-temperature phase.

When the user is female, the air conditioner 10 may compute, from the daily basal body temperature, a temperature at the boundary between a high-temperature phase and a low-temperature phase, and determine whether the user is currently in a high-temperature phase or a low-temperature phase. FIG. 9 is a flow chart for determining the high-temperature phase and the low-temperature phase.

As illustrated in FIG. 9, the air conditioner 10 accumulates past daily basal body temperature information (S11), and computes a boundary temperature between the high-temperature phase and the low-temperature phase (S12). The air conditioner 10 then measures the user's basal body temperature for the current day (S13).

Moreover, when the user's basal body temperature for the current day falls within the high-temperature phase (Yes in S14) and when the user's basal body temperature for the current day falls within the low-temperature phase (No in S14), in either case, the air conditioner 10 may determine the user to be during the "ovulation phase", "luteal phase", "menstruation phase", or "follicular phase" (S15 to S20) based on whether the number of days from the start of the cycle is within six days or seven days or more, and provide the user with a recommendation or notification according to the phase.

For example, the user may be notified during her ovulation phase that it is easy to become pregnant in the ovulation phase (S21). The user may be recommended to promote blood circulation by bathing or to stay humidified during her luteal phase (S22). The luteal phase may be divided into an early period and a later period, and the user may be recommended to take measures to protect against ultra-violet rays in the later period.

The user may be recommended to promote blood circulation and stay humidified by bathing during her menstruation phase (S23). The user may be notified during her follicular phase that it is easy to lose weight by dieting in the follicular phase, and may be recommended to diet by exercising (S24).

With this configuration, it is easy for a female user to manage her health in conjunction with her menstrual cycle.

Note that the female user may be informed of the notifications and recommendations a few days ahead of time. This makes it possible for the female user to make preparations for taking measures to protect against ultra-violet rays in advance and manage her schedule, such as making appointments at a training gym. Note that the order of the steps, basis for determination (number of days), notification content, and recommendation content illustrated in the flow chart in FIG. 9 are just one example.

In the case that basal body temperature information is provided to the user using a rotating (scanning) thermal image sensor 30, such as the thermal image sensor 30 illustrated in FIG. 5, when the user is determined to be sleeping, it is desirable that the frequency at which the temperature of the area around the user is measured is increased. This makes it possible to estimate the basal body temperature with a higher degree of accuracy.

Methods used to increase the frequency at which the temperature of a given area is measured using a rotating thermal image sensor 30 includes a method of reducing the rotational speed only while the temperature in an observation pixel 51 in the given area is being measured, and a method of measuring back and forth only the observation pixel 51 for which measurement frequency is desired to be increased.

The air conditioner 10 may store the time the user wakes up on a daily basis, and increase the frequency that the temperature of the user's face is measured during a time period around the time that the user wakes up. This makes it possible to both reduce power consumption and improve the measurement accuracy of the basal body temperature.

Figure 10A:
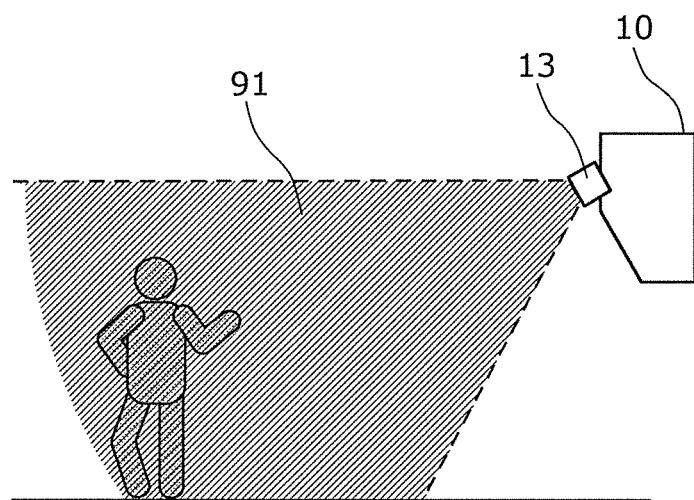
FIG. 10A is a first figure illustrating an example of how the location of the entire observation area is changed based on the location of the user.

The location of the entire observation area 50 may be changed based on the state of the user. FIG. 10A and FIG. 1013 illustrate examples of how the location of the entire observation area 50 is changed based on the location of the user.

Figure 10B:
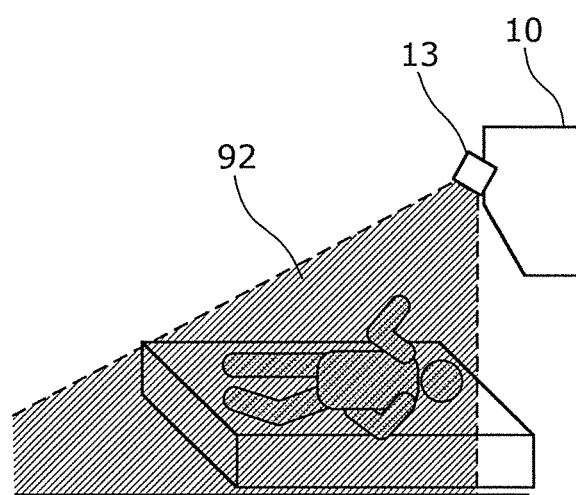
FIG. 10B is a second figure illustrating an example of how the location of the entire observation area is changed based on the location of the user.

Like the entire observation area 91 in FIG. 10A in which the user is awake and the entire observation area 92 in FIG. 10B in which the user is asleep, the air conditioner 10 may include an angle setting changing device for the thermal image sensor 13 for changing the location of the entire observation area based on the state of the user.

This makes it possible for the air conditioner 10 to change the location of the entire observation area and detect the face of the user even when the user is sleeping directly below the air conditioner 10 (outside of the entire observation area 91). Since it is possible to reduce the number of photosensor elements in the thermal image sensor 13 with this sort of configuration, it is possible to realize a low-cost thermal image sensor 13. Note that the angle setting changing device is, more specifically, a rotating structure such as a stepper motor or a servo motor.

The location of an observation pixel 51 that both changes in temperature within a predetermined period of time and indicates a temperature of 30 degrees Celsius or greater may be recognized as the location of the body of the user. Here, a "predetermined period of time" is, for example, one minute to 60 minutes. When a plurality of the observation pixels 51 that fulfill this condition are in a series, the air conditioner 10 can determine that the body of a single user is present in the location of these plurality of observation pixels 51.

As another example, the location of an observation pixel 51 that indicates a temperature of 25 degrees Celsius or greater may be recognized as the location of the body of the user. Moreover, a high temperature observation pixel 51 that indicates a temperature higher than a predetermined amount higher than the room temperature and changes in temperature within a predetermined period of time may be recognized as the location of the body of the user.

Moreover, the posture of the user can be assessed based on the arrangement of the series of observation pixels 51.

The air conditioner 10 can moreover estimate the height of the user based on the vertical height (length in the Y axis direction) of the series of observation pixels 51 determined to be the location of the body the user. With this method, since the vertical height of the observation pixels 51 equivalent to the body of the user varies depending on the posture of the user (whether the user is, for example, standing or sitting), accurately estimating the height of the user is difficult. However, by regularly storing the measurement result of the vertical height of the observation pixels 51 per user, it is possible to estimate the height of the user while standing based on the maximum vertical height of the observation pixels 51.

If user height can be estimated in this way, it is possible to differentiate the users based on height and provide air conditioning at different settings for different users. For example, when the preferred room temperature is different for each user, by differentiating between users, the air conditioner 10 can automatically change the temperature setting based on the user in the room.

Note that the relationship between the vertical height of the observation pixels 51 and the height of the user varies depending on the distance between the user and the thermal image sensor 13 (the air conditioner 10). For this reason, the air conditioner 10 may include a system which estimates the distance between the user and the thermal image sensor 13. This makes it possible to estimate the height of the user with greater accuracy.

A system which measures the distance between the air conditioner 10 and the floor is used as the system for measuring the distance between the user and the air conditioner 10. For example, the distance between the floor may be measured by installing a contactless distance measuring system such as a laser focus structure or an ultrasound system on the bottom of the air conditioner 10.

In the air conditioner 10, the direction (angle) of each observation pixel 51 relative to the thermal image sensor 13 is known (determined in advance). Consequently, the air conditioner 10 can, based on the distance between the floor and the thermal image sensor 13, compute how far apart each observation pixel 51 is from the floor directly below the air conditioner 10. In other words, the air conditioner 10 can compute the distance between a user standing on the floor and the air conditioner 10.

In this way, computing the distance between the user and the air conditioner 10 makes it possible to more accurately estimate the height of the user and more accurately differentiate between users.

The air conditioner 10 may also include a system for setting the distance between the air conditioner 10 and the floor (such as a remote control setting). Having the height of the installation location of the air conditioner 10 (distance from the floor to the installation location) being input by the user or the installer of the air conditioner 10 makes it possible to more accurately measure the height of the user.

Moreover, the air conditioner 10 may include a system for measuring how tilted the installation angle of the air conditioner 10 is with respect to a direction perpendicular to the floor (that is, a vertical direction). This makes it possible to more accurately estimate the height of the user and the distance between the user and the air conditioner 10 even when the air conditioner 10 is installed tilted at an angle, such as when the surface (wall) to which the air conditioner 10 is installed is not perpendicular to the floor.

The air conditioner 10 may also include a lighting system that illuminates the observation area of the thermal image sensor 13, and this system may be adjacent to the lighting device. Illuminating the entire observation area 50 of the thermal image sensor 13 makes it possible for the user to easily confirm the area where the temperature is being measured (which is the area illuminated).

Therefore, the lighting system is desirably a dedicated system that shines light only on the entire observation area 50 of the thermal image sensor 13. This sort of lighting system makes it possible for the user to accurately assess the location of the entire observation area 50.

Moreover, the thermal image sensor 13 may include a far-infrared irradiation system, and alternatively may be adjacent to the far-infrared irradiation system. In this case, it is desirable that the optical system of the thermal image sensor 13 be designed such that the further a target object to which far-infrared light is radiated is from the far-infrared irradiation system, the lower the density of the far-infrared light received as a result of the radiation is.

The air conditioner 10 having such a configuration can assess the distance between each area in the observation area and the thermal image sensor 13 by comparing thermal image data from the thermal image sensor 13 when far-infrared light is radiated toward the observation area with thermal image data from the thermal image sensor 13 when far-infrared light is not radiated. This is because the greater the amount of variation between the radiation thermal image data and the non-radiation thermal image data for an observation pixel 51, the closer an object in the observation pixel 51 is to the thermal image sensor 13. Accordingly, the air conditioner 10 can recognize an obstruction that blocks the flow of air in the room (such as a dresser placed next to the air conditioner 10), and control the flow of air such that the air flows around the obstruction to the user. By, for example, changing the direction of the air flow to a direction in which the obstruction is not located, efficient air conditioning can be provided and low power consumption can be achieved.

Moreover, by assessing the posture of the user as described above, the air conditioner 10 can detect an observation pixel 51 that corresponds to a hand or leg of the user. In other words, the air conditioner 10 can measure the temperature of an observation pixel 51 corresponding to a hand or leg of the user.

Based on research carried out by the inventors, it is known that, although the temperature of a user's hand when the user feels most comfortable varies from person to person, the majority of people feel most comfortable when the temperature of their hands is around 30 degrees Celsius. Consequently, as a result of the air conditioner 10 measuring the temperature of a user's hand and performing automatic control such that the temperature of the user's hand becomes approximately 30 degrees Celsius, it is possible to spare the user the trouble of adjusting the room temperature.

Moreover, for users who cannot operate the air conditioner themselves, such as users who are sleeping or users who are children, this sort of automatic control is effective in preventing excessive heating or cooling, and thus effective from an energy saving perspective as well.

Conceivable examples of this automatic control include, for example, when the user is using the cooling function of the air conditioner 10 during the summer, reducing the intensity of the cooling when the temperature of the user's hand is less than 30 degrees Celsius and increasing the intensity of the cooling when the temperature of the user's hand is 30 degrees Celsius or greater. Note that increasing the movement of heat between inside and outside the room with the heat exchanger 18a increases the intensity of the cooling and reducing the movement reduces the intensity of the cooling. When the heat exchanger 18a is a compressor, increasing the number of rotations increases the intensity of the cooling and reducing the number of rotations reduces the intensity of the cooling. Moreover, the same holds true for the heater during the winter.

By controlling the heat exchanger 18a by estimating the user's thermal sensation based on the temperature of the user's hand, it is possible to reduce instances where the heater is being used despite the temperature of the user's hand being 30 degrees Celsius or greater, as well as instances where the cooler is being used despite the temperature of the user's hand being 30 degrees Celsius or less. In other words, it is possible to save energy.

Note that the longer a user is in a high-temperature, high-humidity environment, the greater the temperature of his or her hand will be, making the user feel hot. Dehumidification may therefore be performed instead of increasing the intensity of the cooling in the above-described automatic control.

The air conditioner 10 includes the heat exchanger 18a, but an air conditioner that includes a heat-generating system (heat-generating device) such as an electric or kerosene heater, or an air conditioner that includes a humidifying and dehumidifying function instead of a heating and cooling function is also capable of performing similar control.

For example, when the temperature of the user's hand is high, in the case of heating, the intensity of the heating may be reduced by reducing the driving power of the heat exchanger 18a, and in the case of cooling, the intensity of the cooling may be increased by increasing the driving power of the heat exchanger 18a. Moreover, when the temperature of the user's hand is high, using the heat-generating system, the intensity of the heating may be reduced, the intensity of the humidification may be reduced, or the intensity of the dehumidification may be increased. This is because the hotter or more humid the user is, the hotter the user's hand is, and the cooler or less humid the user is, the cooler the user's hand is.

Moreover, automatic control just like with the temperature of the hand may be performed based on temperature measurement of the user's leg.

Moreover, similar automatic control may be performed by measuring the temperature of a part of the user other than his or her arm or leg, but the user's limbs, in particular the user's hands and feet, are suitable as a reference for measuring the level of comfort of the user. Through research, the inventors have found that, as a reference for the user's thermal sensation and the user's level of comfort, the user is sensitive to the temperature of his or her limbs compared to other parts of the body. Thus, highly accurate temperature control can be achieved using the temperature of the user's limbs as a reference.

[User Interface]

Figure 11A:
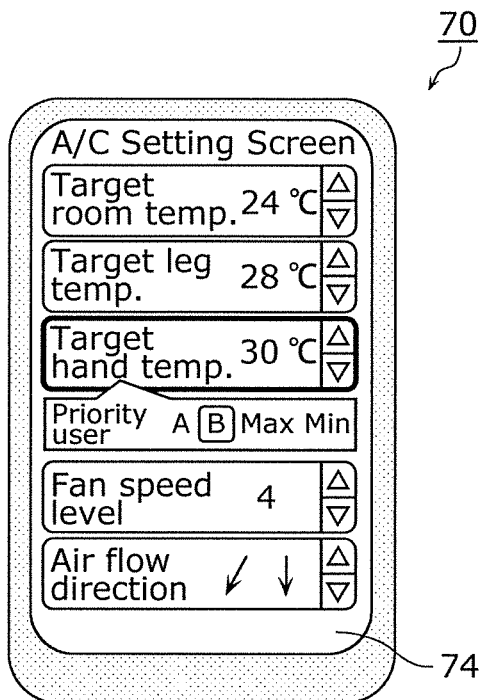
FIG. 11A is a first figure illustrating an example of a user interface of an air conditioner.
Figure 11B:
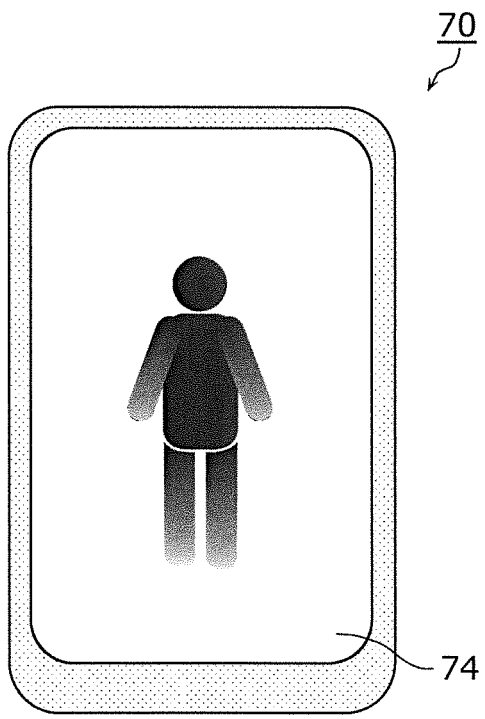
FIG. 11B is a second figure illustrating an example of a user interface of an air conditioner.
Figure 11C:
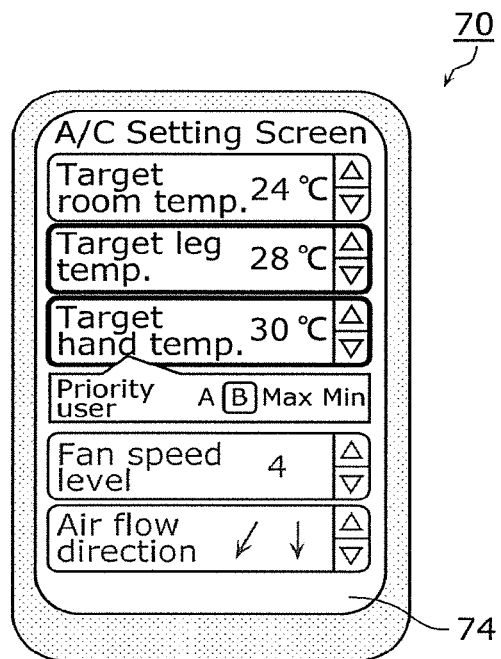
FIG. 11C is a third figure illustrating an example of a user interface of an air conditioner.

Hereinafter the user interface of the above-described air conditioner 10 will be described. FIG. 11A, FIG. 11B, and FIG. 11C illustrate examples of the user interface of the air conditioner 10.

As an example of the user interface, FIG. 11A, FIG. 11B, and FIG. 11C illustrate a remote control 70 including a display device 74 having an input function such as a touch panel. Note that the type of user interface is not limited to this example; the input device (setting receiver) and the display device 74 may be separate. Moreover, the user interface of the air conditioner 10 is not limited to this sort of dedicated remote control. A smart phone or tablet with an application installed may be used as the remote control 70 for the air conditioner 10.

The user interface of the air conditioner 10 has the following characteristics.

With conventional air conditioners, the user typically uses a remote control to set the room temperature, fan speed, and air flow direction. Conversely, with the air conditioner 10, the user can set a target hand temperature or a target leg temperature, as illustrated in FIG. 11A. This makes it possible, for example, for the user to set a desired hand temperature (leg temperature) as a target temperature.

With the user interface illustrated in FIG. 11A, specific target temperatures are set for hand and leg temperatures, but selections (icons) such as "hot", "medium", and "cool" may be displayed on the user interface. When these icons are displayed, the amount of text displayed on the user interface is reduced, making it possible to increase readability by increasing the size of the icons displayed. Moreover, user's who are unsure of their ideal hand temperature can more easily select an air conditioning control based on their hand temperature. Note that "hot", "medium", and "cool" are equivalent to user hand temperatures of 31 degrees Celsius, 30 degrees Celsius, and 29 degrees Celsius, respectively.

The air conditioner 10 may have a configuration in which a mode for controlling the air conditioner 10 based on hand temperature (hand temperature control mode) and a mode for controlling the air conditioner 10 based on leg temperature (leg temperature control mode) are selectable. In this case, for example, the user selects a mode via the user interface.

For example, in FIG. 11A, the target hand temperature is enclosed with a bold line; this is to indicate that the user has selected the hand temperature control mode.

For example, the user can change the mode depending on the state of the user (for example, what clothes the user is wearing), such as select the leg temperature control mode when barefoot, or select the hand temperature control mode when wearing slippers. This makes it possible for the air conditioner 10 to more accurately estimate the thermal comfort of the user and provide air conditioning accordingly.

Moreover, a thermal image (icon of a silhouette of a person in FIG. 11B) visually indicating the current body temperature of the user may be displayed on the user interface, as illustrated in FIG. 11B. In FIG. 11B, the color of the icon is dependent on the temperature of the user (in FIG. 11B the color is illustrated in shading; the darker shaded portions indicate a hotter region). For example, high temperature regions are displayed in red, and low temperature regions are displayed in blue.

This makes it possible for the user to know his or her current body temperature at a glance. This in turn makes it possible for the user to easily estimate a target hand temperature or target leg temperature setting.

Note that the user interface may be configured such that the user can change the target room temperature, target hand temperature, and target leg temperature directly from the screen displayed in FIG. 11B. For example, a configuration where the target room temperature, target hand temperature, and target leg temperature can be changed by the user touching, or performing an input action such as tracing, a region on the user interface corresponding to a region the user desires to increase the temperature of, is conceivable.

Figure 11D:
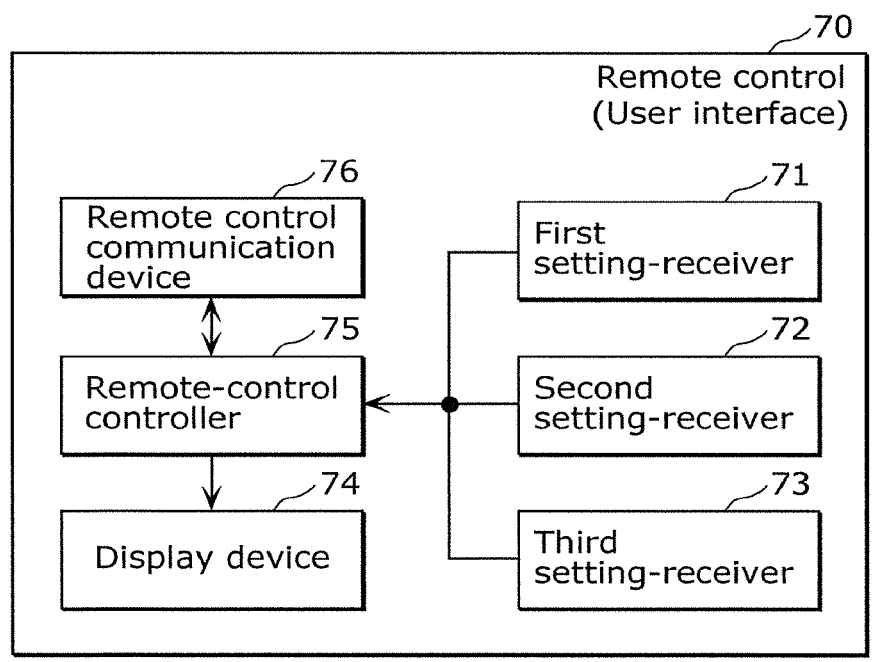
FIG. 11D is a block diagram illustrating a user interface of an air conditioner.

Hereinafter, the system configuration of the remote control 70 (user interface) will be described. FIG. 11D is a block diagram illustrating the system configuration of the remote control 70.

As illustrated in FIG. 11D, the remote control 70 includes a first setting-receiver 71, a second setting-receiver 72, a third setting-receiver 73, a display device 74, a remote-control controller 75 (controller), and a remote control communication device 76 (communication device).

The remote control 70 is a user interface for the air conditioner 10, which includes a thermal image sensor 13 for generating a thermal image showing a temperature distribution of a target area (for example, inside a room).

The first setting-receiver 71 receives a target temperature setting for a room. More specifically, the first setting-receiver 71 is a touch panel (the region illustrated in FIG. 11A for setting the target room temperature) layered with the display device 74, but the first setting-receiver 71 may be a mechanical button.

The second setting-receiver 72 receives a target temperature setting for a certain part of the target area. The second setting-receiver 72 receives, as the target temperature for the certain part, a target temperature setting for at least one of the location of the person's face, the location of the person's hand, or the location of the person's leg. More specifically, the second setting-receiver 72 is a touch panel (the region illustrated in FIG. 11A for setting the target leg temperature and the target hand temperature), but the second setting-receiver 72 may be a mechanical button.

The third setting-receiver 73 receives an air flow direction setting and a fan speed setting for the air conditioner 10. More specifically, the third setting-receiver 73 is a touch panel (the region illustrated in FIG. 11A for setting the air flow direction and fan speed level settings), but the second setting-receiver 72 may be a mechanical button.

As will be described later, when the setting for the target temperature is set for the first setting-receiver 71 and the setting for the target temperature is set for the second setting-receiver 72, the third setting-receiver refrains from receiving the setting for the air flow direction and the setting for the fan speed. Here, "does not receive a setting" more specifically means, for example, an input received by the third setting-receiver 73 is not recognized as a valid input by the remote-control controller 75, or the remote-control controller 75 does not transmit an input received by the third setting-receiver 73 to the air conditioner 10 as a command.

The display device 74 displays images such as those illustrated in FIG. 11A through FIG. 11C. The display device 74 displays the target room temperature, the target leg temperature, the target hand temperature, the air flow direction, and the fan speed. The display device 74 is, more specifically, a liquid crystal panel or an organic electroluminescent (EL) display.

The display device 74 moreover displays the temperature at the location of a person detected based on the thermal image data. Here, the location of a person includes at least one of the location of a person's face, the location of a person's hand, or the location of a person's leg. More specifically, the display device 74 displays the body temperature of a person with a colorful person-shaped icon, such as the one illustrated in FIG. 11B, but the display device 74 may display temperature as numbers.

As will be described later, when target temperatures are set for each of the first setting-receiver 71 and the second setting-receiver 72, the display device 74 displays that input of a setting to the third setting-receiver 73 is not possible. More specifically, the display device 74 displays the area for the air flow direction and the fan speed as faded (grayed), as illustrated in FIG. 11C.

The remote-control controller 75 transmits commands corresponding to the settings received by the first setting-receiver 71, the second setting-receiver 72, and the third setting-receiver 73 to the air conditioner 10 via the remote control communication device 76. Moreover, based on thermal image data (information on the thermal image) received by the remote control communication device 76, an icon of a person indicating body temperature like the one illustrated in FIG. 11B is displayed on the display device 74.

The remote control communication device 76 is a communication module for the remote-control controller 75 to transmit commands to the air conditioner 10. The remote control communication device 76 receives thermal image data from the air conditioner 10 (the thermal image sensor 13). The remote control communication device 76 is a wireless communication module that employs infrared light technology. Note that the air conditioner 10 includes a communication device for communication with the remote control communication device 76.

[User Level of Comfort]

The user's level of comfort is affected by not only his or her body surface temperature, but his or her core temperature as well. Temperature may therefore be measured from at least two locations: temperature of a portion of the body which closely indicates core temperature (face, neck, etc.) and temperature of an extremity (hand, leg, etc.), such as "face temperature and hand temperature" or "neck temperature and leg temperature". This allows for more accurate estimation of the level of comfort of the user, and more accurate air conditioning based on the estimation.

The air conditioner 10 (the image processor 16a) may determine whether the user is wearing glasses, a mask, gloves, socks, or slippers, etc., based on the thermal image data. The air conditioner 10 may include a system which notifies the user of a decrease in temperature measurement accuracy based on the user wearing, for example, glasses, a mask, gloves, socks, or slippers, etc., based on the above detection result. For example, an alarm is displayed on the user interface illustrated in FIG. 11A and FIG. 11B to notify the user of this.

This makes it possible to make the user aware that the temperature measurement is inaccurate, which allows the user to eliminate the source of the inaccurate measurement or switch to a different mode which uses a different reference that yields an accurate measurement.

For example, when the user is wearing gloves, by displaying "inaccurate hand temperature measurement due to gloves" on the user interface, the user can switch to the leg temperature control mode, or remove his or her gloves, for example. This increases the temperature measurement accuracy of the air conditioner 10.

Moreover, at this time, other than notification by display of text, the user may be notified by audio by a notification system. This makes it possible to notify the user in real time. Moreover, using both notification systems of audio and text display makes it possible to increase the notification accuracy to the user when the user is in a loud environment or listening to music.

Note that the following method can be used to determine whether the user is wearing an article such as a mask or not. It is possible to determine whether the user is wearing a mask or not from the temperature difference between the temperature of an observation pixel 51 corresponding to the user's eye and the temperature of an observation pixel 51 corresponding to the user's mouth. When the user is wearing a mask, the temperature of an observation pixel 51 corresponding to the user's mouth is greater than when the user is not wearing a mask. It is possible to determine whether the user is wearing glasses or not with the same method since the temperature of an observation pixel 51 corresponding to an eye decreases. Moreover, it is possible to determine whether the user is wearing gloves or not by comparing the temperature of an observation pixel 51 corresponding to the palm of the user's hand with the temperature of an observation pixel 51 corresponding to the user's upper arm, and possible to determine whether the user is wearing socks or slippers by comparing the temperature of an observation pixel 51 corresponding to the user's foot with the temperature of an observation pixel 51 corresponding to the user's calf.

When it is the thermal image sensor 13 that determines whether the user is wearing glasses, a mask, gloves, socks, or slippers, etc., the size of each observation pixel 51 is desirably 10 cm×10 cm or smaller. Setting the size of each observation pixel 51 to be 10 cm×10 cm or smaller makes it possible to more accurately determine whether the user is wearing a certain article or not. Although different models are designed for rooms of different dimensions, with the air conditioner 10, the size of each observation pixel 51 is desirably 10 cm×10 cm or smaller in a location 3.6 m away for an air conditioner 10 designed for a 6-jo (roughly 10 m$^2$) room, 4.5 m away for an air conditioner 10 designed for an 8-jo (roughly 13 m$^2$) room, and 7.2 m away for an air conditioner 10 designed for a 12-jo (roughly 19 m$^2$) room. Additionally, in accordance with setting the size of each observation pixel 51 smaller, it is desirable that the total number of observation pixels 51 be greater than 512.

The air conditioner 10 may measure the temperature of the outermost article of clothing the user is wearing based on the thermal image data. With this, the thermal insulation properties of the clothes (the amount of clothes) the user is wearing can be estimated as one state of the user. The clothes the user is wearing can be determined to have high thermal insulation properties for lower temperatures of the outermost article of clothing, and when the thermal insulation property is determined to be high, it is possible to increase the intensity of the cooling (reduce the intensity of the heating). Since the relation between the user's thermal sensation and the temperature of his or her hand or leg changes depending on the amount of clothes the user is wearing, air conditioning suited to the user's thermal sensation is provided by estimating the amount of clothes the user is wearing and correcting the air conditioning temperature set based on the amount of clothes.

Moreover, the relationship between the user's thermal sensation and the temperature of his or her limbs is affected by radiant heat from the room. The air conditioner 10 therefore desirably includes a system for measuring the distribution of the temperature in the room. This allows for air conditioning that is suited to the user's thermal sensation and performed according to the radiation of heat from the room. Note that the measurement of the temperature distribution of the room is performed by, for example, the thermal image sensor 13.

The relationship between the user's thermal sensation and the temperature of his or her limbs is also affected by humidity. The air conditioner 10 therefore desirably includes a system for measuring the humidity in the room. This allows for air conditioning that is suited to the user's thermal sensation and performed according to the humidity in the room. Note that the measurement of the humidity is performed by, for example, a common hygrometer.

The relationship between the user's thermal sensation and the temperature of his or her limbs is also affected by the user's amount of exercise, amount of activity, and posture. The air conditioner 10 therefore desirably includes a system for measuring the user's amount of exercise, amount of activity, and posture. This allows for air conditioning that is suited to the user's thermal sensation and performed according to the user's amount of exercise, amount of activity, and posture. Note that the user's amount of exercise, amount of activity, and posture is computed from, for example, an image captured by the thermal image sensor 13.

The relationship between the user's thermal sensation and the temperature of his or her limbs is also affected by the user's circadian rhythm. The air conditioner 10 therefore desirably includes a system for measuring the current time (a clock). This allows for air conditioning that is suited to the user's thermal sensation and takes into account the influence of the circadian rhythm.

The relationship between the user's thermal sensation and the temperature of his or her limbs is also affected by the user's behavior, such as the user's eating or bathing routine.

The air conditioner 10 therefore desirably includes a system for assessing the user's behavior, such as the user's eating or bathing routine. This allows for air conditioning that is suited to the user's thermal sensation and performed according to the user's behavior. For example, whether the user is eating or not can be deduced by detecting a heat source on top of the dining table. Moreover, the air conditioner 10 may determine that a user is eating based on the amount of time the user remains around the dining table, or the number of users around the dining table. Moreover, it is possible to determine whether a user is bathing or not based on information on the body temperature of the user. The thermal image sensor 13 is therefore used to determine both whether the user is eating or not and whether the user is bathing or not.

The relationship between the user's thermal sensation and the temperature of his or her limbs is also affected by the season. The air conditioner 10 therefore desirably includes a system for measuring the date and time and the outside temperature. This allows for air conditioning that is suited to the user's thermal sensation and performed according the season.

The relationship between the user's thermal sensation and the temperature of his or her limbs is also affected by the user's perspiration. The air conditioner 10 therefore desirably includes a system for measuring the amount of perspiration produced by the user. This allows for air conditioning that is suited to the user's thermal sensation and performed according to the measured amount of perspiration. The system for measuring the user's amount of perspiration is, for example, a wearable sensor or far-infrared range spectroscopic sensor that measures the electrical conductivity of the skin.

Note that the user's amount of perspiration may be estimated as follows. Generally, moisture is easily absorbed in light having a wavelength of 6 μm to 7 μm. Therefore, if, for example, the air conditioner 10 includes a system for measuring infrared light having a wavelength of 7 μm or lower and a system for measuring infrared light having a wavelength of 7 μm or higher, it is possible to measure a humidity distribution from a light amount ratio of infrared light received by the two measuring systems. Then, when the humidity in the area around the user is higher than the humidity of the broader area, it can be estimated that the humidity will increase from the evaporation of perspiration. In this way, the air conditioner 10 may estimate the amount of perspiration from a humidity distribution of an area around the user.

Moreover, the air conditioner 10 may perform the same measurement using near-infrared wavelengths that cause absorption of water, such as 1.5 μm and 1.9 μm. So long as these spectroscopic methods which employ infrared light are used, the air conditioner 10 can measure the user's amount of perspiration with a contactless method. In other words, the air conditioner 10 can measure the amount of perspiration for a user who is not wearing a wearable sensor.

Moreover, the air conditioner 10 may estimate the amount of perspiration using spectroscopic technology by measuring the moisture of the user's skin of body parts not covered by clothes, such as the user's face, neck, hands, and legs.

The air conditioner 10 may measure the temperature of the user's nose based on the thermal image data. This makes it possible to estimate the stress state of the user.

Embodiment 1 provides an example where the air conditioner 10 estimates the user's thermal sensation using the temperature of the user's hand or the temperature of the user's leg and performs air conditioning control accordingly.

Here, the air conditioner 10 may measure the temperature of one or more of the user's cheek, nose, ear, and chin based on the thermal image data. This increases the estimation accuracy of the user's thermal sensation. This also makes it possible to accurately estimate the user's thermal sensation even when the user is wearing gloves or slippers.

When the thermal image sensor 13 is used to measure the temperature of one or more of the user's cheek, nose, ear, and chin, the size of each observation pixel 51 is desirably 5 cm×5 cm or smaller. Setting the size of each observation pixel 51 to be 5 cm×5 cm or smaller makes it possible to more accurately measure the temperature of the user's nose. Although different models are designed for rooms of different dimensions, with the air conditioner 10, the size of each observation pixel 51 is desirably 5 cm×5 cm or smaller in a location 3.6 m away for an air conditioner 10 designed for a 6-jo (roughly 10 m$^2$) room, 4.5 m away for an air conditioner 10 designed for an 8-jo (roughly 13 m$^2$) room, and 7.2 m away for an air conditioner 10 designed for a 12-jo (roughly 19 m$^2$) room. Additionally, in accordance with setting the size of each observation pixel 51 smaller, it is desirable that the total number of observation pixels 51 be greater than 512.

The air conditioner 10 may measure the temperature difference between the temperature of the upper part of the user's body and the temperature of the lower part of the user's body based on the thermal image data. Since this makes it possible to determine whether the user is sensitive to cold temperatures or not, the air conditioner 10 can increase the intensity of the heating at the user's feet when the heater is in use. The user may choose whether to use this feature or not via the user interface. With this, the user can choose a desired function.

When there are a plurality of users in the room in which the air conditioner 10 is installed, there are instances where hand temperature (leg temperature) varies from user to user. The air conditioner 10 therefore desirably includes a system capable of setting which user is to be a priority user. This makes it possible to provide air conditioning control where the hand temperature (leg temperature) is the target value even in a room occupied by a plurality of users having different hand temperatures (leg temperatures).

Setting for the priority user may be done via the user interface, for example. FIG. 11A illustrates an example where "B" is selected from among four selections (icons) "A", "B", "Max", and "Min" as the priority user.

For example, by entering height data for a family in advance, the air conditioner 10 can, as described above, measure the height of a user in the room from the thermal image data and determine which user is in the room. Instead of "A" and "B", user names that are entered in advance ("Dad", "Sister", or personal names) may be displayed as the selections (icons).

Moreover, when "Max" illustrated in the example in FIG. 11A is selected, the air conditioner 10 switches to a mode that performs control such that the hand temperature of the user having the highest hand temperature among the users in the room is set as the target hand temperature. When "Min" illustrated in the example in FIG. 11A is selected, the air conditioner 10 switches to a mode that performs control such that the hand temperature of the user having the lowest hand temperature among the users in the room is set as the target hand temperature. Such modes may also be provided as selections.

In addition to the above modes, a mode that performs control using the body temperature of the user closest to the air conditioner 10 as a reference, and conversely a mode that performs control using the body temperature of the user furthest from the air conditioner 10 as a reference may also be provided. Furthermore, a mode where a given location is set and performs control using the body temperature of the user closest to the given location as a reference may also be provided.

In this way, by providing modes that select a user based on location and perform control using the body temperature of the selected user as a reference, control that is highly flexible for the user can be achieved.

Moreover, when the body temperatures (hand temperature, leg temperature) of a plurality of users in a room are different, different temperature environments may be provided to different users by adjusting the air flow direction and fan speed, such as sending air in the direction of a user with a high body temperature when the cooler is in use, or sending air in the direction of a user with a low body temperature when the heater is in use. This makes it possible to provide comfortable in-room environments for a plurality of users.

In the case that a single user is present, the air flow direction and the fan speed may be adjusted such that the temperature for each of two or more body parts of a single user (for example, a hand and a leg) is a target temperature. In this case, for example, the target hand temperature and the target leg temperature are enclosed with a bold line on the user interface (to indicate that they have been selected by the user), as illustrated in FIG. 11C. However, controlling the air flow direction and the fan speed is essential for setting two or more body parts as target temperatures.

In other words, in this case, the air flow direction and the fan speed are not settable from the user interface so that the air flow direction and the fan speed cannot be set by the user. In other words, the area for the air flow direction and the fan speed is displayed on the user interface as faded (grayed), as illustrated in FIG. 11C. Note that instead of displaying them as faded, the user may be notified that changing the settings for the air flow direction and the fan speed is not possible.

The air conditioner 10 may also assess the room layout from thermal image data of the room. This makes it possible to provide air conditioning that is suited to the user's behavior.

For example, the air conditioner 10 can detect the location of the user's pillow in order to detect the location of the user's face while the user is sleeping. The air conditioner 10 can keep the user's throat or facial skin from drying out by avoiding sending air directly to the user's face while the user is sleeping.

The air conditioner 10 may detect the location of the dining table and store the location in a memory in the air conditioner 10. This makes it possible to recognize a period where a user is in the vicinity of the dining table as the user eating a meal, and perform control such as reducing the intensity of the heating if winter time. For example, the air conditioner 10 can recognize a location where a user is from a predetermined point time (for example from 7:00 AM) for a period of 10 minutes to 60 minutes as the dining table.

Moreover, when the temperature of an observation pixel 51 corresponding to the dining table is between 100 degrees Celsius and 80 degrees Celsius, the air conditioner 10 can determine that the user is eating a hot pot dish. When the user is determined to be eating a hot pot dish in the winter time, the air conditioner 10 can moreover perform control to reduce the intensity of the heating. In this case, if the air conditioner 10 includes a dehumidifying function, the air conditioner 10 may perform dehumidification in addition to reducing the intensity of the heating. The user may choose whether to use this feature or not via a user interface such as a remote control. This makes it possible to allow the user to select functions based on his or her preferences.

[Variation of Embodiment 1]

The air conditioner 10 according to Embodiment 1 has been hereinbefore described. Note that in Embodiment 1, the air conditioner 10 is described as being installed inside a room, but the air conditioner 10 may be realized as an air conditioner in a vehicle. Note that a specific example of a vehicle air conditioner will be given later.

Note that in Embodiment 1, the air conditioner 10 measures the temperature of the user's hand and leg using the thermal image sensor 13, but the air conditioner 10 may measure the temperature of the user's hand and leg using a wearable temperature measuring device having a communication device (for example, a wearable device in the form of a wrist watch or a device installed in a shoe (or sock)). In this case, equivalent results are obtained by the temperature measuring device regularly notifying the air conditioner 10 of the user's hand and leg temperature via the communication device. Note that using the thermal image sensor 13 has the advantage of being able to measure the temperature of the user's hand and leg without requiring the user to wear a temperature measuring device.

Moreover, in Embodiment 1, the air conditioner 10 is described as including the thermal image sensor 13 internally, but the thermal image sensor 13 and the air conditioner 10 may be provided separately and connected over a network through a communication device. However, in this case, it is desirable that setting of the installation location for each of the thermal image sensor 13 and the air conditioner 10 be performed; the integrated configuration described in Embodiment 1 is advantageous in that setting of the installation location is not required.

(Embodiment 2)

[Underlying Knowledge Forming Basis of Embodiment 2]

In Embodiment 2, a thermal image sensor will be described. First, the underlying knowledge forming the basis of the thermal image sensor according to Embodiment 2 will be described.

The thermal image sensor 20 having photosensor elements arranged in a matrix described in Embodiment 1 is expensive due to its large size on account of the large number of photosensor elements. Although it is possible to cut costs by reducing the size of each photosensor element arranged in the matrix in the thermal image sensor 20, this decreases sensitivity and reduces the temperature measurement accuracy.

The thermal image sensor 30 including linearly arranged photosensor elements, however, is low-cost since less photosensor elements than the thermal image sensor 20 are used. However, the thermal image sensor 30 takes a long time—a few seconds or more—to measure one frame of thermal image data. Measuring the movement (amount of activity) of a moving object, such as a person or a pet, is therefore difficult with the thermal image sensor 30.

Measuring the amount of activity allows for air conditioner control to be performed in accordance with the amount of activity of each user. For example, since the body temperature of a user with a high amount of activity increases, more suitable control can be performed by measuring the amount of activity and increasing the intensity of the cooling or reducing the intensity of the heating accordingly.

Conventionally, in-depth research of thermal image sensors designed to measure an amount of activity has not been done. PTL 2 discloses a method for generating high-resolution two-dimensional thermal image data by shifting a thermal image sensor having one-dimensionally aligned photosensor elements (arranged in a single line) by a predetermined amount at a changing point in the scanning direction and continuing with the next scanning. However, the measurement of an amount of activity is not considered in PTL 2. Embodiment 2 aims to provide a thermal image sensor structure appropriate for measuring an amount of activity at low cost.

[Configuration]

Hereinafter, the configuration of the thermal image sensor according to Embodiment 2 will be described in detail. In Embodiment 2, multiple configurations of the thermal image sensor will be described, but each configuration is merely an example. It is also possible to combine each of the different configurations of the thermal image sensor to form a new thermal image sensor.

Figure 12:
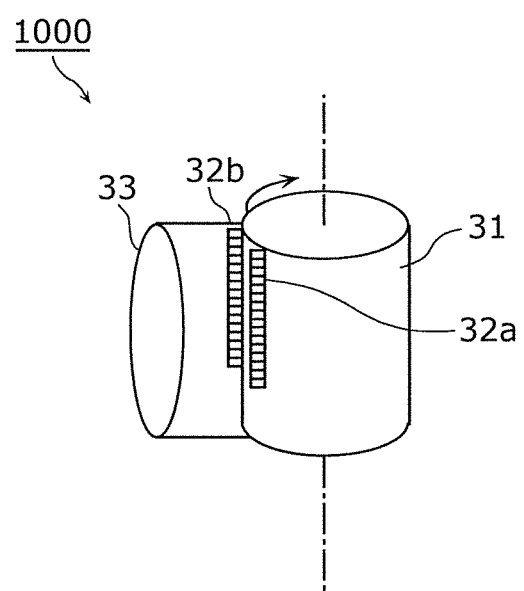
FIG. 12 is an external view of the thermal image sensor according to Embodiment 2.
Figure 13:
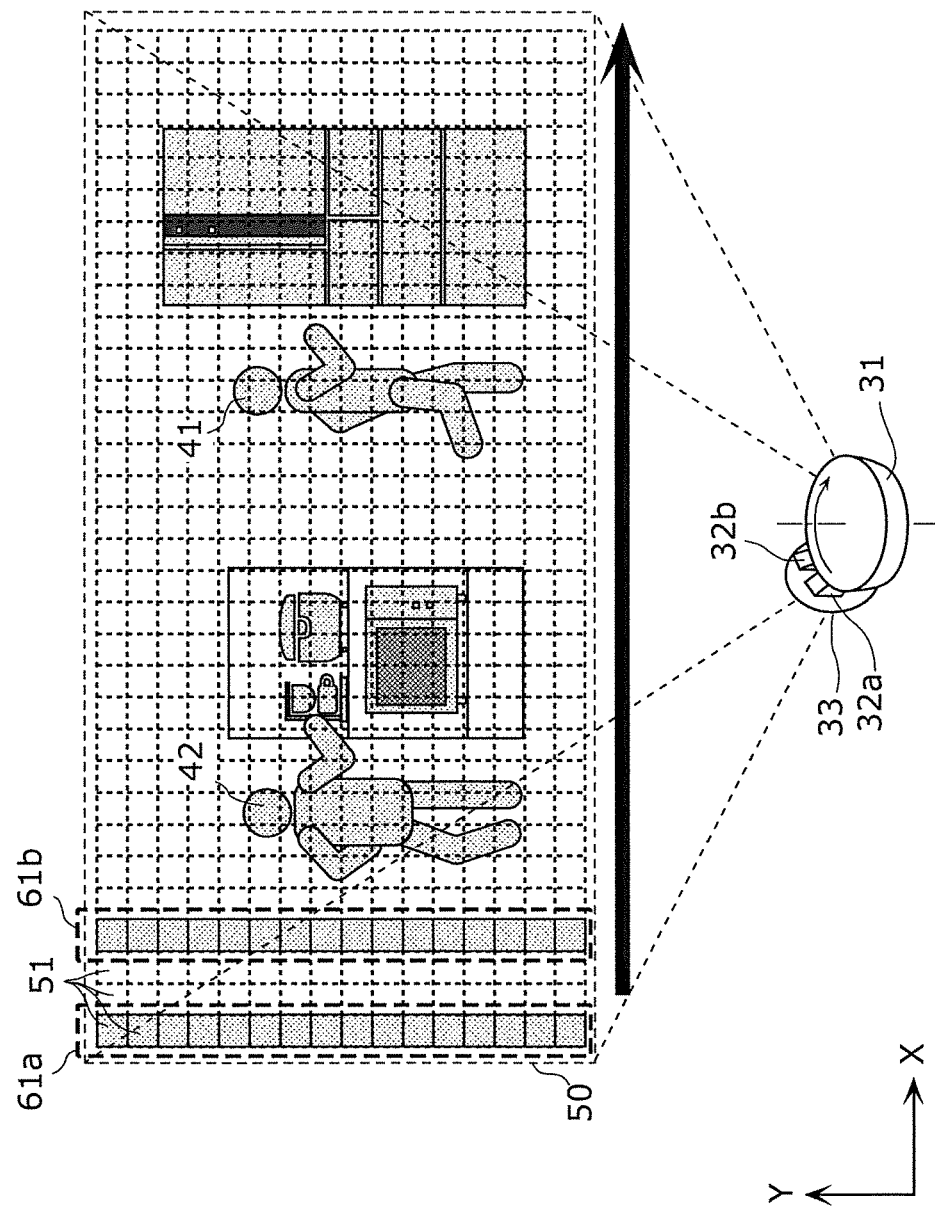
FIG. 13 illustrates the temperature distribution measurement method employed by the thermal image sensor according to Embodiment 2.
(a) in FIG. 14 illustrates the thermal image sensor according to Variation 1 of Embodiment 2, and (b) in FIG. 14 illustrates the observation area of the thermal image sensor illustrated in (a) in FIG. 14.
(a) and (b) in FIG. 15 illustrate the thermal image sensors according to Variation 2 of Embodiment 2, (c) in FIG. 15 illustrates the observation area of the thermal image sensor illustrated in (a) in FIG. 15, and (d) in FIG. 15 illustrates the observation area of the thermal image sensor illustrated in (b) in FIG. 15.
(a) through (d) in FIG. 16 illustrate the thermal image sensors according to Variation 3 of Embodiment 2, and (e) through (h) in FIG. 16 illustrate the observation areas of the thermal image sensors illustrated in (a) through (d) in FIG. 16.
(a) and (b) in FIG. 17 illustrate the thermal image sensors according to Variation 4 of Embodiment 2.
(a) and (b) in FIG. 18 illustrate the thermal image sensors according to Variation 5 of Embodiment 2.
(a) and (b) in FIG. 19 illustrate the thermal image sensors according to Variation 6 of Embodiment 2, and (c) and (d)

First, the configuration of the thermal image sensor according to Embodiment 2 will be described. FIG. 12 is an external view of the thermal image sensor according to Embodiment 2. FIG. 13 illustrates the temperature distribution measurement method employed by the thermal image sensor according to Embodiment 2.

The thermal image sensor 1000 illustrated in FIG. 12 includes the rotator 31 and the lens 33, similar to the thermal image sensor 30. The thermal image sensor 1000 includes the linear one-dimensional photosensor 32, but in contrast to the thermal image sensor 30, the thermal image sensor 1000 includes two lines of the linear one-dimensional photosensor 32 (the one-dimensional photosensors 32*a* and 32*b*).

The observation pixels 51, in which the thermal image sensor 1000 can concurrently measure temperature, are included in two linear observation areas: a 1×16 linear observation area 61*a* and a 1×16 linear observation area 61*b*, as FIG. 12 illustrates. Each linear observation area 61*a* and 61*b* is scanned from left to right (positive direction of the X axis) in FIG. 13 as the rotator 31 rotates. In other words, the temperature in the observation pixels 51, in which temperature has been measured as a result of being included in the linear observation area 61*b*, is measured again as a result of being included in the linear observation area 61*a*.

Thus, with the thermal image sensor 1000, the thermal image data for each observation pixel 51 included in the linear observation area 61*a* and the thermal image data for each observation pixel 51 included in the linear observation area 61*b* are compared, and the variation in thermal image data occurring due to the difference in time of measurement of temperature between the two lines (hereinafter also referred to as thermal image time variation) can be measured. This makes it possible for the thermal image sensor 1000 to detect the presence of a moving object, such as a person or pet.

In other words, with the thermal image sensor 1000, it is possible to determine the following based on the thermal image time variation.

(1) No moving object is present if there is no thermal image time variation.

(2) A moving object is present but the speed of the movement is low (amount of activity is low) if the thermal image time variation is small.

(3) A moving object is present and the speed of the movement is high (amount of activity is high) if the thermal image time variation is large.

The relational expression for the thermal image time variation and amount of activity in (2) and (3) is set in accordance with the difference in time of measurement of the linear observation areas 61*a* and 61*b* or the (assumed) speed of movement of the target object. For example, a relational expression where the time variation of the temperature for each observation pixel 51 is computed, the integrated value (for example, the integrated value of a single vertical line) is defined as the thermal image time variation of a given vertical line, and the amount of activity is proportional to the thermal image time variation, is conceivable.

Moreover, when the rotator 31 is a stepper motor, the width of one step is desirably 1/(integer) of the interval between the linear observation areas 61*a* and 61*b* in the scanning direction (1/(integer) of the interval between the one-dimensional photosensor 32*a* and the one-dimensional photosensor 32*b*). With this, the observation pixels 51 included in the linear observation area 61*b* are, after a few steps, included in the linear observation area 61*a*. In other words, it is possible to detect a moving object with greater accuracy with a simple process by measuring the amount of infrared light in the same observation pixel 51 at different times.

Note that when measurement of the temperature of the same observation pixels 51 is conducted multiple times at different times using a plurality of photosensor elements corresponding to a portion of the entire observation area 50, the photosensor elements are desirably elongated photosensor elements arranged such that the long side is parallel to the scanning direction (rotational direction). With this configuration, by rotating the photosensor less than or equal to the rotational direction width of each photosensor element, thermal image data that has a high resolution in both directions (X and Y axis direction) and a high S/N ratio can be obtained.

In this way, the thermal image sensor 1000 uses a plurality of photosensors corresponding to a portion of the entire observation area 50 to measure the temperature of the same observation pixels 51 multiple times at different times. Note that the thermal image sensor that measures the amount of activity of an object based on this sort of concept is not limited to a configuration like the thermal image sensor 1000.

Hereinafter different configurations (variations) of the thermal image sensor according to Embodiment 2 will be described. The examples described below include an example in which an amount of infrared light radiated from locations of different positions or dimensions is measured at different times rather than an amount of light from the exact same location (the same observation pixel 51) being measured at different times. Even with an amount of infrared light radiated from locations of different positions or dimensions, it is possible to detect a moving object using an amount of infrared light radiated from a near area or an area with an overlapping portion.

Hereinafter, for simplification, the (i) arrangement and rotational direction of the photosensor elements and (ii) the shape and scanning direction of the observation areas (observation pixels 51) for which temperature is concurrently measured are illustrated in the Drawings. Unless otherwise noted, the thermal image sensor according to the following variations has the same configuration as the thermal image sensors 30 and 1000, and includes the rotator 31, the photosensor, and the lens 33.

Note that the variations below are mere examples, and may be combined to form a different embodiment of the thermal image sensor.

[Variation 1 of Embodiment 2]

Figure 14:
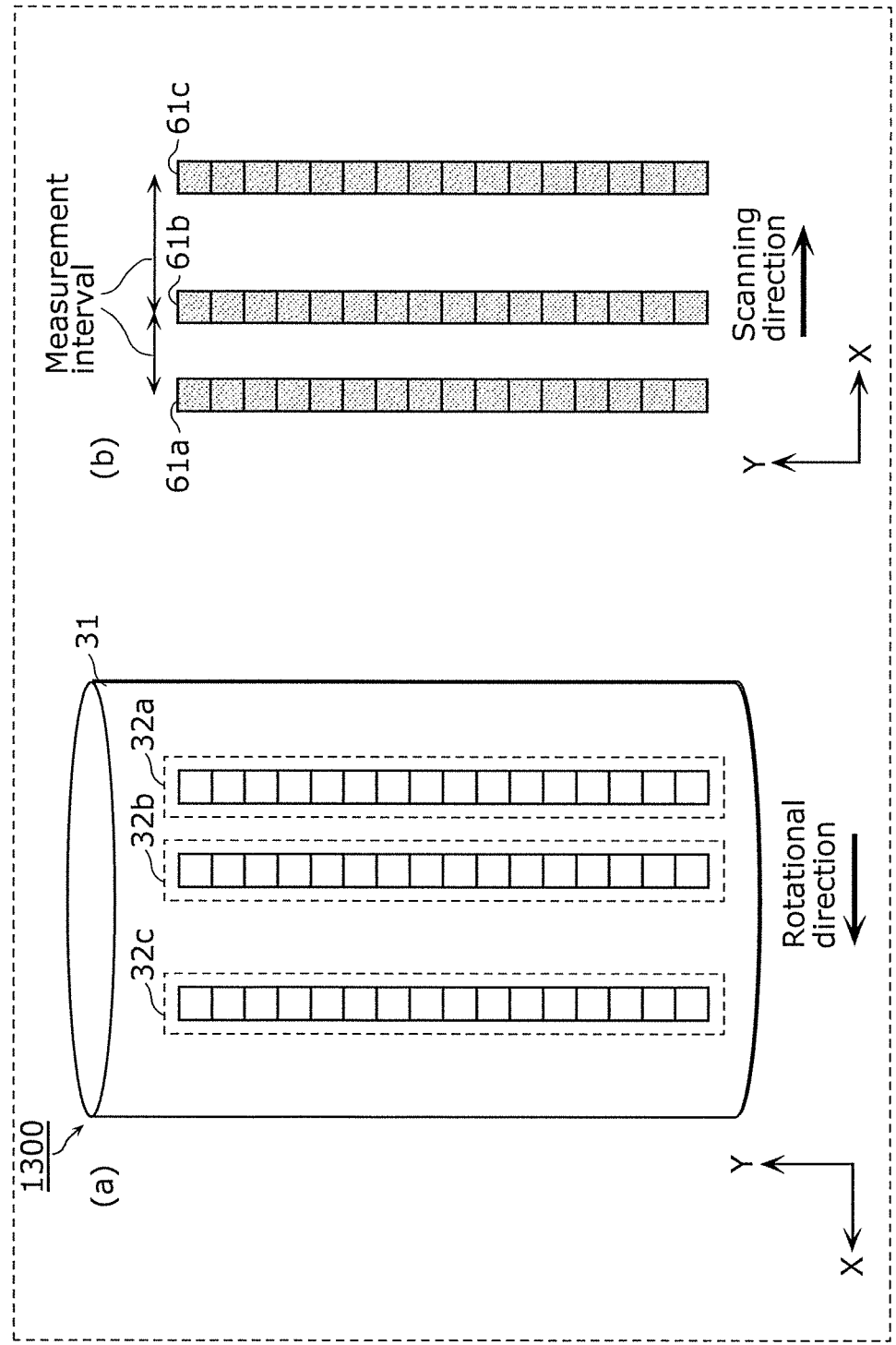

(a) in FIG. 14 illustrates the thermal image sensor according to Variation 1 of Embodiment 2. (b) in FIG. 14 illustrates the observation area of the thermal image sensor illustrated in (a) in FIG. 14.

The thermal image sensor 1300 according to Variation 1 includes three lines of the linear one-dimensional photosensor 32 (the one-dimensional photosensors 32a, 32b, and 32c). In other words, as illustrated in (b) in FIG. 14, when the thermal image sensor 1300 is used, the linear observation areas are formed in three lines—the linear observation area 61a, the linear observation area 61b, and the linear observation area 61c. As such, the thermal image sensor 1300 can more accurately measure the amount of movement (speed) of a moving object.

Note that, as illustrated in (a) in FIG. 14, the distance (here, distance refers to distance in the rotational direction; the same applies hereinafter) between the one-dimensional photosensor 32a and the one-dimensional photosensor 32b and the distance between the one-dimensional photosensor 32b and the one-dimensional photosensor 32c are desirably different. This is because it is possible to measure a moving object using thermal image data obtained at a plurality of different time differences and thus achieve measurement of differences in the speed of travel of a moving object with a higher degree of accuracy.

[Variation 2 of Embodiment 2]

Figure 15:
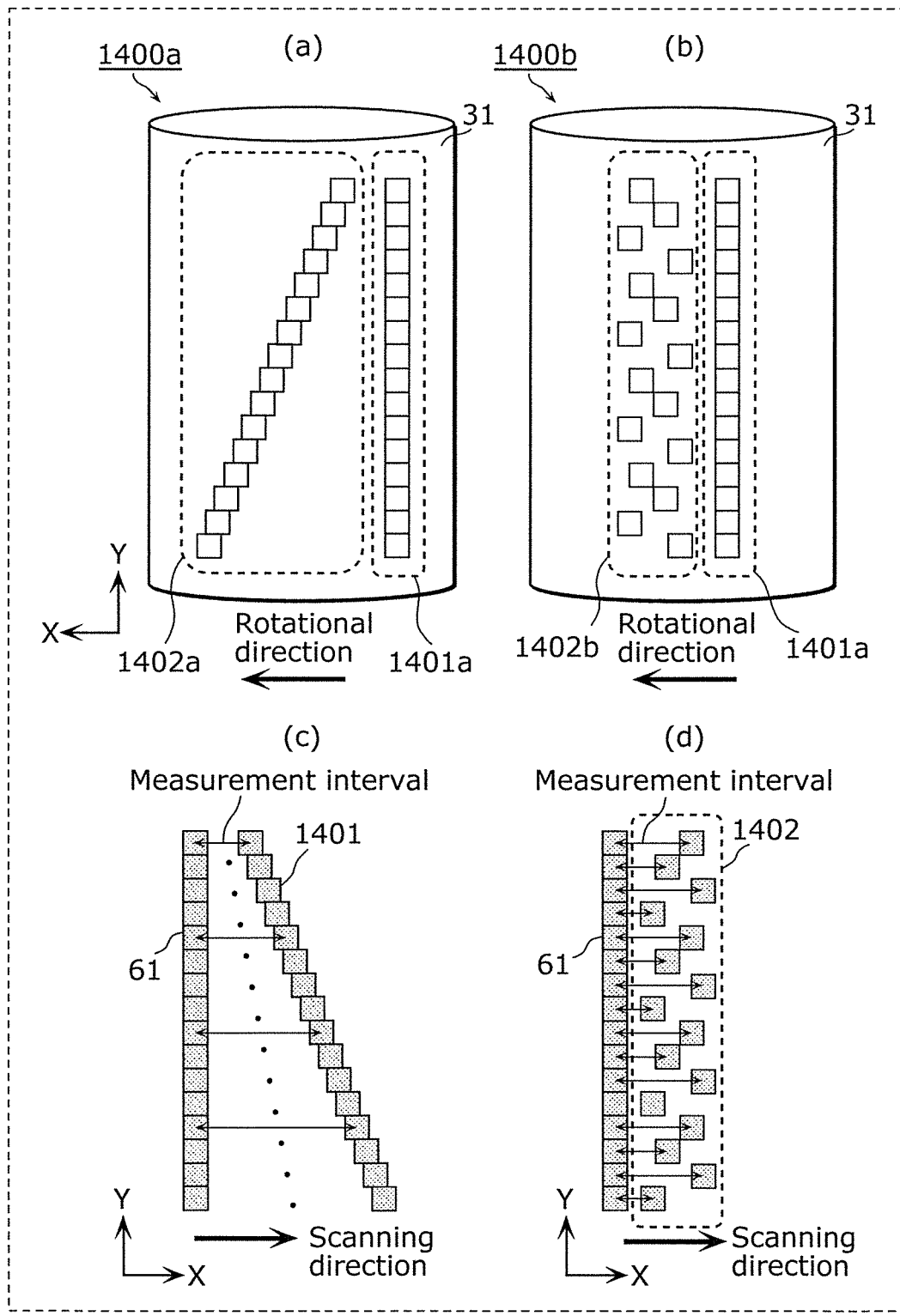

(a) and (b) in FIG. 15 illustrate the thermal image sensors according to Variation 2 of Embodiment 2. (c) in FIG. 15 illustrates the observation area of the thermal image sensor illustrated in (a) in FIG. 15, and (d) in FIG. 15 illustrates the observation area of the thermal image sensor illustrated in (b) in FIG. 15.

The thermal image sensors according to Variation 2 include a first photosensor element line (the first photosensor element line 1401a and the first photosensor element line 1402b), which is the single-line one-dimensional photosensor 32, and a second photosensor element group (the second photosensor element line 1402a and the second photosensor element group 1402b) where the distance between the first photosensor element line 1401a in the rotational direction is not constant. This makes it possible for the thermal image sensors according to Variation 2 to measure the speed of travel of a moving object with a high degree of accuracy.

For example, in the thermal image sensor 1400a illustrated in (a) in FIG. 15, the photosensor elements are arranged such that the distance between the photosensor elements in the first photosensor element line 1401a and the photosensor elements in the second photosensor element line 1402a increases for photosensor elements that are located further in the downward vertical direction (further in the negative direction of the Y axis). Thus, when the thermal image sensor 1400a is used, the linear observation area 61 and the diagonal observation area 1401 are formed, as illustrated in (c) in FIG. 15. With the thermal image sensor 1400a, it is possible to form a linear observation area at low cost.

With the thermal image sensor 1400b illustrated in (b) in FIG. 15, the photosensor elements in the second photosensor element group 1402b are arranged such that their horizontal location is random. In other words, when the thermal image sensor 1400b is used, the linear observation area 61 and the non-linear observation area 1402 are formed, as illustrated in (d) in FIG. 15. The thermal image sensor 1400b performs highly accurate measurement of the speed of travel of smaller objects.

Note that in (a) in FIG. 15, the positional relationship of first photosensor element line 1401a and the second photosensor element line 1402a in the X axis direction may be reversed. In other words, the first photosensor element line 1401a may be located on the X axis positive side of the second photosensor element line 1402a.

The distance between the photosensor elements in the first photosensor element line 1401a and the photosensor elements in the second photosensor element line 1402a may increase with distance in the positive direction of the Y axis, and may alternatively increase with distance in the negative direction of the Y axis. The same also applies to the photosensor elements in the thermal image sensors according to Variation 3 and subsequent variations.

[Variation 3 of Embodiment 2]

Figure 16:
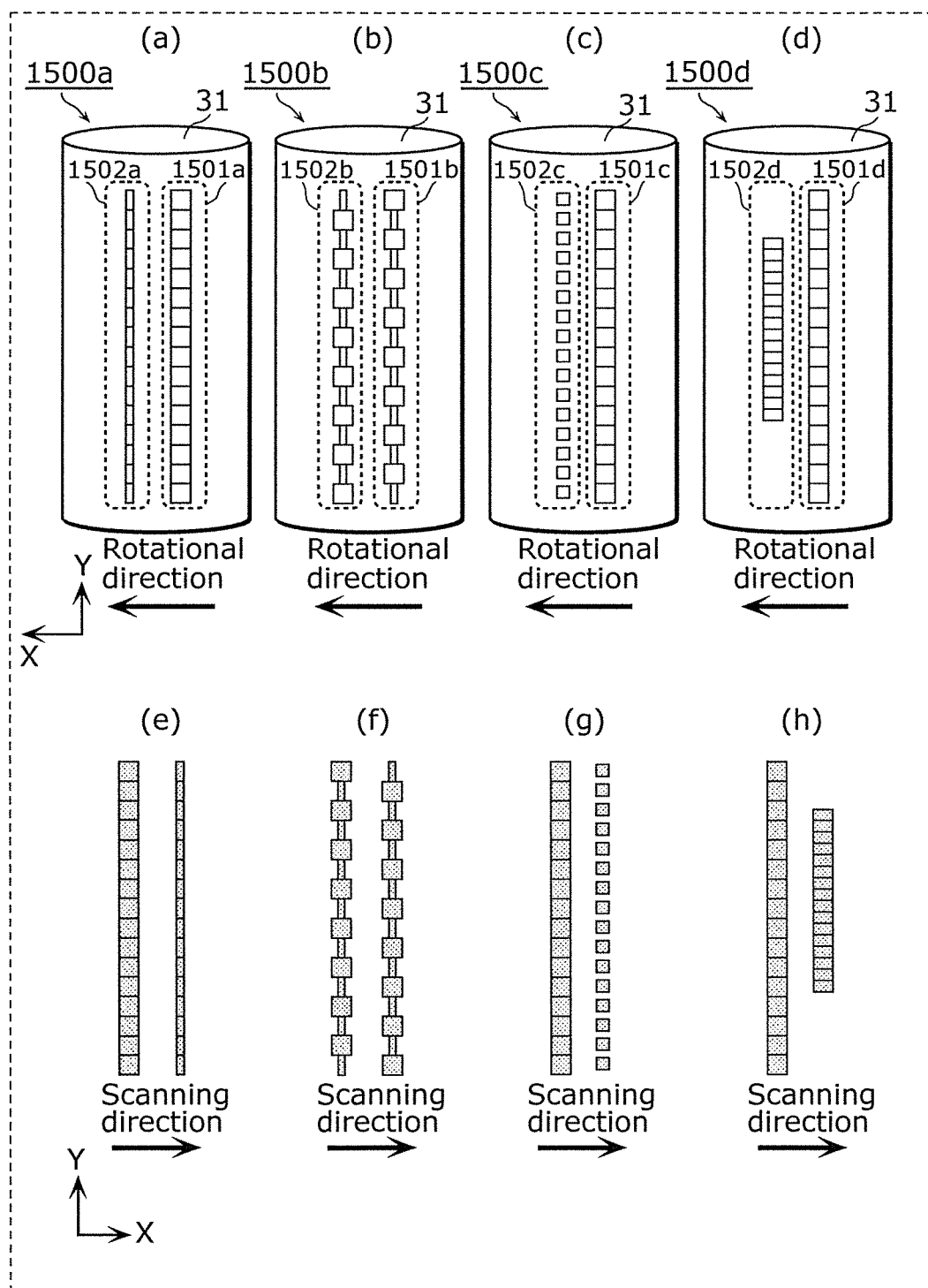

(a) through (d) in FIG. 16 illustrate the thermal image sensors according to Variation 3 of Embodiment 2. (e) through (h) in FIG. 16 illustrate the observation areas of the thermal image sensors illustrated in (a) through (d) in FIG. 16.

The thermal image sensors according to Variation 3 include a plurality of different sized photosensor elements. This makes it possible to both maintain a high temperature accuracy with the larger observation pixels (photosensor elements) and achieve a high-resolution image with the smaller observation pixels (photosensor elements).

For example, in the thermal image sensor 1500a illustrated in (a) in FIG. 16, a first photosensor element line 1501a including photosensor elements of a first size and a second photosensor element line 1502a including photosensor elements of a second size different from the first size in the X axis direction (the X axis direction width is smaller) are arranged parallel to each other. The thermal image sensor 1500a forms the observation areas illustrated in (e) in FIG. 16. This sort of configuration where photosensor elements having different widths in the X axis direction are provided increases the X axis direction resolution of the thermal image data.

Moreover, such as is the case with the thermal image sensor 1500b illustrated in (b) in FIG. 16, a first photosensor element line 1501b and a second photosensor element line 1502b, each of which include photosensor elements of a first size and photosensor elements of a second size, may be arranged parallel to each other.

More specifically, in the first photosensor element line 1501b, photosensor elements of a first size and photosensor elements of a second size are alternately arranged in the Y axis direction. In the second photosensor element line 1502b, photosensor elements of a first size and photosensor elements of a second size are alternately arranged in the Y axis direction. Consequently, any given pair of photosensor elements adjacent to each other in the X axis direction includes a photosensor element of the first size and a photosensor element of the second size. The thermal image sensor 1500b forms the observation areas illustrated in (f) in FIG. 16. This sort of configuration where photosensor elements having different widths in the X axis direction are provided increases the X axis direction resolution of the thermal image data.

Moreover, such as is the case with the thermal image sensor 1500c illustrated in (c) in FIG. 16, a first photosensor element line 1501c including photosensor elements of a first size and a second photosensor element line 1502c including photosensor elements of a third size that is both different from (smaller than) the first size in the X axis direction and the Y axis direction may be arranged parallel to each other. The thermal image sensor 1500c forms the observation areas illustrated in (g) in FIG. 16. In this way, including a plurality of photosensor elements having a third size that is smaller in both X axis direction width and Y axis direction (direction perpendicular to the scanning direction) width increases the X axis direction resolution and Y axis direction resolution.

Moreover, such as is the case with the thermal image sensor 1500d illustrated in (d) in FIG. 16, a first photosensor element line 1501d including photosensor elements of a first size and a second photosensor element line 1502d including photosensor elements of a fourth size that is different from the first size in the Y axis direction (smaller in the Y axis direction), may be arranged parallel to each other The thermal image sensor 1500d forms the observation areas illustrated in (h) in FIG. 16. By forming a collection of the photosensor elements of a fourth size in a specific location, it is possible to increase the resolution of a specific area corresponding to the collection of photosensor elements in particular.

[Variation 4 of Embodiment 2]

Figure 17:
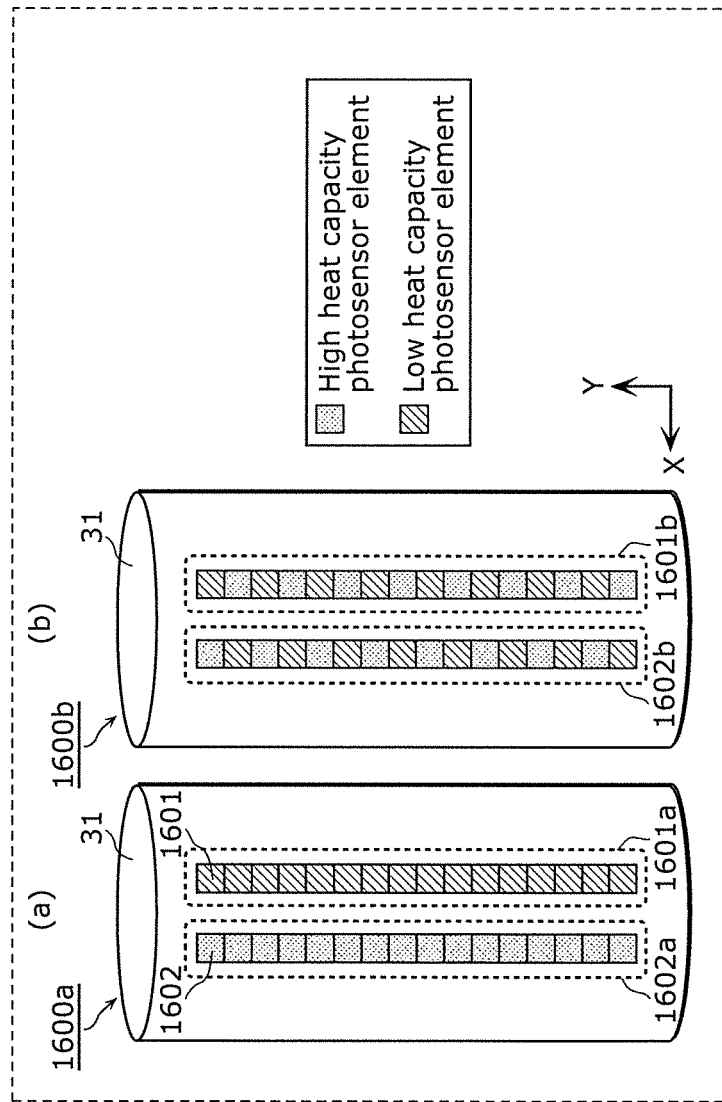

(a) and (b) in FIG. 17 illustrate the thermal image sensors according to Variation 4 of Embodiment 2.

The thermal image sensors according to Variation 4 include a plurality of photosensor elements having different thermal capacities. More specifically, the thermal image sensors according to Variation 4 include two types of photosensor elements—photosensor elements 1601, and photosensor elements 1602 that have a lower thermal capacity than the photosensor elements 1601.

With the thermal image sensor 1600a illustrated in (a) in FIG. 17, a first photosensor element line 1601a including only photosensor elements 1601 and a second photosensor element line 1602a including only photosensor elements 1602 are arranged parallel to each other. With the thermal image sensor 1600b illustrated in (b) in FIG. 17, the photosensor elements 1601 and the photosensor elements 1602 are alternately arranged in the Y axis direction in both the first photosensor element line 1601b and the second photosensor element line 1602b. Moreover, with the thermal image sensor 1600b, any given pair of photosensor elements adjacent to each other in the X axis direction includes the photosensor element 1601 and the photosensor element 1602.

By providing two types of photosensor elements with different thermal capacities in the thermal image sensor, it is possible to achieve both an increase in temperature measurement accuracy and measurement of a fast moving object. For example, thermopiles of different thicknesses are used as the photosensor elements having different thermal capacities.

[Variation 5 of Embodiment 2]

Figure 18:
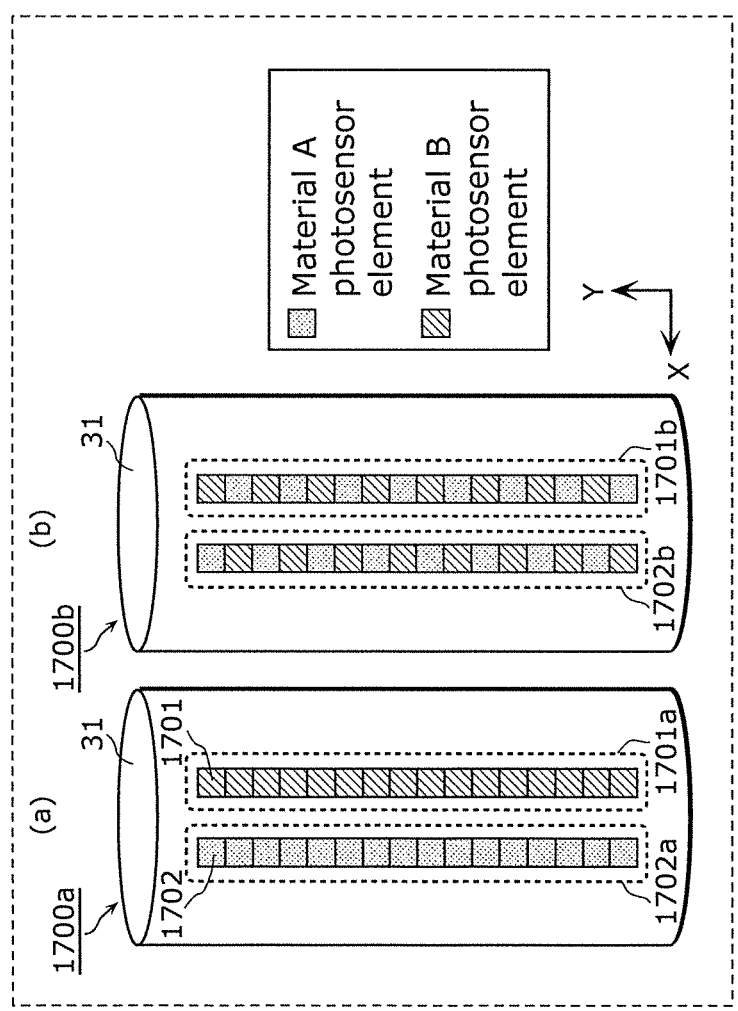

(a) and (b) in FIG. 18 illustrate the thermal image sensors according to Variation 5 of Embodiment 2. The thermal image sensors according to Variation 5 include two types of photosensor elements—photosensor elements 1701 and photosensor elements 1702—that are made of mutually different materials. More specifically, a conceivable combination includes use of thermopiles for the photosensor elements 1701 and photodiodes for the photosensor elements 1702, for example.

With the thermal image sensor 1700a illustrated in (a) in FIG. 18, a first photosensor element line 1701a including only photosensor elements 1701 and a second photosensor element line 1702a including only photosensor elements 1702 are arranged parallel to each other. With the thermal image sensor 1700b illustrated in (b) in FIG. 18, the photosensor elements 1701 and the photosensor elements 1702 are alternately arranged in the Y axis direction in both the first photosensor element line 1701b and the second photosensor element line 1702b. Moreover, with the thermal image sensor 1700b, any given pair of photosensor elements adjacent to each other in the X axis direction includes the photosensor element 1701 and the photosensor element 1702.

Although cost increases, this configuration is superior to the configuration in which the thickness of the thermopiles is changed (Variation 4) in regard to both an increase in temperature measurement accuracy and measurement of a fast moving object.

[Variation 6 of Embodiment 2]

Figure 19:
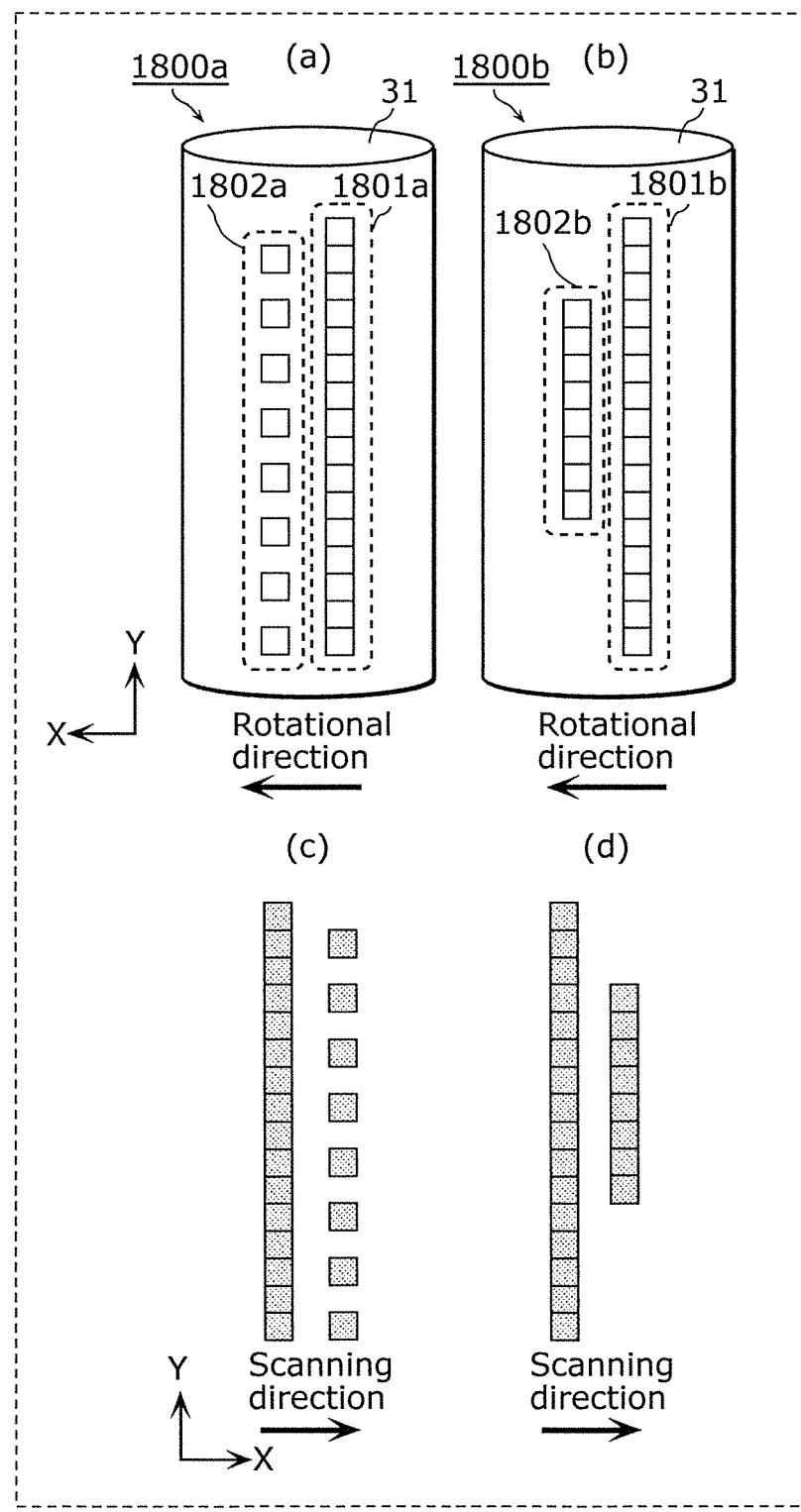
in FIG. 19 illustrate the observation areas of the thermal image sensors illustrated in (a) and (b) in FIG. 19.

(a) and (b) in FIG. 19 illustrate the thermal image sensors according to Variation 6 of Embodiment 2. (c) and (d) in FIG. 19 illustrate the observation areas of the thermal image sensors illustrated in (a) and (b) in FIG. 19.

The photosensor element lines of the thermal image sensors according to Variation 6 include a different number of elements. More specifically, the thermal image sensor 1800a illustrated in (a) in FIG. 19 includes a first photosensor element line 1801a and a second photosensor element line 1802a including a fewer number of photosensor elements than the first photosensor element line 1801a (the second photosensor element line 1802a includes half the number of photosensor elements included in the first photosensor element line 1801a). The thermal image sensor 1800b illustrated in (b) in FIG. 19 includes a first photosensor element line 1801b and a second photosensor element line 1802b including a fewer number of photosensor element than the first photosensor element line 1801b. The second photosensor element lines in the thermal image sensor 1800a and the thermal image sensor 1800b differ in that the plurality of photosensor elements included therein are arranged dispersed (in intervals of one) or arranged in a continuous manner.

The thermal image sensor 1800a forms the observation areas illustrated in (c) in FIG. 19 and the thermal image sensor 1800b forms the observation areas illustrated in (d) in FIG. 19. With this, since it is possible to reduce the number of photosensor elements to an amount fewer than the thermal image sensor 1000, the thermal image sensors 1800a and 1800b can detect moving objects at less cost than the thermal image sensor 1000.

Note that a merit of the thermal image sensor 1800a is that it can detect a moving object regardless of the location of the moving object, and a merit of the thermal image sensor 1800b is that the detection accuracy of a moving object in a specific area corresponding to the collection of photosensor elements is high.

[Variation 7 of Embodiment 2]

(a) through (c) in FIG. 20 illustrate the thermal image sensors according to Variation 7 of Embodiment 2. (d) through (f) in FIG. 20 illustrate the observation areas of the thermal image sensors illustrated in (a) through (c) in FIG. 20. The thermal image sensor according to Variation 7 includes a plurality of photosensor element lines, and the position of each photosensor element in each photosensor element line is shifted in a direction perpendicular to the rotational direction (that is, shifted in the Y axis direction). The thermal image sensor 2000a illustrated in (a) in FIG. 20 includes two photosensor element lines, and the thermal image sensor 2000b illustrated in (b) in FIG. 20 and the thermal image sensor 2000c illustrated in (c) in FIG. 20 include three photosensor element lines.

The thermal image sensor 2000a forms a plurality of linear observation areas where the positions of the observation pixels 51 are shifted in the Y axis direction, such as is the case with the observation areas 1910 and 1911 illustrated in (d) in FIG. 20. Similarly, the thermal image sensor 2000b forms the plurality of linear observation areas illustrated in (e) in FIG. 20. With this, high-sensitivity thermal image data with a high Y axis direction resolution is obtained.

The amount that the observation pixels 51 are shifted in the Y axis direction is desirably ½ the Y axis direction width of a single observation pixel 51 (a single photosensor element) in the case of the thermal image sensor 2000a which includes two photosensor element lines, desirably ⅓ the Y axis direction width in the case of the thermal image sensor 2000b which includes three photosensor element lines, and desirably 1/n (n being a natural number) the Y axis direction width in the case of a thermal image sensor which includes n photosensor element lines. With this, higher resolution thermal image data is obtained with fewer pixels.

Note that in a thermal image sensor including n lines of photosensor elements, the advantageous effect of high-resolution imaging can be obtained even when the amount of shift is not 1/n, but the advantageous effect increases with proximity to 1/n.

Moreover, as illustrated in (d) and (e) in FIG. 20, ends of the linear observation areas are desirably formed of partial observation pixels 1901 through 1906. In other words, in the thermal image sensors 2000a and 2000b, photosensor elements whose Y axis direction length is abnormal (partial photosensor elements) are desirably provided at ends of the photosensor element lines.

For example, the partial observation pixels 1901 and 1904 formed by the thermal image sensor 2000a are one-half the Y axis direction length of the observation pixels 1907 and 1908. As another example, the partial observation pixels 1903 and 1905 formed by the thermal image sensor 2000b are two-thirds the Y axis direction length of the normal observation pixels 51, and the partial observation pixels 1902 and 1906 are one-third the Y axis direction length of the normal observation pixels 51. This makes it possible to obtain thermal image data with a high degree of temperature accuracy (a high S/N ratio). Note that the Y axis direction width of the partial observation pixels 1901 through 1906 is most desirably equal to the shift amount (shift width) of the observation pixels 51 since a higher S/N ratio is obtainable, but designing the width to be different from the observation pixel 51 shift amount still yields an advantageous effect to a certain degree.

The above-described partial observation pixels are formed by providing photosensor elements of small pixel size in the thermal image sensor. However, as illustrated in FIG. 21, the partial observation pixels can be formed by covering (edge-cutting) the photosensor elements (these photosensor elements have the same pixel size as other pixels) located at the ends of the photosensor element line with a blinder 3801 having a known temperature.

Next, a technique of high-quality imaging by pixel shifting used by the thermal image sensors 2000a and 2000b will be described with reference to FIG. 22. FIG. 22 illustrates a technique for achieving a high-quality image by pixel shifting.

First, at the point in time illustrated in (a) in FIG. 22 (at the point in time of step 1), the partial observation pixel 1901 includes only the in-room fixed partition 2001, and the observation pixel 1909 includes both the in-room fixed partition 2002 and the in-room fixed partition 2003.

Next, (b) in FIG. 22 illustrates the point in time after two steps from (a) in FIG. 22 (the point in time of step 3)—that is to say, the point in time after the observation area shifts two pixels in the scanning direction from the state illustrated in (a) in FIG. 22. At this point in time, the observation pixel 1907 includes the in-room fixed partitions 2001 and 2002, and the observation pixel 1908 includes the in-room fixed partitions 2003 and 2004.

First, the amount of infrared light radiated from the in-room fixed partition 2001 is computed from data on the amount of infrared light from the partial observation pixel 1901 at the point in time of step 1 ((a) in FIG. 22).

Next, the amount of infrared light radiated from the in-room fixed partition 2002 is computed from the difference between data on the amount of infrared light from the partial observation pixel 1907 at the point in time of step 3 ((b) in FIG. 22) and data on the amount of infrared light from the partial observation pixel 1901 at the point in time of step 1 ((a) in FIG. 22).

Next, the amount of infrared light radiated from the in-room fixed partition 2003 is computed from the difference between data on the amount of infrared light from the partial observation pixel 1909 at the point in time of step 1 ((a) in FIG. 22) and the computed data on the amount of infrared light from the in-room fixed partition 2002.

Next, the amount of infrared light radiated from the in-room fixed partition 2004 is computed from the difference between data on the amount of infrared light from the partial observation pixel 1908 at the point in time of step 3 ((b) in FIG. 22) and the computed data on the amount of infrared light radiated from the in-room fixed partition 2003. The same shall apply hereinafter.

With this method, when the time variation of the amount of infrared light radiated from each in-room fixed partition (time variation between step 1 and step 3) is great, high-quality imaging is difficult to achieve. Consequently, the two photosensor element lines in the thermal image sensor 2000a should be arranged as close together as possible. With a small measurement time interval for the linear observation areas formed by the two photosensor element lines, further high-quality imaging (high accuracy) can be achieved.

Moreover, as is the case with the thermal image sensor 2000c illustrated in (c) in FIG. 20, providing the thermal image sensor 2000a with one additional photosensor element line forms the linear observation area 2101, as illustrated in (f) in FIG. 20. Here, the pixels in the linear observation area 2101 are not shifted with respect to either the linear observation area 1901 or the linear observation area 1911 (in this case, the linear observation area 1910).

With this configuration, by comparing the data on the amount of infrared light for the linear observation area 1910 with the data on the amount of infrared light for the linear observation area 2101, it is possible to estimate the time variation (variation in the amount of infrared light between steps) of the amount of infrared light radiated from each in-room fixed partition. With this, further high-quality imaging (high accuracy) can be achieved.

Note that in the above-described technique for high-quality imaging by pixel shifting, an example is conceivable in which the partial observation pixel 1901 is not formed as a result of the thermal image sensor 2000a not including any partial photosensor elements. In this case, for example, the amount of infrared light for the in-room fixed partition 2001 is computed by assuming that the amount of infrared light is the same as the amount of infrared light for the observation pixel 1907.

Note that the photosensor element lines may be shifted in the X axis direction. FIG. 23 illustrates one example of observation areas when the photosensor element lines are shifted in the X axis direction.

As illustrated in (a) and (b) in FIG. 23, the distance between the plurality of linear observation areas (distance between the plurality of photosensor element lines) may be shifted by an integer multiple of the width of each linear observation area. In this case, as illustrated in (a) in FIG. 23, the distance is desirably shifted by one-half of a pixel when there are two lines of linear observation areas, and by 1/n of a pixel when there are n lines of linear observation areas. With this, thermal image data with a high X axis direction resolution is obtained.

Moreover, when the distance between a plurality of linear observation areas is an integer multiple of the width of each linear observation area, the width of one step (rotation amount) of the rotator 31 is desirably less than the width of the photosensor element (for example, one-half or one-third of the width). Even in this sort of configuration, the same increase in resolution of the thermal image data can be achieved as the above-described case where the distance between the linear observation areas is shifted. However, from the perspective of measurement speed, a configuration in which the distance between the linear observation areas is shifted is desirable.

The same increase in resolution achieved with the configuration in which the distance between the linear observation areas is shifted can also be achieved with the use of baffles. FIG. 24 illustrates a technique for achieving a high-resolution image with baffles.

As illustrated in FIG. 24, at least one baffle 2301 (two baffles are provided in FIG. 24) may be provided in an area around the thermal image sensor to block infrared light in a portion of the linear observation areas located at the left and right ends of the entire observation area 50. In this case, so long as the infrared light at the ends of the entire observation area 50 can be blocked, the arrangement of the baffle 2301 is not limited to a specific example. With this, the same increase in resolution achieved with the configuration in which the distance between the linear observation areas is shifted is achieved.

[Variation 8 of Embodiment 2]

(a) in FIG. 25 illustrates the thermal image sensor according to Variation 8 of Embodiment 2. (b) in FIG. 25 illustrates the observation area of the thermal image sensor illustrated in (a) in FIG. 25. As illustrated in (a) in FIG. 25, in the thermal image sensor according to Variation 8, the boundary directions A and B, which are the directions in which boundaries between adjacent photosensor elements lie, slope relative to both the X axis direction and the Y axis direction. More specifically, the boundary direction A intersects the X axis direction and the Y axis direction at a 45 degree angle, and the boundary direction B intersects the X axis direction and the Y axis direction at a 45 degree angle. The thermal image sensor 2500 forms the observation areas (observation pixels) illustrated in (b) in FIG. 25 is formed.

With this configuration, two lines of linear observation areas can be formed such that the center of the observation pixels of one line are shifted one-half of a pixel (here, one pixel is equivalent to the corner to corner length of a square observation pixel) in the X axis direction relative to the other line, and the dimensions of each observation pixel (each photosensor element) can be increased.

For example, with the configuration like the one illustrated in FIG. 23, the distance between two lines of linear observation areas (distance in the X axis direction) is at least one pixel or more. In contrast, with the configuration of the thermal image sensor 2500, it is possible achieve a distance between linear observation areas (distance in the X axis direction) that is one pixel or less, thereby allowing the thermal image sensor 2500 to detect movement of a fast moving object. Moreover, with the thermal image sensor 2500, it is possible to increase the dimensions of each photosensor element, thereby increasing temperature measurement accuracy.

In the thermal image sensor 2500, if the width of one step (rotation amount) in the scanning direction (rotational direction) is one pixel or less, it is possible to increase the resolution of the thermal image data in both the X axis direction and the Y axis direction. The principle behind this increase in resolution is the same as with Variation 7.

Similarly, with the thermal image sensor 2500, two lines of linear observation areas whose central positions are shifted in the X axis direction are formed. Consequently, the measurement accuracy of the speed (amount of activity) of the object is high with the thermal image sensor 2500.

Note that in this case, the width of one step in the scanning direction (rotational direction) is desirably 1/n pixel (for example, one-half of a pixel).

The configuration in which the boundary directions of the photosensor elements slope relative to both the X axis direction and the Y axis direction is not limited to the configuration illustrated in FIG. 25. FIG. 26 illustrates an example of a different observation area according to Variation 8 of Embodiment 2.

The observation area illustrated in FIG. 26 is formed of one photosensor element line including photosensor elements aligned in a direction that intersects both the X axis direction and the Y axis direction. The thermal image sensor that forms the observation area illustrated in FIG. 26 can be achieved by simply arranging the one-dimensional photosensor 32 of the thermal image sensor 30 described with reference to FIG. 5 on a slope, making it possible manufacture the thermal image sensor at low cost. Moreover, the thermal image sensor that forms the observation area illustrated in FIG. 26 can obtain thermal image data for the entire observation area with greater speed.

Moreover, the thermal image sensor that forms the observation area illustrated in FIG. 26 can perform scanning in the Y axis direction in addition to the X axis direction. FIG. 27 illustrates scanning in the Y axis direction. As illustrated in FIG. 27, when a heat source (the face of a person) in the entire observation area is detected by scanning in the X axis direction, the thermal image sensor further scans only the area surrounding the heat source in the Y axis direction. When the heat source detected by the X axis direction scanning is a person's body, this increases the measurement accuracy of the height of the person detected.

Note that two or more different sized photosensor elements may be arranged in the thermal image sensor according to Variation 8. FIG. 28 illustrates an example of observation areas when two or more different sized photosensor elements are arranged in the thermal image sensor according to Variation 8.

The observation areas illustrated in FIG. 28 include normal sized observation pixels 2602 and partial observation pixels 2601 that are smaller than the observation pixels 2602. Thermal image data with a greater S/N ratio is obtained with this configuration.

Note that the length of one side of the partial observation pixel 2601 is desirably one-half the length of one side of the observation pixel 2602, which makes it possible to obtain thermal image data having a greater S/N ratio. Moreover, in addition to the partial observation pixel 2601, the observation areas may include a partial observation pixel having one side that is one-half the size of the partial observation pixel

2601 (in other words, one-fourth the area). With this, thermal image data with an even greater S/N ratio is obtained.

[Other Variations]

Similar to the thermal image sensors 30 and 1000, the thermal image sensor according to Embodiment 2 generally includes the rotator 31, a given embodiment of the photosensor, and the lens 33.

The configuration of the thermal image sensor, however, is not limited to this configuration. For example, a configuration which omits the rotator 31 is conceivable. FIG. 29 illustrates one example of the thermal image sensor having a configuration in which the photosensor is (photosensor elements are) caused to shift.

The thermal image sensor 2700 illustrated in FIG. 29 includes the same lens 22 described with reference to FIG. 2 and a photosensor 2701 in which photosensor elements are arranged in the same fashion as the thermal image sensor 1400a illustrated in (a) in FIG. 15. The photosensor 2701 shifts (scans) behind the back surface (the side opposite the side to which the observation target is located) of the lens 22. Note that the thermal image sensor 2700 forming the same observation area as the thermal image sensor 1400a is one example; the arrangement of the photosensor elements in the thermal image sensor 2700 may be reversed horizontally or vertically depending on the configuration of the optical system.

Moreover, scanning may be performed by moving a structural element other than the photosensor. FIG. 30 illustrates one example of the thermal image sensor which performs scanning by moving a structural element other than the photosensor.

As illustrated in FIG. 30, the thermal image sensor 2800 includes a mirror 2801, a lens 2802, and a photosensor 2803. The mirror 2801 reflects infrared light radiated from an observation target such that the light is incident on the lens 2802. The infrared light reflected by the mirror 2801 is transmitted through the lens 2802 and received by the photosensor 2803.

In this example, the photosensor 2803 itself does not move or rotate; scanning is performed by rotating the mirror 2801. Note that the mirror is rotated by a driving device (not shown in the Drawings).

With the thermal image sensor 2800, the lens 2802 is arranged between the mirror 2801 and the photosensor 2803, but the lens 2802 may be bonded to the reflective surface of the mirror 2801, and alternatively may be arranged between the mirror 2801 and the observation target. A configuration in which the lens 2802 is omitted and the mirror 2801 is a concave mirror is also acceptable.

Note that with the thermal image sensors 2700 and 2800, the photosensor elements are arranged as illustrated in (a) in FIG. 15, but the arrangement of the photosensor elements is not limited to this example.

Moreover, the image processing method and the arrangement of the observation pixels in the thermal image sensor described in Embodiment 2 that allows for measurement of a moving object and high-resolution imaging can be applied to all types of image sensors that generate images by scanning a linear sensor. This image processing method and arrangement of the observation pixels may be used in, for example, a detection apparatus which uses linear sensors and is used on a manufacturing line in an industrial plant.

Moreover, when the air conditioner 10 according to Embodiment 1 includes the thermal image sensor according to Embodiment 2, the air conditioner 10 can more accurately detect a user, measure the body surface temperature of the user, and provide air conditioning accordingly.

[Conclusion]

The thermal image sensor according to Embodiment 2 includes a plurality of infrared sensor elements (hereinafter also referred to as infrared detector elements) that detect infrared light in an observation area (hereinafter also referred to as a detection area), and a scanning device that scans the detection area in a scanning direction to detect, with the plurality of infrared detector elements, infrared light in an area to be captured as a single thermal image. The plurality of infrared detector elements include infrared detector elements arranged in different positions in the predetermined direction (for example, the rotational direction of the rotator 31). Here, the predetermined direction is equivalent to the scanning direction in the arrangement of the plurality of infrared detector elements.

For example, the plurality of infrared detector elements are aligned in an intersecting direction intersecting both the predetermined direction and a direction perpendicular to the predetermined direction, such as is the case with the second photosensor element line 1402a illustrated in FIG. 15.

Moreover, for example, the plurality of infrared detector elements constitute a plurality of element lines each configured of a portion of the plurality of infrared detector elements, and the plurality of element lines are arranged in mutually different positions in the predetermined direction. Examples of this sort of element line include the one-dimensional photosensors 32a, 32b, and 32c illustrated in FIG. 12 and FIG. 14 among others.

Moreover, the plurality of element lines may include an element line of infrared detector elements aligned in a direction perpendicular to the predetermined direction and an element line of infrared detector elements aligned in a direction intersecting both the predetermined direction and the direction perpendicular to the predetermined direction. Examples of this sort of element line include the first photosensor element line 1401a and the second photosensor element line 1402a illustrated in FIG. 15.

Moreover, as illustrated in FIG. 19, among the plurality of element lines, a total number of infrared detector elements constituting one element line may be different from a total number of infrared detector elements constituting another element line.

Moreover, as illustrated in FIG. 17 and FIG. 18, the plurality of infrared detector elements may include two types of infrared detector elements different in at least one of shape, thermal capacity, size, or material.

Moreover, the scanning device in the thermal image sensor according to Embodiment 2 may scan the detection area in the scanning direction by moving the plurality of infrared detector elements in the predetermined direction. This sort of scanning device is, for example, the rotator 31.

Moreover, the scanning device may include an optical system that introduces infrared light from a target object to the plurality of infrared detector elements, and the scanning device may scan the detection area in the scanning direction by moving the optical system. This sort of scanning device is, for example, the structure that drives the lens 22 illustrated in FIG. 29, or the structure that rotates the mirror 2801 illustrated in FIG. 30.

The thermal image sensor according to Embodiment 2 is lower in cost than the thermal image sensor 20 in which the infrared detector elements are arranged in a matrix, and more suited for measurement of an amount of activity of a person than the thermal image sensor 30 in which the infrared detector elements are arranged in a line.

(Embodiment 3)

In Embodiment 3, a vehicle and a vehicle air conditioner that conditions the air in the cabin of the vehicle based on the temperature distribution inside the cabin of the vehicle will be described. Note that since the vehicle air conditioner according to Embodiment 3 is the air conditioner 10 according to Embodiment 1 applied to a vehicle, overlapping descriptions are omitted.

Additionally, the vehicle according to Embodiment 3 is a vehicle that includes the air conditioner according to Embodiment 1 and the following, and various measurement systems (hygrometer, system for measuring an amount of scattered light, etc.).

The vehicle air conditioner according to Embodiment 3 includes a heat exchanging system and a blower system, heats or cools air drawn into the air conditioner from outside the vehicle, and then expels the heated or cooled air to air condition the cabin of the vehicle. Similar to Embodiment 1, the vehicle air conditioner includes a system for measuring the temperature of a user, and can provide air conditioning in accordance with the state of the user by controlling the heat exchanging system and the blower system based on the body surface temperature of the user.

[Configuration]

Hereinafter, two examples of configurations of the vehicle air conditioner according to Embodiment 3 will be described. FIG. 31 illustrates the first example of the vehicle air conditioner according to Embodiment 3. FIG. 32 illustrates the second example of the vehicle air conditioner according to Embodiment 3. The vehicle air conditioner 3100 illustrated in FIG. 31 and the vehicle air conditioner 3200 illustrated in FIG. 32 include a compressor 3000 as the heat exchanging system, an evaporator 3001, a condenser 3002, and a receiver 3003.

First, operation when the cooler is in use will be described. Refrigerant compressed by the compressor 3000 is inputted into the condenser 3002 and cooled by the outside air. With this, liquefied refrigerant is sent to the receiver 3003. The refrigerant sent to the receiver 3003 is separated into liquefied and non-liquefied refrigerant, and moisture is removed with, for example, a drying agent.

The liquefied refrigerant is injected into the evaporator 3001 from the small nozzle of the expansion valve and vaporized, and the evaporator 3001 cools as a result of heat being drawn from around the evaporator 3001. Air drawn into the cabin of the vehicle from outside the vehicle by an intake system 3005 is provided to the cooled evaporator 3001 and returned to the inside of the cabin by the blower system 3004. Since the air sent into the cabin of the vehicle by the blower system is provided to the evaporator 3001 and cooled, it is possible to reduce the temperature of the air inside the cabin of the vehicle.

Moreover, when using the heater, the method of using exhaust from the engine to heat the air, similar to a typical vehicle air conditioner, is used. However, in the case of a vehicle that generates a small amount of heat, such as an electric vehicle, heating is desirably achieved using a compressor, similar to a household air conditioner. This improves the efficiency of the vehicle air conditioner.

As described above, the vehicle air conditioners 3100 and 3200 include a system for measuring the temperature of a user in addition to systems for heating and cooling the air inside the cabin of the vehicle. Hereinafter, the method for measuring the temperature of a user will be described.

With the vehicle air conditioner 3100, temperature sensors 3006 are provided in parts of the vehicle in contact with the user, such as in the steering wheel and seats, to measure the temperature of the user.

In contrast, with the vehicle air conditioner 3200, a thermal image sensor 3101 is provided inside the cabin of the vehicle to measure the temperature of the user. Here, the thermal image sensor 3101 may be any kind of thermal image sensor. For example, the thermal image sensor described in Embodiments 1, 2, and 4 is used as the thermal image sensor 3101.

The method where a plurality of temperature sensors are used, such as is the case with the vehicle air conditioner 3100, is desirable in that it is possible to measure the temperature of various parts of the user's body at low cost. In contrast, the method where the thermal image sensor 3101 is used, such as is the case with the vehicle air conditioner 3200, is desirable in that it is possible to measure a part of the user that is not touching the steering wheel or seat and measure the environmental temperature inside the cabin of the vehicle with a single sensor.

Moreover, a contact temperature sensor and thermal image sensor may be used in conjunction. This allows for the temperature of more parts of the user's body to be measured, and allows for air conditioning more accurately suited to the body surface temperature of the user.

Note that since the system configuration of the vehicle air conditioner 3200 is the similar to the system configuration of the air conditioner 10 (or air conditioner 10a) according to Embodiment 1, detailed description thereof is omitted. Similar to Embodiment 1, based on the output from the thermal image sensor 3101, the vehicle air conditioner 3200 computes, for example, which seat the user is sitting in, the body surface temperature of the user, and the temperature of a side window near the user. Moreover, air conditioning suited to the state and environment of the user is provided as a result of a device controller in the vehicle air conditioner 3200 adjusting the rotational speed of the compressor or the fan speed.

At least a portion of the driver's seat is included in the observation area (not shown in the Drawings) of the thermal image sensor 3101, which allows for air conditioning suited to the body surface temperature of the driver.

The observation area of the thermal image sensor 3101 may include only the area surrounding the steering wheel at the driver's seat. This allows for air conditioning suited to the body surface temperature (hand temperature) of the driver using a minimal observation area. Unlike a contact temperature sensor installed in the steering wheel, the thermal image sensor 3101 is capable of measuring the temperature of the user's hand instantly regardless of where the user is holding the steering wheel. Moreover, since the observation area is small, high-resolution thermal image data can be obtained at low cost, and the measurement accuracy of the user's hand temperature increases.

The observation area of the thermal image sensor 3101 may include the passenger seat in addition to the driver's seat. This allows for air conditioning suited to both the driver and the passenger.

The observation area of the thermal image sensor 3101 may also include the rear seats, as is the case with in the observation area 3102 illustrated in FIG. 31, which allows for air conditioning suited to the body surface temperature of each passenger including passengers seated in the rear seats.

When the cabin of the vehicle is air conditioned to suit a plurality of users, the vehicle air conditioners 3100 and 3200 desirably include a plurality of blower systems. This makes it possible for the vehicle air conditioners 3100 and 3200 to accurately adjust the air temperature around each user.

The vehicle air conditioners 3100 and 3200 more desirably include a plurality of intake systems. This makes it possible for the vehicle air conditioners 3100 and 3200 to accurately adjust the air temperature around each user.

[User Interface]

The vehicle air conditioners 3100 and 3200 desirably include a user interface. More specifically, the vehicle air conditioners 3100 and 3200 desirably include the user interface described in Embodiment 1 with reference to FIG. 11A through FIG. 11C.

Moreover, the above-described blower system, intake system, and user interface are more desirably provided individually for each seat. This makes it possible for each user sitting in each seat to individually set the temperature.

The above-described blower system, intake system, and user interface are desirably provided as an integrated unit. With this, a more low-cost vehicle air conditioner can be realized.

In vehicles not having a blower system for each seat, a user sitting in a given seat when the car is in motion may be selected as a priority user from the user interface. In this case, the vehicle air conditioners 3100 and 3200 may provide air conditioning under the pretense that the selected user body surface temperature is the target temperature. The vehicle air conditioner can be realized at lower cost than when blower systems are provided individually for each seat.

Vehicles not having user interfaces for each seat may be provided with a user interface capable of assessing the state of each seat. FIG. 33 illustrates an example of the user interface according to Embodiment 3. Since the user interface illustrated in FIG. 33 is installed in the vicinity of the driver's seat, the driver can control the air conditioning for each seat.

The user interface illustrated in FIG. 33 assigns symbols such as the letters A through E to each seat, and displays a person-shaped icon for each seat. In the person-shaped icons, the body surface temperature of each user is indicated with color (the color is illustrated in shading in the Drawings). The person-shaped icon is displayed with a solid outline when a user is sitting in that seat, and displayed with a dashed line when a user is not sitting that seat. This allows for more intuitive assessment of the state of the users in the cabin of the vehicle. Whether or not a user is sitting in a particular seat is determined from the thermal image data. For example, the determination condition is whether or not an object that is 30 degrees Celsius or more is in a particular seat.

Moreover, the user interface may display the target temperature for each user and allow each user to change their target temperature. A framed area pointing to the foot of the icon for seat A and a framed area pointing to the hand of the icon for seat B are displayed in the user interface illustrated in FIG. 33, and the target temperature is displayed in each framed area. This illustrates that a foot temperature of 28 degrees Celsius is set as the target temperature for the user sitting in seat A, and a hand temperature of 30 degrees Celsius is set as the target temperature for the user sitting in seat B.

A framed area which does not point to any body part is displayed for the icon for seat C. This illustrates that an environmental temperature (temperature of the surrounding air) of 25 degrees Celsius is set as the target temperature for the user sitting in seat C.

This sort of display makes it possible to know the target temperatures inside the cabin of the vehicle at a glance.

Moreover, as illustrated in FIG. 33, the user interface may display an icon for steering wheel. This makes it possible to more intuitively grasp the location of the driver's seat.

As illustrated in FIG. 33, when the vehicle air conditioners 3100 and 3200 are installed in an electric vehicle or a combustion engine vehicle, the distance capable of being traveled may be estimated based on the remaining amount of fuel and the current air conditioner settings, and the estimated distance may be displayed. This makes it possible for the user to check the distance capable of being traveled in real time.

As illustrated in FIG. 33, the user interface may display the distance until the destination and the probability of reaching the destination. This allows the user to check the probability of reaching the destination and adjust the air conditioner accordingly.

As illustrated in FIG. 33, the user interface may include a system for increasing the distance capable of being traveled and the probability of reaching the destination (such as the triangle icons). This makes it possible for the user to prioritize the air conditioner and the probability of reaching the destination.

For example, when the user sets the distance capable of being traveled to 110 km, in order to travel the set distance capable of being traveled, the target temperature (set temperature) for each user is automatically changed. To increase the distance capable of being traveled, the set temperature for each user is decreased in the case that the heater is being used, and increased in the case that the cooler is being used.

The same also applies to the probability of reaching the destination such that when, for example, the user sets the probability of reaching the destination to be 90%, the target temperature is changed in order to achieve a probability of reaching the destination of 90%.

Moreover, the observation area 3102 of the thermal image sensor 3101 may include a side window. Measurement of a side window by the vehicle air conditioner 3200 allows for radiant heat radiating from the side window to the user to be taken into account. This allows the vehicle air conditioner 3200 to more accurately measure the thermal sensation of the user and provide air conditioning according to the thermal sensation.

More desirably, the observation area 3102 of the thermal image sensor 3101 includes both the side window next to the driver's seat and the side window next to the passenger's seat. This allows the vehicle air conditioner 3200 to provide air conditioning for each seat in accordance with the amount of radiated heat from each of the side window next to the driver's seat and the side window next to the passenger's seat. For example, the target temperature is set lower for seats closer to side windows of a high temperature (large amount of radiated heat).

[Prediction of Condensation]

The observation area 3102 of the thermal image sensor 3101 desirably includes the windshield. This allows for prediction of condensation, which will be described later. FIG. 34 illustrates a vehicle air conditioner having an observation area including the windshield.

The observation area 3201 of the vehicle air conditioner 3300 illustrated in FIG. 34 includes the windshield 3203. The vehicle air conditioner 3300 illustrated in FIG. 34 further includes a hygrometer 3202, allowing the vehicle air conditioner 3300 to measure the humidity on the surface of the windshield 3203 based on both the humidity inside the cabin of the vehicle and the temperature (saturated vapor pressure) of the windshield 3203 measured by the thermal image sensor 3101. With this, the vehicle air conditioner 3300 can predict the accumulation of condensation on the windshield 3203 and prevent condensation from accumulating by drawing in air from outside the vehicle before condensation accumulates on the windshield 3203.

The vehicle air conditioner 3300 may include a structure for dehumidifying the air inside the cabin of the vehicle in addition to ventilating the inside of the cabin of the vehicle by drawing in air from outside the vehicle. With this, when, for example, the air outside the vehicle is not clean, the vehicle air conditioner 3300 can prevent the accumulation of condensation without ventilating the air.

As described above, the thermal image sensor 3101, which measures temperature across a wide area, including, for example, the driver's seat, passenger's seat, both side windows, and the windshield 3203, may include the rotator 31 described in Embodiments 1 and 2. This will make it possible to achieve a high-resolution thermal image sensor 3101 that is low-cost and covers a wide area.

The hygrometer 3202 may be integrated with the thermal image sensor 3101, or may be provided separately. When the hygrometer 3202 is provided separately from the thermal image sensor 3101, the hygrometer 3202 and the thermal image sensor 3101 may each include a communication device, and the vehicle air conditioner 3300 may include a signal processor that predicts the accumulation of condensation in tandem with information from both the communication devices.

Next, ventilation operation based on condensation prediction will be described. FIG. 35 is a flow chart for ventilation operation based on condensation prediction.

The signal processor in the vehicle air conditioner 3300 measures the temperature of the windshield using the thermal image sensor 3101 (S21), and then measures the humidity using the hygrometer 3202 (obtains the sensor output from the hygrometer 3202) (S22). The signal processor then predicts the accumulation of condensation based on the measurement results—that is to say, computes the humidity of the windshield surface (S23).

When the humidity of the windshield surface is less than a given threshold (for example, 95%), the signal processor determines that "condensation will not accumulate" (No in S24), and continues regularly measuring the windshield surface temperature and humidity (S21 and S22).

When the humidity of the windshield surface is the given threshold or greater, the signal processor determines that "condensation will accumulate" (Yes in S24), and confirms whether to ventilate with the user (S25). At this time, confirmation with the user may be performed aurally, and may be performed by displaying text on a display such as a car navigation system. The user may respond by voice or interacting with the panel, and when the user does not approve the ventilation (No in S26), the signal processor stops processing. Note that in this case, the signal processor may reconfirm with the user after waiting for a given period of time and stop processing after failing to receive approval a number of times.

When the user approves the ventilation (Yes in S26), the signal processor starts ventilation (S27).

As illustrated in FIG. 36, note that if the vehicle air conditioner 3300 includes a dehumidifying system, when the user does not approve the ventilation (No in S26), the dehumidifier may be turned on (S28). This allows the vehicle air conditioner 3300 to prevent the accumulation of condensation without ventilating the air. In this case, the signal processor may confirm with the user whether to turn the dehumidifier on or not before turning the dehumidifier on.

The vehicle air conditioner 3300 desirably includes a system for measuring the condition of the air outside the vehicle. For example, by including a spectroscopic sensor that measures the carbon monoxide level or hydrocarbon level outside the vehicle, the vehicle air conditioner 3300 can monitor the condition of the air outside the vehicle, and provide air conditioning accordingly. For example, it is possible to select between performing ventilation when the air outside the vehicle is clean (the carbon monoxide level and hydrocarbon level in the air are low) and using the dehumidifier when the air outside the vehicle is not clean (the carbon monoxide level and hydrocarbon level in the air are high). Moreover, when performing the selection, the vehicle air conditioner 3300 may notify the user of the condition of the air outside the vehicle, and the vehicle air conditioner 3300 may include an audio or touch panel user interface for determining the user's choice. This allows for air conditioning that is in line with the user's intentions.

The vehicle (mobile object) including the vehicle air conditioner 3300 may include a scattered light measurement system that measures an amount of scattered light on the outside and inside surfaces of the windshield. FIG. 37 illustrates a vehicle including the scattered light measurement system.

The vehicle 3400 illustrated in FIG. 37 includes the scattered light measurement system 3501. With this, when the amount of scattered light on the outside and inside surfaces of the windshield is great regardless of whether or not the windshield surface humidity inside the vehicle is low (80% or less) it is possible to determine that condensation is accumulating on the outside surface of the windshield (the side outside of the vehicle).

When condensation accumulates on the outside surface of the windshield, the vehicle 3400 desirably turns on the windshield wipers automatically to eliminate the scattering of light by the condensation. This makes it possible to eliminate the need for the user to discern whether the condensation is accumulated on the inside or outside of the vehicle, and achieve a system that automatically removes condensation.

One example of the scattered light measurement system 3501 is a configuration which includes a laser light source and a photodiode, projects the laser light at an angle relative to the windshield, and measures the amount of laser light returning by the backscatter phenomenon with the photodiode.

Another example of the scattered light measurement system 3501 is a configuration which uses a camera to photograph an area in front of the windshield, through the windshield. In the image obtained by the camera, areas of condensation vary little in color between neighboring pixels, and areas free of condensation change greatly when the vehicle is traveling. This allows for measurement of the scattering of light.

The vehicle 3400 (or the vehicle air conditioner 3300) may include a communication device. This makes it possible to share, in the cloud, positional (regional) information on where the vehicle 3400 traveled when condensation accumulated on the outside surface of the windshield. Consequently, the vehicle 3400 can provide information on regions that will likely cause condensation to accumulate on the windshield to other vehicles which do not include the scattered light measurement system 3501.

When the vehicle 3400 (or the vehicle air conditioner 3300) includes a communication device, the vehicle 3400 can, for example, obtain, via the communication device, history information on whether the user bathed or ate before getting in the vehicle from the user's home bath system and kitchen appliances, such as a microwave. Using information obtained in this manner, air conditioning suited to the user's thermal sensation can be achieved.

[Variation of Embodiment 3]

Similar to Embodiment 1, the vehicle air conditioner according to Embodiment 3 may measure the temperature of a plurality of parts of the user's body, such as the forehead, hand, leg, nose, ear, and cheek, etc., and provide air conditioning where the target temperature is the temperature of a given part or parts of the users body.

As described in Embodiment 1, when the heat exchanger is a compressor, increasing the number of rotations increases the intensity of the cooling and reducing the number of rotations reduces the intensity of the cooling. By increasing the intensity of the cooling when the user's body surface temperature is greater than the target temperature and reducing the intensity of the cooling when the user's body surface temperature is less than the target temperature, it is possible to provide air conditioning that brings the user's body surface temperature closer to the target temperature.

Similar to Embodiment 1, the vehicle air conditioner according to Embodiment 3 may determine whether the user is wearing glasses, a mask, gloves, socks, or slippers, etc., based on the thermal image data. The vehicle air conditioner according to Embodiment 3 may include a system for notifying the user of a decrease in measurement accuracy based on the user wearing, for example, glasses, a mask, gloves, socks, or slippers, etc., based on the above detection result. Since the method for executing the above is the described in Embodiment 1, repetition of the description here will be omitted.

The vehicle air conditioner according to Embodiment 3 may include systems for computing, based on the thermal image data, an amount of clothes, radiant heat, humidity, posture, an amount of activity, an amount of exercise, time, sweat, and the season. This allows for air conditioning that is more suited to the user's thermal sensation. Since the methods for executing the above computations are the described in Embodiment 1, repetition of the descriptions here will be omitted.

The vehicle air conditioner according to Embodiment 3 may include a lighting system that illuminates the observation area of the thermal image sensor 3101. For example, as illustrated in FIG. 37, the thermal image sensor 3101 of the vehicle air conditioner may include the lighting system 3502, and alternatively the lighting system may be provided adjacent to the thermal image sensor 3101. With this, the user can easily confirm the area where the temperature is being measured (which is the area illuminated) by the thermal image sensor 3101.

Note that the lighting system is desirably a lighting system that shines light only on the entire observation area of the thermal image sensor 3101. This makes it possible for the user to accurately confirm the location of the entire observation area 50.

The thermal image sensor 3101 of the vehicle air conditioner according to Embodiment 3 may include a far-infrared irradiation system, and alternatively may be adjacent to the far-infrared irradiation system. In this case, is it desirable that the optical system be designed such that the further a target object to which far-infrared light is radiated is from the far-infrared irradiation system, the lower the density of the far-infrared light received as a result of the radiation is.

The vehicle air conditioner having such a configuration can assess the distance between each area in the observation area and the thermal image sensor 3101 by comparing thermal image data when far-infrared light is radiated toward the observation area with thermal image data when far-infrared light is not radiated. This is because the greater the variation between the radiation thermal image data and the non-radiation thermal image data, the closer an object is to the thermal image sensor 3101. With this, the vehicle air conditioner can recognize an obstruction that blocks the flow of air in the cabin of the vehicle (such as large luggage placed next to the passenger seat), and control the flow of air such that the air flows around the obstruction to the user. By, for example, selectively controlling the flow of air such that air only flows from a blower system with no obstruction between it and the user, low power consumption can be achieved.

When the vehicle (or vehicle air conditioner) according to Embodiment 3 includes a thermal image sensor, the vehicle can recognize whether a person is in a given seat or not. Recognizing the location of a user with the thermal image sensor is superior to recognizing the location of a user with a sensor that measures the load on a seat because the thermal image sensor does not falsely recognize luggage as a person. This allows the vehicle according to Embodiment 3 to be capable of instructing the user to fasten his or her seatbelt only in cases where the user is sitting in the passenger seat, for example.

(Embodiment 4)

[Underlying Knowledge Forming Basis of Embodiment 4]

it is common knowledge that even in the same hygrothermal environment, what the temperature "feels like" to a user varies depending on the user's amount of activity. For example, even in an environment with a temperature of 25 degrees Celsius and 50% humidity, which is generally a comfortable environment for an average person who is not moving, if the person exercises vigorously, they will feel hot.

By knowing how active the person in that location is, it is possible to adjust parameters such as the temperature and fan speed of the air conditioner in accordance with the person's amount of activity. This adjusting provides a comfortable environment for people with a high amount of activity.

In light of this, a configuration has been proposed that improves the level of comfort by computing an amount of activity from data obtained from an infrared detector and feeding back the amount of activity to the air conditioner, such as the configuration in PTL 1.

Moreover, a technique of using, for example, an infrared detector as a detector for measuring the temperature distribution in a room has been proposed, and in order to increase the detection range of the infrared detector, a technique of scanning an array infrared detector in a given direction has been proposed, such as in PTL 2.

However, with the infrared detectors disclosed in PTL 1 and PTL 2, when a person is in the scanning range, the person is only scanned once per scanning instance. Normally, one instance of scanning takes tens of seconds to a few minutes, so using the infrared detectors disclosed in PTL 1 and PTL 2 to measure the amount of activity of a person is difficult. In particular, when the infrared detectors disclosed in PTL 1 and PTL 2 are used to detect the amount of activity of a person, it is difficult to perform the detection in a wide area.

In Embodiment 4, an infrared detector capable of detecting the amount of activity of a person in a wide area will be described. Note that the infrared detector according to Embodiment 4 is a device that corresponds to the thermal image sensors according to Embodiments 1 through 3, and the infrared detector element according to Embodiment 4 is an element that corresponds to the photosensor element according to Embodiments 1 through 3.

[Configuration]

First, the configuration of the infrared detector according to Embodiment 4 and the configuration of the air conditioner including the infrared detector will be described. FIG. 38 is a diagrammatic view of a room in which the air conditioner 100 including the infrared detector according to Embodiment 4 is installed. FIG. 39A is a perspective view of the infrared detector according to Embodiment 4, and FIG. 39B is a side view of the infrared detector according to Embodiment 4.

As illustrated in FIG. 38, the infrared detector 101 according to Embodiment 4 is installed in the air conditioner 100. The air conditioner 100 is illustrated as being installed in a room inhabited by a person 102 and including a desk 103.

As illustrated in FIG. 39A and FIG. 39B, the infrared detector 101 (thermal image sensor) includes infrared detector elements (photosensor elements) 105a through 105f, and the infrared detector elements 105a through 105f are mounted on rotors (rotators) 104a through 104f, respectively. When the infrared detector 101 is viewed from above, each rotor 104a through 104f rotates in a clockwise direction.

Furthermore, as illustrated in FIG. 39B, the side surface 107a of the rotor 104a is perpendicular to the top surface 106a of the rotor 104a, but the side surface 107b of the rotor 104b is sloped 8b degrees relative to the top surface 106b of the rotor 104b, and the diameter of the rotor 104b gradually decreases toward the bottom. Additionally, the side surface 107c of the rotor 104c slopes inward θc degrees, which is greater than 8b degrees, relative to the top surface 106c of the rotor 104c, and the diameter of the rotor 104c gradually decreases toward the bottom.

Similarly the side surface 107d of the rotor 104d slopes inward θd degrees, which is greater than θc degrees, relative to the top surface 106d of the rotor 104d, and the diameter of the rotor 104d gradually decreases toward the bottom. The same also applies for the rotors 104e and 104f, and the side surfaces θb, θc, θd, θe, and θf of the rotors fulfill the relationship θb<θc<θd<θe<θf such that the mounted infrared detector elements are angled further downward on lower positioned rotors.

In this way, by configuring the infrared detector elements 105a through 105f such that the vertical orientation of each element is different, the infrared detector elements 105a through 105f measure the temperature at locations located at different heights in the room.

Note that among the infrared detector elements 105a through 105f, infrared detector elements positioned higher detect (measure) areas located higher in the room, but the relation between the position of the infrared detector element and the measurement area is not limited to this example. Additionally, the side surface 107a of the rotor 104a may, similar to the side surfaces of the other rotors, slope at an angle not perpendicular to the top surface 106a. Moreover, the measurement (detection) range and angle may be adjusted by attaching, for example, a lens to each of the infrared detector elements 105a through 105f.

In the infrared detector 101, the infrared detector elements 105a through 105f are offset from each other in the rotational direction of the rotors 104a through 104f by a predetermined amount. In FIG. 39A and FIG. 39B, from the top rotor to the bottom rotor, each infrared detector element 105a through 105f is attached more toward the front with respect to the rotational direction.

Next, the infrared image (thermal image data) measured by the infrared detector 101 installed on the air conditioner 100 will be described with reference to FIG. 40A through FIG. 40E. FIG. 40A through FIG. 40E are conceptual diagrams illustrating detection areas of the infrared detector 101.

As illustrated in FIG. 39A and FIG. 39B, the infrared detector elements 105a through 105f mounted on the infrared detector 101 are offset from each other in the rotational direction by a predetermined amount. Consequently, the locations in which infrared light is detected (locations at which temperature is measured) by the infrared detector elements are offset from each other in the scanning direction—that is to say, horizontally in the infrared image—by a predetermined amount.

FIG. 40A conceptually illustrates the detection areas 108a through 108f of the infrared detector elements 105a through 105f when detection starts. In the state illustrated in FIG. 40A, the infrared detector element 105f is the leading element in the rotational direction (hereinafter, the direction equivalent to the scanning direction (here, the rotational direction) in the arrangement of the infrared detector elements is also referred to as the scanning direction). Consequently, the detection area 108f is located in the leading position in the scanning direction. The locations in the scanning direction that the infrared detector elements detect are offset from each other by a predetermined amount. At the point in time illustrated in FIG. 40A, the desk 103 is within a detection area of the infrared detector 101, but the person 102 is not yet within a detection area.

FIG. 40B illustrates the detection areas 108a through 108f one frame after the start of the detection (the state illustrated in FIG. 40A). As described with reference to FIG. 39A and FIG. 39B, when the infrared detector 101 is viewed from above, the rotational direction of the infrared detector 101 is a clockwise direction. Thus, the detection areas one frame after the start of the detection are shifted one pixel to the right relative to the detection areas at the start of the detection illustrated in FIG. 40A. At the point in time illustrated in FIG. 40B, the desk 103 is within a detection area of the infrared detector 101, but the person 102 is not yet within a detection area.

FIG. 40C illustrates the detection areas 108a through 108f two frames after the start of the detection. The detection areas 108a through 108f are shifted two pixels to the right relative to the detection areas at the start of the detection. Thus, at the point in time illustrated in FIG. 40C, the left leg 102a of the person 102 has entered the detection area 108f, and temperature measurement of the left leg 102a has begun. Next, three frames after the start of the detection (not shown in the Drawings), the left leg 102a of the person 102 enters the detection area 108e, and thereafter the person 102 is sequentially captured in each detection range.

Here, when the rotors 104a through 104f of the infrared detector 101 continue rotating in the same direction (clockwise direction), the time period that any given one of the detection areas 108a through 108f captures the person 102 is, after the start of the detection, from the second frame (FIG. 40C) to the ninth frame (FIG. 40D). At the point in time illustrated in FIG. 40D, the detection area 108a, which is the last detection area in the scanning direction, captures the head 102b of the person 102.

Note that eleven frames are required for each detection area to return to the starting position at the start of the detection. Thus, with the infrared detector 101, in eight of the eleven frames (from frame two to frame nine), the person 102 is a detection target of at least one of the infrared detector elements 105a through 105f.

Note that if each rotor 104a through 104f of the infrared detector 101 rotates back (in the reverse direction) when each detection area reaches the right hand end of the scanning range, the person 102 remains a detection target from the second frame through the twelfth frame, as illustrated in FIG. 40E.

In this case, each detection area takes twenty frames to return to the starting position of the detection in a single round trip of each detection element. Thus, in eleven of the twenty frames (from frame two to frame twelve), the person 102 is a detection target of at least one of the infrared detector elements 105a through 105f.

As a comparison to the infrared detector 101, next an infrared detector in which the infrared detector elements 105a through 105f are arranged in a straight vertical line will be described along with the detection areas thereof. FIG. 41 is a perspective view of an infrared detector in which the infrared detector elements 105a through 105f are arranged in a straight vertical line. FIG. 42A through FIG. 42C are conceptual diagrams illustrating detection areas of the infrared detector illustrated in FIG. 41.

The infrared detector 110 illustrated in FIG. 41 includes infrared detector elements which are not offset from each other in the rotational direction. As illustrated in FIG. 42A, at the start of the detection by the infrared detector 110, the detection areas 109a through 109f of the infrared detector 110 are aligned vertically in the left most column in the scanning range.

The person 102 is first detected by the infrared detector 110 in the seventh frame illustrated in FIG. 42B, and continues to be a detection target until the ninth frame illustrated in FIG. 42C.

Note that eleven frames are required for each detection area to return to the starting position at the start of the detection when the rotors 104a through 104f of the infrared detector 110 continually rotate in the same direction. With the infrared detector 110, the person 102 is only a detection target of the infrared detector elements 105a through 105f for three of eleven frames (frame seven to frame nine).

Note that if each rotor 104a through 104f of the infrared detector 110 rotates back (in the reverse direction) when each detection area reaches the right hand end of the scanning range, twenty frames are required for each detection area to return to the starting position at the start of the detection illustrated in FIG. 42A.

In this case, the person 102 is only a detection target of the infrared detector elements 105a through 105f for six frames—from the seventh frame to the ninth frame and from the eleventh frame to the thirteenth frame (in other words, for six of twenty frames).

As described above, with the infrared detector 101, the position at least one infrared detector element is shifted in the scanning direction. The infrared detector 101 has the following advantageous effects.

Generally, when amount of activity is measured by scanning by the infrared detector, the amount of activity is estimated from the difference in (i) the temperature distribution of the room obtained by the first instance of scanning (first piece of thermal image data) and (i) the temperature distribution of the room obtained by the second instance of scanning (second piece of thermal image data).

For example, when thermopile elements including, for example, silicon, are used as the infrared detector elements, a few seconds may be required for the detection of one frame. Assuming it takes three seconds to detect one frame, in the example illustrated in FIG. 40A through FIG. 40D, it takes thirty three seconds to detect the eleven frames required to obtain one piece of thermal image data.

When the infrared detector 110 is used, the person 102 is only a detection target for three of the eleven frames. In other words, the period of time during which the amount of activity of the person 102 is not obtained is long since the temperature distribution of the person 102 is only measured for nine out of the thirty three seconds.

In contrast, with the infrared detector 101, since the infrared detector elements 105a through 105f are offset from each other, the temperature distribution of the person 102 is measured for eight of the eleven frames, or twenty four out of thirty three seconds. The infrared detector 101 is therefore capable of obtaining the amount of activity of the person 102 throughout almost the whole time period, regardless of the fact that the infrared detectors are scanning-type detectors.

Thus, with the infrared detector 101, it is possible to precisely assess the amount of activity of the person 102. The air conditioner 100 including the infrared detector 101 can thus provide comfortable air conditioning in accordance with the precisely measured amount of activity of the user.

Note that the same is true even if each rotor 104a through 104f of the infrared detector 101 rotates back in the reverse direction when each detection area reaches the right hand end of the scanning range.

The infrared detector 110 can only measure the temperature distribution of the person 102 for six of the twenty frames, or eighteen out of sixty seconds. In contrast, the infrared detector 101 can measure the temperature distribution of the person 102 for eleven of the twenty frames, or thirty three out of sixty seconds. The infrared detector 101 is therefore capable of obtaining the amount of activity of the person 102 throughout a majority of time period, regardless of the fact that the infrared detectors are scanning-type detectors.

Note that the infrared detector 101 includes six infrared detector elements, but the number of infrared detector elements is not particularly limited to a certain number.

In the infrared detector 101, the attachment positions of the infrared detector elements to their respective rotors are offset from each other in the scanning direction by a predetermined amount. In other words, in the infrared detector 101, no two infrared detector elements are arranged in the same position in the scanning direction. However, so long as at least some of the infrared detector elements are offset from each other in the scanning direction, it is possible to achieve the advantageous effect of detecting a person for a majority of the time period. In other words, the manner in which the infrared detector elements are offset from each other is not limited to the configuration exemplified with infrared detector 101.

The rotational direction of a rotor, the scanning width of one frame, and other scanning parameters in the infrared detector 101 are just one example, and are not limited in particular. Various modifications may be made to the infrared detector 101 so long as they do not depart from the essence of the infrared detector 101.

[Variation 1 of Embodiment 4]

Hereinafter, the infrared detector according to Variation 1 of Embodiment 4 will be described. FIG. 43A is a perspective view of the infrared detector according to Variation 1 of Embodiment 4. FIG. 43B is a top view of the infrared detector according to Variation 1 of Embodiment 4.

The infrared detector 200 illustrated in FIG. 43A and FIG. 43B includes an infrared detector element array 202 on a substrate 201, and an imaging lens 205 affixed to the substrate 201 via a mount not shown in the Drawings. The substrate 201 is affixed to an axle 204, and rotation of the axle 204 collectively rotates the infrared detector element array 202 and the imaging lens 205 on the substrate 201. This allows the infrared detector 200 to scan in a horizontal direction. Note that the imaging lens 205 may be formed from, for example, germanium, zinc selenide (ZnSe), or silicon, which have low absorption of infrared light.

As illustrated in FIG. 43A, the infrared detector 200 includes rectangular infrared detector elements 203a through 203f aligned diagonally in the infrared detector element array 202. In other words, in the infrared detector 200, the infrared detector element array 202 (the infrared detector elements 203a through 203f) is arranged in a single plane on a slope of a predetermined angle relative to the scanning direction.

Similar to the infrared detector 101, this infrared detector 200 is capable of obtaining the amount of activity of the person 102 throughout almost the whole time period, regardless of the fact that the infrared detector is scanning-type detector, by rotation of the substrate 201 about the axle 204. In other words, with the infrared detector 200, it is possible to precisely assess the amount of activity of the person 102. The air conditioner 100 including the infrared detector 200 can thus provide comfortable air conditioning in accordance with the precisely measured amount of activity of the user.

Note that in FIG. 43B, the infrared detector rotates in a clockwise direction, but when the scanning direction is reversed when each detection area reaches the right hand end of the scanning range, the infrared detector 200 may rotate in a counter-clockwise direction.

[Variation 2 of Embodiment 4]

Hereinafter, the infrared detector according to Variation 2 of Embodiment 4 will be described. FIG. 44A is a perspective view of the infrared detector according to Variation 2 of Embodiment 4. FIG. 44B is a top view of the infrared detector according to Variation 2 of Embodiment 4.

The infrared detector 210 illustrated in FIG. 44A and FIG. 44B is similar to the infrared detector 200, but different in that the infrared detector 210 does not include the axle 204, and the imaging lens 205 is not affixed to the substrate 201 and, as illustrated in FIG. 44B, can shift in the horizontal direction (scanning direction) via a structure not shown in the Drawings.

Similar to when the scanning direction is reversed with the infrared detector 101, the infrared detector 210 is capable of obtaining the amount of activity of the person 102 throughout almost the whole time period, regardless of the fact that the infrared detector is a scanning-type detector. In other words, with the infrared detector 210, it is possible to precisely assess the amount of activity of the person 102. The air conditioner 100 including the infrared detector 210 can thus provide comfortable air conditioning in accordance with the precisely measured amount of activity of the user.

[Variation 3 of Embodiment 4]

Hereinafter, the infrared detector according to Variation 3 of Embodiment 4 will be described. FIG. 45 is a perspective view of the infrared detector according to Variation 3 of Embodiment 4.

The infrared detector 220 illustrated in FIG. 45 includes the infrared detector element array 202 on the substrate 201, and the imaging lens 205. The infrared detector element array 202 and the imaging lens 205 are the same as those included in the infrared detector 200.

With the infrared detector 220, however, the substrate 201, the infrared detector element array 202, and the imaging lens 205 do not move at all; a mirror 221 provided above the imaging lens 205 rotates centrally about an axle 222. The infrared detector 220 differs from the infrared detector 200 in this regard. More specifically, the mirror 221 reflects infrared light incident from the left hand side in FIG. 45 downward. The reflected infrared light is transmitted through the imaging lens 205 and a distribution of the infrared light is imaged on the infrared detector element array 202.

In this way, by rotating the mirror 221 about the axle 222, the number of moveable parts are kept to a minimum, and the infrared detector 220 is capable of obtaining the amount of activity of the person 102 throughout almost the whole time period, regardless of the fact that the infrared detector is a scanning-type detector. In other words, with the infrared detector 220, it is possible to precisely assess the amount of activity of the person 102. The air conditioner 100 including the infrared detector 220 can thus provide comfortable air conditioning in accordance with the precisely measured amount of activity of the user.

Moreover, with the infrared detector 220, the mirror 221 centered about the axle 222 is the only moveable part, and the mirror 221 does not include, for example, wires. The infrared detector 220 is therefore advantageous in that it has a simplified, low-cost, and long service life structure.

Note that in this case, the imaging lens 205 may be attached to the mirror 221. FIG. 46 is a perspective view of an infrared detector in which the imaging lens 205 is attached to the mirror 221.

The infrared detector 230 illustrated in FIG. 46 is similar to the infrared detector 220, but different only in that the imaging lens 205 is attached to the mirror 221. Note that in FIG. 46, the mirror 221 to which the imaging lens 205 is displayed as a mirror with lens 231.

The infrared light incident on the imaging lens 205 reaches the mirror 221 after transmitting through the imaging lens, reflects off the mirror 221, and then transmits through the imaging lens 205 one more time. The reflected infrared light exiting the imaging lens 205 is incident on the infrared detector element array 202, whereby a distribution of the infrared light is imaged on the infrared detector element array 202.

The infrared detector 230 has the same advantageous effects as the infrared detector 220. Moreover, with the infrared detector 230, since the infrared light is transmitted through the same imaging lens 205 twice, it is possible to reduce the focal length even with a single lens, and thus possible to increase the temperature distribution measurement range.

[Variation 4 of Embodiment 4]

Hereinafter, the infrared detector according to Variation 4 of Embodiment 4 will be described. FIG. 47 is a perspective view of the infrared detector according to Variation 4 of Embodiment 4.

The infrared detector 240 illustrated in FIG. 47 is similar to the infrared detector 200. With the infrared detector 240, however, the center of the substrate 201 is cut out, and the infrared detector element array 202 is provided on the cutout portion, which is supported by an axle 241. The axle 241 extends horizontally and is supported by the substrate 201, which allows the infrared detector element array 202 to rotate vertically relative to the illustration in FIG. 47.

With the infrared detector 240, the imaging lens 205 is affixed to the infrared detector element array 202 with a mount not shown in the Drawings. With this, scanning in the vertical direction in accordance with rotation of the axle 241 in addition to scanning in the horizontal direction in accordance with rotation of the axle 204 is possible, allowing the infrared detector 240 to sense infrared light over a wide range, and obtain a temperature distribution over a wider range.

For example, when the presence of the person 102 is detected based on amount of activity (FIG. 40C) upon performing horizontal scanning (FIG. 40A through FIG. 40C), the infrared detector 240 stops rotation of the axle 204, affixes the position in the horizontal direction, and rotates the axle 241. This allows for temperature distribution measurement in the vertical direction, as illustrated in FIG. 48A. FIG. 48A through FIG. 48C are conceptual diagrams illustrating detection areas when vertical scanning is performed. Note that FIG. 48A illustrates the detection areas at the start of the vertical scanning. FIG. 48B illustrates the detection areas after the scanning has progressed upward from the state illustrated in FIG. 48A, and FIG. 48C illustrates the detection areas after the scanning has progressed downward from the state illustrated in FIG. 48A.

As illustrated in FIG. 48A through FIG. 48C, by performing horizontal scanning of an area where sites of interest are likely to appear regularly and only performing vertical scanning when a site of interest is found, regularly scanning of a wide area is not required. Consequently, with the infrared detector 240, the time it takes to perform one instance of scanning is reduced, and more detailed control of the air conditioner 100 is possible.

Moreover, since the infrared detector 240 can analyze the temperature distribution of a surrounding area of the person 102 in detail, the infrared detector 240 is capable of obtaining a more precise amount of activity of the person 102. Consequently, the air conditioner 100 including the infrared detector 240 can thus provide comfortable air conditioning in accordance with an amount of activity of the user.

Note that conceivable methods of detecting the person 102 from a temperature distribution include detecting (determining), among the detected temperature distribution, a portion in which an object within a predetermined temperature range from approximately 30 degrees Celsius to 36 degrees Celsius is detected, to be the person 102. Various other methods are conceivable as well, including determining an area, of a predetermined temperature range, exceeding a predetermined size to be a person, but the method for detecting the person 102 is not particularly limited.

Moreover, a method of determining an area detected as the person 102 to be a target of interest and detecting the temperature distribution of the surrounding area in detail is described above, but an object other than the person 102 may be a target of interest. FIG. 49 illustrates an example where an object other than the person 102 is a target of interest (detection target). FIG. 50 is a conceptual diagram of the detection areas when a room including a light is scanned in a vertical direction.

As illustrated in FIG. 49, when the light 242 is present in the room, the presence of the light 242 is detected by scanning a wide area in a vertical direction, as illustrated in FIG. 50. Since the light does not generate heat when it is off, the infrared detector 240 cannot detect the light 242 when it is off. However, the light is detectable when it is on since it generates heat.

Therefore, for example, when the infrared detector 240 detects an area of varying temperature by vertically scanning a wide area and then focuses detection of the thermal distribution on the area surrounding the detected area, and then the location of the area of varying temperature does not further vary for a predetermined period of time or longer, the infrared detector 240 can recognize that area as a consumer electronics device (that is operating), not a person. The consumer electronics device is, for example, the light illustrated in FIG. 49 and FIG. 50, or another device that generates heat.

The infrared detector 240 can further detect the amount of power consumption in the room or household in advance, and determine what kinds of consumer electronics devices are in operation from an analysis of the changes in power consumption amount. For example, by obtaining (recording) in advance information on the power consumption of different types of consumer electronics devices, such as information that the power consumption of a ceiling light is approximately 50 W and the power consumption of a liquid crystal television is approximately 100 W, the infrared detector 240 can differentiate between consumer electronics devices based on the difference in power consumption before and after operation of the consumer electronics device.

Moreover, when the infrared detector 240 detects a high temperature or a low temperature area in particular, focuses scanning on the surrounding area, and then detects that that area is a high temperature area having a temperature greater than or equal to a predetermined temperature, or a low temperature area having a temperature less than or equal to a predetermined temperature, the infrared detector 240 may alert the user (person 102). In this case, the area detected to be of high temperature is assumed to be, for example, a consumer electronics device that is generating an irregular amount of heat, and the area detected to be of low temperature is assumed to be, for example, a freezer with the door left open. With this, in addition to air conditioning, the infrared detector 240 can provide ease of mind and contribute to providing a safer environment.

Note that the structure of the infrared detector 240 is merely one example, and is not particularly limited so long as the structure of the infrared detector 240 can perform vertical and horizontal scanning. Various modifications may be made to the infrared detector 240 so long as they do not depart from the essence of the infrared detector 240.

[Variation 5 of Embodiment 4]

Next, as Variation 5 of Embodiment 4, achieving a high-resolution infrared image with the infrared detector element array will be described. FIG. 51A is a perspective view of the infrared detector according to Variation 5 of Embodiment 4. FIG. 51B is a top view of the infrared detector according to Variation 5 of Embodiment 4.

The infrared detector 250 illustrated in FIG. 51A is similar to the infrared detector 200. In the infrared detector element array 202 of the above-described infrared detector 200, the infrared detector elements 203a through 203f are arranged (aligned) such that the sides of each element are perpendicular or parallel to the scanning direction. For example, as illustrated in FIG. 43A, the infrared detector element 203b is only in contact with the infrared detector element 203a at the upper left corner.

Conversely, in the infrared detector element array 252 of the infrared detector 250, the infrared detector elements 253a through 253f are arranged such that the sides of each element are sloped at a φ degree angle, as illustrated in FIG. 51A. Furthermore, the infrared detector elements 253a through 253f are in contact with adjacent infrared detector elements on their sides, not corners. The infrared detector 200 and the infrared detector element array 252 are the same regarding other points, and as a result of the infrared detector 250 including the imaging lens 205 which is mounted to the substrate 201 and rotates about the axle 204, it is possible to detect the temperature distribution over a wide range.

Characteristics of the infrared detector 250 including the infrared detector element array 252 will be described with reference to FIG. 52. FIG. 52 is a conceptual diagram illustrating detection areas of the infrared detector 250.

Note that in the following description, the angle φ is assumed to be 45 degrees in FIG. 51A. Moreover, the respective areas in which the infrared detector elements 253a through 253f perform detection are the detection areas 258a through 258f.

When scanning is performed from left to right, such as is the case in FIG. 52, the detection target of the detection area 258a of the infrared detector element 253a is area A (area whose vertical height extends in the scanning direction of A). Similarly, the detection target of the detection area 258b of the infrared detector element 253b is area B, and the respective detection areas of the detection areas 258c through 258f of the infrared detector elements 253c through 253F are areas C through F.

The bottom half of area A and the top half of area B overlap. Similarly, the bottom half of area B and the top half of area C overlap, and similarly the top half (bottom half) of each area overlaps with the bottom half (top half) of the detection target area of the adjacent infrared detector element. Here, the top half of area A is referred to as area (1), the overlapping portion of area A and area B is referred to as area (2), the overlapping portion of area B and area C is referred to as area (3), and the areas thereafter are referred to as areas (4) through (7), as illustrated in FIG. 52.

For example, when a heat generating body is present only in area (3), the heat generating body is detected by both the infrared detector elements 253b and 253c, but not detected by the infrared detector element 253a or the infrared detector element 253d. Consequently, it is specified that a heat generating object is present in area (3).

Since the detection ranges (detection target areas) of adjacent infrared detector elements overlap in a direction perpendicular to the scanning direction, the infrared image resolution in the direction perpendicular to the scanning direction increases. FIG. 53 illustrates a technique for increasing the resolution of the infrared image.

In FIG. 53, the infrared detector element 108 and the infrared detector element 258 are illustrated as having the same size (dimensions). The infrared detector element 108 is arranged such that the four sides thereof are either horizontal or perpendicular to the scanning direction, and the infrared detector element 258 is arranged such that the four sides thereof are sloped φ degrees (45 degrees) with respect to the scanning direction, similar to FIG. 52. Here, the detection width in the vertical direction of the infrared detector element 108 is X, but the detection width Y in the vertical direction of the infrared detector element 258 is, as a result of the above-described overlapping, smaller than X such that Y is equal to X times one over the square root of two. In other words, the resolution of the infrared image measured from the arrangement of the infrared detector element 258 increases over the infrared image measured from the arrangement of the infrared detector element 108 by a multiple of the square root of two.

As described above, it is possible to increase the resolution of the infrared image by arranging the infrared detector elements such that the detection ranges overlap each other in a direction perpendicular to the scanning direction.

Note that in the above description, the angle φ is assumed to be 45 degrees, but this is merely one example. In a direction perpendicular to the scanning direction, so long as the detection ranges of adjacent infrared detector elements overlap, another angle is acceptable, and another arrangement is also acceptable.

[Variation 6 of Embodiment 4]

Next, the infrared detector according to Variation 6 of Embodiment 4 will be described. FIG. 54 is a perspective view of the infrared detector according to Variation 6 of Embodiment 4.

Similar to the infrared detector 250, the infrared detector 260 illustrated in FIG. 54 includes an infrared detector element array 262 of infrared detector elements 263a through 263f aligned at an angle φ relative to the horizontal direction. In the infrared detector 260, the angle φ is adjustable about a rotating structure 264, and vertical scanning is also possible due to an axle 261 supporting the infrared detector element array 262.

The imaging lens 205 is affixed to the infrared detector element array 262 with a mount not shown in the Drawings. With this configuration, the infrared detector 260 is capable of arbitrarily changing the resolution of the infrared image. FIG. 55 illustrates a technique for changing the resolution of the infrared image.

In FIG. 55, the detection areas 268a through 268f are the respective detection areas for the infrared detector elements 263a through 263f.

For example, when the angle φ is greater than 45 degrees, the detection range of the detection area 268c is area C. Here, in addition to area B (the detection range of detection area 268b) and area D (the detection range of detection area 268d), area A (the detection range of detection area 268a) and area E (the detection range of detection area 268e) overlap with area C. The infrared detector 260 can therefore obtain an infrared image of an even higher resolution.

For example, the infrared detector 260 is capable of obtaining the following sort of infrared image (temperature distribution). First, the infrared detector 260 scans while the angle φ is set to 90 degrees (in other words, while the infrared detector elements 263a through 263f are aligned in a straight line and not offset in the vertical direction). When the target of interest is smaller than the vertical height of the entire scanning range, the infrared detector 260 rotates the rotating structure 264 such that the target of interest is tightly covered, and rescans with the detection areas 268a through 268f reduced in vertical height. With this, a high-resolution target of interest infrared image (temperature distribution) is obtained.

The infrared detector 260 can also scan in vertical directions by rotation of an axle 261. Thus, even when the target of interest is above or below the scanning range, the infrared detector 260 is capable of scanning only the location of the target of interest by adjusting the infrared detector element array 262 vertically so as to match up with the target of interest, and scanning in a vertical direction.

Note that when the infrared detector 260 knows the horizontal location of the target of interest, horizontal scanning by the axle 204 may be stopped and vertical scanning by the axle 261 may be started. In this case as well, the infrared detector 260 is capable of obtaining an image that is two-dimensionally high in resolution by rotating the infrared detector elements 263a through 263f about the rotating structure 264 so as to match the vertical height of the target of interest.

[Other Embodiment 4 Variations]

The infrared detector element arrays 252 and 262 described in the above variations of Embodiment 4 are advantageous in that they can be manufactured at very low cost. FIG. 56 illustrates a technique for cutting the infrared detector element array from a wafer.

Generally, infrared detector elements are manufactured by semiconductor device fabrication. During manufacturing, when infrared detector element arrays 271 such as the infrared detector element array 252 and 262, for example, are cut from a wafer 270, it is possible to cut out multiple infrared detector element arrays from a single wafer 270 since sides of adjacent infrared detector elements are in contact with each other in each infrared detector element array 271. In FIG. 56, six infrared detector element arrays 271 are obtained from a single wafer 270. The infrared detector element arrays 252 and 262 are therefore advantageous in that they can be manufactured at low cost.

Note that the configuration described in Embodiment 4 is merely one example, and the number of infrared detector elements included in the infrared detector element array, the driving structures of the axle 204 and the axle 261, for example, or the rotating structure and such of the rotating structure 264, for example, are not particularly limited. Various modifications may be made configuration so long as they do not depart from the essence of the configuration. Moreover, the above embodiments or the variations thereof may be combined.

[Conclusion]

The thermal image sensor (infrared detector) according to Embodiment 4 includes a plurality of infrared sensor elements that detect infrared light in a detection area, and a scanning device which scans the detection area in a scanning direction to detect, with the plurality of infrared detector elements, infrared light in an area to be captured as a single thermal image. The plurality of infrared detector elements include infrared detector elements arranged in different positions in the predetermined direction (for example, the rotational direction of the rotors 104a through 104f). Here, the predetermined direction is equivalent to the scanning direction in the arrangement of the plurality of infrared detector elements.

For example, the plurality of infrared detector elements are aligned in an intersecting direction intersecting both the predetermined direction and a direction perpendicular to the predetermined direction, such as is the case with the infrared detector element array 202.

For example, as illustrated in FIG. 52 and FIG. 55, the plurality of infrared detector elements may be arranged such that a detection range of one infrared detector element included in the plurality of infrared detector elements overlaps a detection range of an adjacent infrared detector element included in the plurality of infrared detector elements, such as is the case with the infrared detector element array 252. Here, the detection range refers to the range in which the detection area moves when scanning is performed.

The scanning device in the thermal image sensor according to Embodiment 4 may scan the detection area in the scanning direction by moving the plurality of infrared detector elements in the predetermined direction. In this case, the operating device is, for example, a driving structure such as the rotors 104a through 104f, or the axle 204.

The thermal image sensor according to Embodiment 4 may include an optical system that introduces infrared light from a target object to the plurality of infrared detector elements, and the scanning device may scan the detection area in the scanning direction by moving the optical system. In this case, the scanning device is, for example, a driving structure such as the axle 222.

The thermal image sensor according to Embodiment 4 may include a perpendicular scanning device that scans the detection range in a direction perpendicular to the scanning direction. The perpendicular scanning device is, for example, a driving structure such as the axle 261.

The thermal image sensor according to Embodiment 4 may include a structure that adjusts an angle of the intersecting direction relative to the predetermined direction by rotating the plurality of infrared detector elements. This sort of structure is, for example, the rotating structure 264.

The thermal image sensor according to Embodiment 4 is lower in cost than the thermal image sensor 20 in which the infrared detector elements are arranged in a matrix, and more suited for measurement of an amount of activity of a person than the thermal image sensor 30 in which the infrared detector elements are arranged in a line.

(Embodiment 5)

The infrared detector described in Embodiment 4 may be used in a device other than the air conditioner 100. In Embodiment 5, as one example, a lighting device including an infrared detector will be described. FIG. 57 is a diagrammatic view of a room in which a lighting device 300 including an infrared detector 301 is installed in the ceiling. As one example, the person 102 and the desk 103 are present in the room illustrated in FIG. 57.

Any of the infrared detectors 101, 200, 210, 220, 230, 240, 250, and 260 described in Embodiment 4 may be used as the infrared detector 301 included in the lighting device 300. The lighting device 300 including the infrared detector 301 is capable of, for example, estimating who a person is based on the height of the detected person 102, and performing lighting control based on the result of the estimation.

For example, if light emission color preferences are registered in advance, the lighting device 300 can change the color of the light (light emission color) based on the presence of the person estimated by the infrared detector 301. As a simple example, the lighting device 300 may turn the light on or off based on the presence of a person. Moreover, when the infrared detector 301 detects that a person is watching television in the room, the lighting device 300 can dime the light to increase visibility of the television screen.

When the infrared detector 301 determines that the person 102 is falling asleep, the lighting device 300 may dim or turn off the light. Conversely, when the infrared detector 301 determines that the person 102 is waking up, the lighting device 300 may turn on the light. This sort of control is convenient and can reduce power consumption.

Note that the configuration described in Embodiment 5 is one example, and the detection result of the infrared detector 301 may be used to control other aspects of the lighting device 300. Note that in FIG. 57, the lighting device 300 is installed in the ceiling, but the lighting device 300 may be installed in the wall.

In Embodiment 5, the infrared detector 301 is exemplified as being installed in the lighting device 300, but the infrared detector 301 may be installed in a device other than the lighting device 300. For example, the infrared detector 301 may be installed in a television. In this case, the television may use the infrared detector 301 to detect a viewer and suggest television programs based on the profile of the detected viewer, or automatically turn off the television power when a viewer is not detected.

(Other Embodiments)

The present invention has hereinbefore been described based on Embodiments 1 through 5, but the present invention is not limited to these embodiments.

For example, in Embodiment 2, an example in which a plurality of one-dimensional photosensors (element lines) are provided is mainly given, but the plurality of one-dimensional photosensors are not required to be disposed separated apart from each other. FIG. 58 illustrates an example of a thermal image sensor including a plurality of one-dimensional photosensors disposed adjacent to each other.

For example, the thermal image sensor 2900a illustrated in (a) in FIG. 58 includes two one-dimensional photosensors having photosensor elements aligned in the Y axis direction. The two one-dimensional photosensors in the thermal image sensor 2900a are also disposed adjacent (contiguous) to each other in the X axis direction.

The thermal image sensor 2900b illustrated in (b) in FIG. 58 includes two one-dimensional photosensors having photosensor elements that are offset in the Y axis direction by one-half the vertical height of a photosensor element (the vertical height is labeled as "h" in FIG. 58). The two one-dimensional photosensors in the thermal image sensor 2900b are also disposed adjacent to each other in the X axis direction.

The thermal image sensor 2900c illustrated in (c) in FIG. 58 includes four one-dimensional photosensors having photosensor elements that are offset in the Y axis direction by one fourth the vertical height of a photosensor element (the vertical height is labeled as "h" in FIG. 58). The four one-dimensional photosensors in the thermal image sensor 2900c are also disposed adjacent to each other in the X axis direction.

By offsetting the positioning of the photosensor elements like in the thermal image sensor 2900b and the thermal image sensor 2900c, high-resolution imaging as described above is possible.

Moreover, for example, the present invention may be implemented as an electronics device (consumer electronics device), such as the above-described air conditioner, vehicle air conditioner, lighting device, and television. Moreover, the present invention may be implemented as a program for operating an information processing device, such as a smart phone, as a user interface (user interface device), or a non-transitory computer-readable recording medium having such a program stored thereon.

Each of the structural elements in each of the above-described embodiments may be configured in the form of an exclusive hardware product, or may be realized by executing a software program suitable for the structural element. Each of the structural elements may be realized by means of a program executing device, such as a CPU and a processor, reading and executing the software program recorded on a recording medium such as a hard disk or a semiconductor memory.

In each of the above-described embodiments, a process executed by a prescribed processor may be executed by a different processor. Moreover, the processing order of the processes may be changed, and the processes may be performed in parallel. For example, the processes performed by the computation processor included in the air conditioner may be performed by the user interface (smart phone).

One or more configurations of the thermal image sensor (and user interface) have herein been described based on the above embodiments, but the present invention is not limited to these embodiments. Various modifications of the exemplary embodiments as well as embodiments resulting from arbitrary combinations of constituent elements of different exemplary embodiments that may be conceived by those skilled in the art are intended to be included within the scope of the present invention as long as these do not depart from the essence of the present invention.

INDUSTRIAL APPLICABILITY

The thermal image sensor according to the present invention is applicable as a relatively low cost thermal image sensor that is suitable for measuring an amount of human activity.

REFERENCE SIGNS LIST 10, 10a, 100 air conditioner
11 air inlet
12 air outlet
13 thermal image sensor
14 main body
15 frame memory
16 computation processor
16a, 81 image processor
16b device controller
17 environmental monitoring device
18a heat exchanger
18b blower
18c air flow direction adjuster
19 communication device
20 thermal image sensor
21 two-dimensional photosensor
22, 2802 lens
30, 1000, 1300, 1400a, 1400b, 1500a, 1500b, 1500c, 1500d, 1600a, 1600b, 1700a, 1700b, 1800a, 1800b, 2000a, 2000b, 2000c, 2500, 2700, 2800, 2900a, 2900b, 2900c, 3101 thermal image sensor
31 rotator
32, 32a, 32b, 32c one-dimensional photosensor
33 lens
41, 42 user
50, 91, 92 entire observation area
51, 1907, 1908, 1909, 2602 observation pixel
61, 61a, 61b, 61c, 1910, 1911, 2101 linear observation area
70 user interface
71 first setting-receiver
72 second setting-receiver
73 third setting-receiver
74 display device
75 remote-control controller
76 remote control communication device
80 server
101, 110, 200, 210, 220, 230, 240, 250, 260, 301 infrared detector (thermal image sensor)
102 person
102a left leg
102b head
103 desk
104a, 104b, 104c, 104d, 104e, 104f rotor 105a, 105b, 105c, 105d, 105e, 105f, 108, 203a, 203b, 203c, 203d, 203e, 203f, 253a, 253b, 253c, 253d, 253e, 253f, 258, 263a, 263b, 263c, 263d, 263e, 263f infrared detector element
106a, 106b, 106c, 106d, 106e, 106f top surface
107a, 107b, 107c, 107d, 107e, 107f side surface
108a, 108b, 108c, 108d, 108e, 108f, 109a, 109b, 109c, 109d, 109e, 109f, 258a, 258b, 258c, 258d, 258e, 258f, 268a, 268b, 268c, 268d, 268e, 268f detection area
201 substrate
202, 252, 262, 271 infrared detector element array
204, 222, 241, 261 axle
205 imaging lens
221, 2801 mirror
231 mirror with lens
242 light
264 rotating structure
270 wafer
300 lighting device
1401 diagonal observation area
1401a, 1501a, 1501b, 1501c, 1501d, 1601a, 1601b, 1701a, 1701b, 1801a, 1801b first photosensor element line
1402 non-linear observation area
1402a, 1502a, 1502b, 1502c, 1502d, 1602a, 1602b, 1702a, 1702b, 1802a, 1802b second photosensor element line
1402b second photosensor element group
1601, 1602, 1701, 1702 photosensor element
1901, 1902, 1903, 1904, 1905, 1906, 2601 partial observation pixel
2001, 2002, 2003, 2004 in-room fixed partition
2301 baffle
2701, 2803 photosensor
3000 compressor
3001 evaporator
3002 condenser
3003 receiver
3004 blower system
3005 intake system
3006 temperature sensor
3100, 3200, 3300 vehicle air conditioner
3102, 3201 observation area
3202 hygrometer
3203 windshield
3400 vehicle
3501 scattered light measurement system
3502 lighting system
3801 blinder

The invention claimed is:

1. A thermal image sensor comprising:
a plurality of infrared detector elements that detect infrared light in a detection area;
a scanning device that scans the detection area in a predetermined direction to generate a thermal image based on information obtained by each of the plurality of infrared detector elements; and
a baffle disposed in an area around the plurality of infrared detector elements,
wherein the plurality of infrared detector elements include a first infrared detector element and a second infrared detector element arranged in mutually different positions in the predetermined direction,
the first infrared detector element and the second infrared detector element are arranged such that a portion of a first detection area and a portion of a second detection area overlap, the first detection area being an area in which the first infrared detector element detects infrared light by scanning by the scanning device, and the second detection area being an area in which the second infrared detector element detects infrared light by scanning by the scanning device,
the baffle is disposed on one side of the plurality of infrared detector elements so that a long side of the baffle is arranged in a direction perpendicular to the predetermined direction to block infrared light at an end of the detection area on the one side of the plurality of infrared detector elements,
the plurality of infrared detector elements are arranged in a plurality of element lines, and
the plurality of element lines are arranged in mutually different positions in the predetermined direction.

2. The thermal image sensor according to claim 1,
wherein the plurality of element lines include a first element line and a second element line arranged in mutually different positions in the predetermined direction,
the first infrared detector element is included in the first element line, and
the second infrared detector element is included in the second element line.

3. The thermal image sensor according to claim 2,
wherein the first element line further includes a third infrared detector element that is arranged in a different position than the first infrared detector element and detects infrared light in a third detection area by scanning by the scanning device, and
the third infrared detector element is arranged such that a portion of the third detection area and a portion of the second detection area overlap.

4. The thermal image sensor according to claim 2,
wherein the plurality of element lines include a third element line arranged in a different position in the predetermined direction than the first element line and the second element line,
the first element line, the second element line, and the third element line are arranged in stated order, and
a distance between the first element line and the second element line is different from a distance between the second element line and the third element line.

5. The thermal image sensor according to claim 1,
wherein each of the plurality of element lines is configured of infrared detector elements aligned in a direction perpendicular to the predetermined direction.

6. The thermal image sensor according to claim 1,
wherein the plurality of element lines include:
an element line of infrared detector elements aligned in a direction perpendicular to the predetermined direction; and
an element line of infrared detector elements aligned in an intersecting direction intersecting both the predetermined direction and the direction perpendicular to the predetermined direction.

7. The thermal image sensor according to claim 1,
wherein a number of infrared detector elements constituting one element line included in the plurality of element lines is different from a number of infrared detector elements constituting another element line included in the plurality of element lines.

8. The thermal image sensor according to claim 1,
wherein the plurality of infrared detector elements include two types of infrared detector elements different in at least one of shape, thermal capacity, size, or material.

9. The thermal image sensor according to claim 1,
wherein the scanning device scans the detection area in the predetermined direction by moving the plurality of infrared detector elements in the predetermined direction.

10. The thermal image sensor according to claim 1, further comprising
an optical system that introduces infrared light from a target object to the plurality of infrared detector elements,
wherein the scanning device scans the detection area in the predetermined direction by moving the optical system.

11. The thermal image sensor according to claim 1, further comprising
a perpendicular scanning device that scans the detection area in a direction perpendicular to the predetermined direction.

12. The thermal image sensor according to claim 1,
wherein the thermal image sensor detects a change in the thermal image by comparing first infrared information detected for the first detection area at a first point in time by the first infrared detector element and second infrared information detected for the first detection area at a second point in time by the second infrared detector element.

13. A user interface for an air conditioner including the thermal image sensor according to claim 1,
wherein the thermal image sensor is a sensor for generating a thermal image showing a temperature distribution of a target area, and
the user interface comprises:
a first setting-receiver that receives a setting for a target temperature of a room; and
a second setting-receiver that receives a setting for a target temperature of a certain part of the target area.

14. The user interface according to claim 13, further comprising
a third setting-receiver that receives a setting for an air flow direction and a setting for a fan speed for the air conditioner,
wherein when the setting for the target temperature for the first setting-receiver is set and the setting for the target temperature for the second setting-receiver is set, the third setting-receiver refrains from receiving the setting for the air flow direction and the setting for the fan speed.

15. The user interface according to claim 14, further comprising
a display device that displays at least the air flow direction and the fan speed,
wherein when the setting for the target temperature for the first setting-receiver is set and the setting for the target temperature for the second setting-receiver is set, the display device displays that input of a setting to the third setting-receiver is not possible.

16. The user interface according to claim 15,
wherein the air conditioner detects a location of a person in the target area by image processing by the thermal image sensor, and
the display device further displays a temperature at the location of the person detected by the air conditioner.

17. The user interface according to claim 16,
wherein the temperature at the location of the person includes at least one of a temperature at a location of a face of the person, a temperature at a location of a hand of the person, or a temperature at a location of a leg of the person.

18. The user interface according to claim 17,
wherein the second setting-receiver receives, as the target temperature of the certain part, a setting for a target temperature of at least one of a location of a face of the person, a location of a hand of the person, or a location of a leg of the person.

* * * * *